(12) United States Patent
Tanner et al.

(10) Patent No.: US 11,440,813 B2
(45) Date of Patent: Sep. 13, 2022

(54) APPARATUS AND METHODS FOR FAUCET-MOUNTED WATER FILTRATION SYSTEMS

(71) Applicant: Helen of Troy Limited, St Michael (BB)

(72) Inventors: John Tanner, Plymouth, MN (US); David Emmons, Coon Rapids, MN (US); Matthew Lloyd Newman, Cincinnati, OH (US); Brian David Andres, Harrison, OH (US); Simon Leung, Shanghai (CN); Steven James Schroeck, Cincinnati, OH (US); Armin Schwarz-Hartmann, Wendelsheim (DE); Peter Stoeffel, Wallduern (DE); Richard Paul Riedel, Mason, OH (US)

(73) Assignee: Helen of Troy Limited, St. Michael (BB)

( * ) Notice: Subject to any disclaimer, the term of this patent is extended or adjusted under 35 U.S.C. 154(b) by 419 days.

(21) Appl. No.: 16/161,646

(22) Filed: Oct. 16, 2018

(65) Prior Publication Data

US 2019/0127235 A1    May 2, 2019

Related U.S. Application Data

(63) Continuation of application No. 14/640,683, filed on Mar. 6, 2015, now Pat. No. 10,125,026, which is a
(Continued)

(51) Int. Cl.
*C02F 1/00* (2006.01)
*B01D 35/04* (2006.01)
(Continued)

(52) U.S. Cl.
CPC .............. *C02F 1/003* (2013.01); *B01D 35/04* (2013.01); *B01D 35/30* (2013.01); *B01D 35/306* (2013.01);
(Continued)

(58) Field of Classification Search
CPC ........ C02F 1/00; C02F 1/003; C02F 2103/02; C02F 2209/40; C02F 2301/043;
(Continued)

(56) References Cited

U.S. PATENT DOCUMENTS 248,975 A    11/1881    Wooten
364,181 A     5/1887    Love
(Continued)

FOREIGN PATENT DOCUMENTS

AU    9852043 A    7/1998
DE     306294      6/1917
(Continued)

OTHER PUBLICATIONS

Chinese Office Action dated Sep. 15, 2011, pertaining to Chinese patent application No. 200880105829.0.
(Continued)

*Primary Examiner* — Joseph W Drodge
(74) *Attorney, Agent, or Firm* — Rankin, Hill & Clark LLP

(57) ABSTRACT

A faucet-mounted filter system includes a body forming a fluid chamber having a water inlet, a quick connect device positioned adjacent the water inlet for mounting the filter system to a water faucet, a filtered water flow path disposed within the body and in fluid communication with the water inlet, an unfiltered water flow path disposed within the body and in fluid communication with the water inlet, a diverter valve disposed within the fluid chamber and operable to open and close the filtered and unfiltered water flow paths,
(Continued)

a seal, an actuator engaging the diverter valve to open and close the filtered and unfiltered water flow paths, a flow meter connected to the body and in fluid communication with the filter flow path, a filter housing connected to the body and having a reservoir, and a filter cartridge disposed within the reservoir.

4 Claims, 34 Drawing Sheets

Related U.S. Application Data continuation of application No. 12/205,520, filed on Sep. 5, 2008, now Pat. No. 9,004,290.

(60) Provisional application No. 60/970,150, filed on Sep. 5, 2007.

(51) Int. Cl.
*B01D 35/30* (2006.01)
*E03C 1/04* (2006.01)
*F16L 15/00* (2006.01)
*F16L 23/00* (2006.01)
*F16L 37/00* (2006.01)
*C02F 103/02* (2006.01)

(52) U.S. Cl.
CPC .......... *E03C 1/0403* (2013.01); *E03C 1/0404* (2013.01); *F16L 15/00* (2013.01); *F16L 23/00* (2013.01); *F16L 37/00* (2013.01); *C02F 2103/02* (2013.01); *C02F 2209/40* (2013.01); *C02F 2301/043* (2013.01); *C02F 2307/06* (2013.01); *E03C 2201/30* (2013.01); *E03C 2201/40* (2013.01); *Y10T 137/877* (2015.04); *Y10T 137/8737* (2015.04); *Y10T 137/87579* (2015.04); *Y10T 137/87708* (2015.04); *Y10T 137/87756* (2015.04); *Y10T 137/87764* (2015.04); *Y10T 137/87893* (2015.04)

(58) Field of Classification Search
CPC ............ C02F 2307/06; C02F 2201/004; C02F 2201/005; E03C 1/0403; E03C 1/0404; E03C 2201/30; E03C 2201/40; E03C 1/04; E03C 1/02; F16L 23/00; F16L 37/00; F16L 15/00; F16L 37/08; F16L 37/086; Y10T 137/8737; Y10T 137/87579; Y10T 137/877; Y10T 137/87708; Y10T 137/87756; Y10T 137/87764; Y10T 137/87893; F16K 15/025; B01D 35/04; B01D 35/043; B01D 35/046; B01D 35/157; B01D 35/1573; B01D 35/30; B01D 35/306; B01D 2201/04; B01D 2201/0415; B01D 2201/0423; B01D 2201/0461; B01D 2201/307; B01D 2201/34; B01D 2201/40; B01D 2201/4023; F16J 15/3248; F16J 15/3252; F16J 15/3268; F16J 15/3276; F16J 21/183
USPC ....... 210/87; 137/599.15; 285/312, 316, 317
See application file for complete search history.

(56) References Cited

U.S. PATENT DOCUMENTS

| | | |
|---|---|---|
| D44,718 S | 10/1913 | McMurtrie |
| 1,302,845 A | 5/1919 | Redmer |
| 2,023,428 A * | 12/1935 | Liebhardt ............ F16L 37/0842 285/110 |
| 2,369,865 A | 2/1945 | Spencer |
| 2,502,642 A | 4/1950 | Currlin |
| 2,770,998 A | 11/1956 | Schwartz |
| 3,009,722 A | 11/1961 | Augustin |
| D194,089 S | 11/1962 | Nilsen |
| 3,342,235 A | 9/1967 | Pylypyshyn |
| 3,810,291 A | 5/1974 | Ladouceur |
| 3,929,152 A | 12/1975 | Graham |
| D239,594 S | 4/1976 | Dieme |
| 4,025,049 A * | 5/1977 | Schmidt ................ F16L 37/40 251/149.6 |
| 4,172,796 A | 10/1979 | Corder |
| D262,940 S | 2/1982 | Spinner |
| 4,389,766 A | 6/1983 | Capuano |
| 4,504,389 A | 3/1985 | Rundzaitis |
| 4,599,171 A | 7/1986 | Padilla et al. |
| 4,609,463 A | 9/1986 | Macevicz et al. |
| 4,686,037 A | 8/1987 | Lang |
| D295,370 S | 4/1988 | Carlo et al. |
| 4,737,058 A | 4/1988 | Callman et al. |
| D302,109 S | 7/1989 | Cayce et al. |
| D302,201 S | 7/1989 | Hengesbach |
| 4,863,103 A | 9/1989 | Gannaway |
| 4,980,073 A | 12/1990 | Woodruff |
| D328,942 S | 8/1992 | Igami et al. |
| 5,340,256 A | 8/1994 | Morgan |
| 5,527,451 A | 6/1996 | Hembree et al. |
| 5,553,984 A | 9/1996 | Smith |
| D374,814 S | 10/1996 | Saito |
| 5,699,832 A * | 12/1997 | Burchard ................. E03C 1/04 251/149.6 |
| 5,701,934 A | 12/1997 | Kuran et al. |
| D390,436 S | 2/1998 | Vaagen |
| D390,923 S | 2/1998 | Stevens |
| 5,725,025 A | 3/1998 | Park et al. |
| 5,775,744 A | 7/1998 | Smith, III |
| D398,369 S | 9/1998 | Hayes et al. |
| 5,833,849 A | 11/1998 | Primdahl |
| D404,472 S | 1/1999 | Tickle |
| 5,888,381 A | 3/1999 | Primdahl et al. |
| D408,506 S | 4/1999 | Gottwald |
| 5,890,857 A | 4/1999 | Herrera |
| D410,728 S | 6/1999 | Kurth et al. |
| D413,967 S | 9/1999 | Yuen |
| 5,989,425 A * | 11/1999 | Yonezawa ............ F16K 11/056 210/282 |
| D420,107 S | 2/2000 | Kinder |
| 6,123,837 A * | 9/2000 | Wadsworth ............ B01D 35/04 210/100 |
| D434,834 S | 12/2000 | Goto |
| D435,652 S | 12/2000 | Nazarifar et al. |
| 6,158,936 A | 12/2000 | Thommes |
| D437,919 S | 2/2001 | Chao |
| D438,603 S | 3/2001 | Chao |
| D441,436 S | 5/2001 | Chao |
| 6,258,266 B1 * | 7/2001 | Riback ................. B01D 35/043 210/234 |
| 6,305,724 B1 | 10/2001 | Sampson |
| 6,317,905 B1 | 11/2001 | Slothower |
| 6,322,696 B1 | 11/2001 | McKee et al. |
| D454,615 S | 3/2002 | Neal |
| D457,604 S | 5/2002 | Chen |
| 6,386,596 B1 | 5/2002 | Olson |
| D458,351 S | 6/2002 | Chen |
| D458,352 S | 6/2002 | Chen |
| D458,353 S | 6/2002 | Chen |
| 6,421,849 B1 | 7/2002 | Gray |
| D463,527 S | 9/2002 | Guo |
| 6,616,197 B2 | 9/2003 | Sampson |
| 6,662,822 B2 | 12/2003 | Fuller |
| 6,672,628 B2 | 1/2004 | Thomas et al. |
| D496,094 S | 9/2004 | Stevens |
| 6,797,156 B2 | 9/2004 | Chau |
| D504,809 S | 5/2005 | Sato et al. |
| 6,912,742 B1 | 7/2005 | Wang |
| 6,994,500 B2 | 2/2006 | Ward et al. |
| 7,017,838 B2 | 3/2006 | Schmon |
| D518,555 S | 4/2006 | De Muro, Jr. |
| 7,032,260 B2 | 4/2006 | Hwang |

(56) References Cited

U.S. PATENT DOCUMENTS

| | | |
|---|---|---|
| D521,614 S | 5/2006 | Kitagawa |
| 7,036,752 B1 | 5/2006 | Hsiang |
| 7,112,025 B2 | 9/2006 | Ward et al. |
| D534,796 S | 1/2007 | Falkenburg |
| D538,885 S | 3/2007 | Huang |
| 7,214,314 B2 | 5/2007 | Reyniers |
| D547,828 S | 7/2007 | Huang |
| D554,237 S | 10/2007 | Lewis et al. |
| D561,019 S | 2/2008 | Riedel et al. |
| D568,149 S | 5/2008 | Riedel |
| 7,568,874 B2 | 8/2009 | Riedel et al. |
| 9,004,290 B2 | 4/2015 | Tanner et al. |
| 2002/0136617 A1 | 9/2002 | Imahigashi |
| 2003/0034285 A1 | 2/2003 | Hembree |
| 2003/0082028 A1 | 5/2003 | Winker |
| 2003/0173273 A1 | 9/2003 | Giordano et al. |
| 2004/0042872 A1 | 3/2004 | Ward et al. |
| 2004/0195157 A1 | 10/2004 | Mullins et al. |
| 2004/0231048 A1 | 11/2004 | Sallick |
| 2005/0035054 A1 | 2/2005 | Chu |
| 2005/0072728 A1 | 4/2005 | Chang |
| 2005/0098485 A1 | 5/2005 | Boyd et al. |
| 2006/0013670 A1 | 1/2006 | Sullivan et al. |
| 2006/0032753 A1 | 2/2006 | Hsien |
| 2006/0037656 A1 | 2/2006 | Golan et al. |
| 2006/0037893 A1 | 2/2006 | Warren et al. |
| 2006/0053549 A1 | 3/2006 | Wei |
| 2006/0254971 A1* | 11/2006 | Tubby .................... B01D 27/08 210/235 |
| 2006/0266850 A1 | 11/2006 | Weinberger et al. |
| 2007/0034563 A1 | 2/2007 | Wu |
| 2007/0151021 A1 | 7/2007 | Shieh |
| 2007/0199876 A1* | 8/2007 | Tubby .................. B01D 35/147 210/232 |
| 2007/0227959 A1* | 10/2007 | Sinur .................... B01D 29/96 210/232 |
| 2009/0090661 A1 | 4/2009 | Tanner et al. |

FOREIGN PATENT DOCUMENTS

| | | |
|---|---|---|
| EP | 0947231 | 10/1999 |
| FR | 2826383 | 12/2002 |
| GB | 2034847 | 6/1980 |
| GB | 2109507 | 6/1983 |
| GB | 2160942 | 1/1986 |
| GB | 2269644 | 2/1994 |
| GB | 2421555 | 6/2006 |
| JP | 60241580 | 11/1985 |
| JP | 2000033206 A | 2/2000 |
| JP | 2004322098 A | 11/2004 |
| RU | 2236281 | 9/2004 |
| RU | 2238786 | 10/2004 |
| WO | 0058056 | 10/2000 |
| WO | 2005047754 | 5/2005 |

OTHER PUBLICATIONS

Chinese Office Action dated Aug. 15, 2012, pertaining to Chinese patent application No. 200880105829.0.
Chinese Rejection Decision dated Mar. 19, 2013, pertaining to Chinese patent application No. 200880105829.0.
Office Action dated May 16, 2012 regarding corresponding Canadian patent application No. 2,698,724.
Office Action dated Jun. 14, 2012, regarding corresponding Australian patent application No. 2008296109.
Office Action dated Sep. 7, 2014, pertaining to European Patent Application No. 07 736 064.2.
Office Action dated Apr. 15, 2015, pertaining to European Patent Application No. 08 829905.5.
Written Opinion of the International Search Authority dated Mar. 5, 2010, pertaining to WIPO International Publication No. WO 2009/033048 A3.
Later publication of International Search Report (Search Report starts on p. 3) dated May 22, 2009, pertaining to WIPO International Publication No. WO 2009/033048 A3.

* cited by examiner

| Table 1 | Indicator LED Status as determined by time of use and volume filtered | | | | |
|---|---|---|---|---|---|
| VOLUME (gallons) | > 100 | Solid Red | Solid Red | Solid Red | Solid Red |
| | < 100 | Flashing RED | Flashing RED | Flashing RED | Solid RED |
| | < 80 | Flashing YELLOW | Flashing YELLOW | Flashing RED | Solid Red |
| | < 60 | Flashing GREEN | Flashing YELLOW | Flashing RED | Solid Red |
| | 0 | < 60 | < 75 | < 90 | > 90 |
| | DAYS | | | | |

FIG. 49

APPARATUS AND METHODS FOR FAUCET-MOUNTED WATER FILTRATION SYSTEMS

CROSS-REFERENCE TO RELATED APPLICATIONS

This application is a continuation of U.S. patent application Ser. No. 14/640,683 filed Mar. 6, 2015, which is a continuation of U.S. patent application Ser. No. 12/205,520 filed Sep. 5, 2008, which claims the benefit of U.S. Provisional Application Ser. No. 60/970,150 filed Sep. 5, 2007. This application is related to commonly assigned U.S. Design patent application Ser. No. 29/306,881 filed Apr. 17, 2008 entitled "CONNECTOR FOR A FAUCET MOUNTED WATER FILTER"; Ser. No. 29/306,882 filed Apr. 17, 2008 entitled "A CONNECTOR FOR A FAUCET MOUNTED WATER FILTER"; and Ser. No. 29/305,377 filed Mar. 19, 2008 entitled "THREADED NUT". This application is also related to commonly assigned U.S. patent application Ser. No. 11/446,580 filed Jun. 2, 2006 entitled "NUT FOR ATTACHING TWO DEVICES AND METHOD FOR PROVIDING THE SAME"; and 61/045,858 filed Apr. 17, 2008 entitled "ADAPTOR FOR CONNECTING A FAUCET MOUNTED WATER FAUCET FILTER TO A WATER FAUCET" the disclosures of which are incorporated herein by reference.

FIELD OF THE INVENTION

This patent relates to apparatus and methods for water filtration systems. More particularly, this patent relates to apparatus and methods for faucet-mounted water filtration systems and platforms.

BACKGROUND OF THE INVENTION

Water treatment devices for home and other uses are devices typically incorporated in a water system either in-line or at a terminal end. An example of the former would be an under-the-counter device which filters water prior to reaching a faucet outlet. Exemplary terminal end water treatment devices are countertop and faucet-mounted. Water treatment devices can treat water by the use of mechanical filtration, UV light treatment, or chemical treatment.

In recent years, consumption of water by people has risen due to better health education and other information available to the public. However, public perception of the poor quality and taste of regular tap water has led to the development and sale of a number of products addressing these problems. Various bottled waters have also been made available to consumers to meet this increased demand. Accordingly, a more convenient and cost effective approach for providing enhanced water to the public is needed.

SUMMARY OF THE INVENTION

The present invention is directed to water filtration platforms and systems.

One exemplary embodiment of the present invention includes a faucet-mounted filter platform comprising a body forming a fluid chamber having a water inlet, a quick connect device for mounting the filter system to a water faucet such that the water inlet is placed in fluid communication with the water faucet, a filtered water flow path disposed within the body and in fluid communication with the water inlet, an unfiltered water flow path disposed within the body and in fluid communication with the water inlet, a diverter valve disposed within the fluid chamber and operable to open and close the filtered and unfiltered water flow paths, an actuator engaging the diverter valve to open and close the filtered and unfiltered water flow paths, and a flow meter comprising a flow meter housing connected to the body, the flow meter is positioned outside of the body and in fluid communication with the filtered water flow path. Also, the quick connect device positioned adjacent the water inlet along the body.

Another exemplary embodiment of the present invention includes a faucet-mounted filter platform comprising an upper body, a quick connect device disposed substantially within the upper body and having a water inlet operable to fluidly connect to a water faucet, a lower body connected to the upper body to form a diverter valve chamber, a seal positioned along a circumference of and at the connection between the upper body and lower body, a diverter valve disposed in the diverter valve chamber operable to open and close a filtered water flow path and an unfiltered water flow path, the filtered and unfiltered water flow paths disposed in fluid communication with the diverter valve chamber, and an actuator engaging the diverter valve to open and close the filtered and unfiltered water flow paths without interrupting the seal.

Another exemplary embodiment of the present invention include a faucet-mounted filter system comprising a body forming a fluid chamber having a water inlet, a quick connect device for mounting the filter system to a water faucet such that the water inlet is placed in fluid communication with the water faucet, the quick connect device positioned adjacent the water inlet along the body, a filtered water flow path disposed within the body and in fluid communication with the water inlet, an unfiltered water flow path disposed within the body and in fluid communication with the water inlet, a diverter valve disposed within the fluid chamber and operable to open and close the filtered and unfiltered water flow paths, a seal for sealing the fluid chamber, an actuator engaging the diverter valve to open and close the filtered and unfiltered water flow paths without interrupting the seal, a flow meter comprising a flow meter housing connected to the body, the flow meter is positioned outside of the body and in fluid communication with the filtered water flow path, a filter housing connected to the flow meter housing and comprising a reservoir, and a filter cartridge disposed within the reservoir, wherein the filter cartridge is in fluid communication with the flow meter.

Yet another exemplary embodiment of the present invention includes a diverter valve for a filter system comprising a seal, a first diverter valve operable to open and close a filtered water flow path and a second diverter valve operable to open and close an unfiltered water flow path. The first diverter valve comprises a first outer shell formed integral with the seal and extending from the seal and a first inner core disposed within the first outer shell. The second diverter valve comprises a second outer shell formed integral with the seal and extending from the seal and a second inner core disposed within the second outer shell.

Still yet another exemplary embodiment of the present invention includes a faucet-mounted filter system comprising a body having a first end and a second end, an opening within the first end of the body and operable to receive a male portion of an adaptor, a water inlet coaxially disposed within the opening and operable to fluidly connect to the adaptor when the adaptor is received within the opening, a channel disposed within the first end of the body and circumscribing the opening, a first locking device positioned within the channel and partially around the circumference of the opening, a second locking device positioned substantially opposite the first locking device within the channel and partially around the circumference of the opening, a spring biasing the first and second locking devices into the first positions, an actuator operable to cause the first and second locking devices to move against the force of the spring, an unfiltered water outlet in fluid communication with the water inlet, a filter housing connected to the body, a filter medium disposed within the filter housing and in fluid communication with the water inlet, and a filtered water outlet in fluid communication with the filter medium. The first and second locking devices are movable between respective first positions and respective second positions. The first and second locking devices protrude into the opening when disposed in the first positions.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

FIG. 49 is an exemplary table summarizing a decision matrix of an exemplary microprocessor for determining what color an exemplary LED (indicator) should be when an exemplary filter is used.

Figure 1:
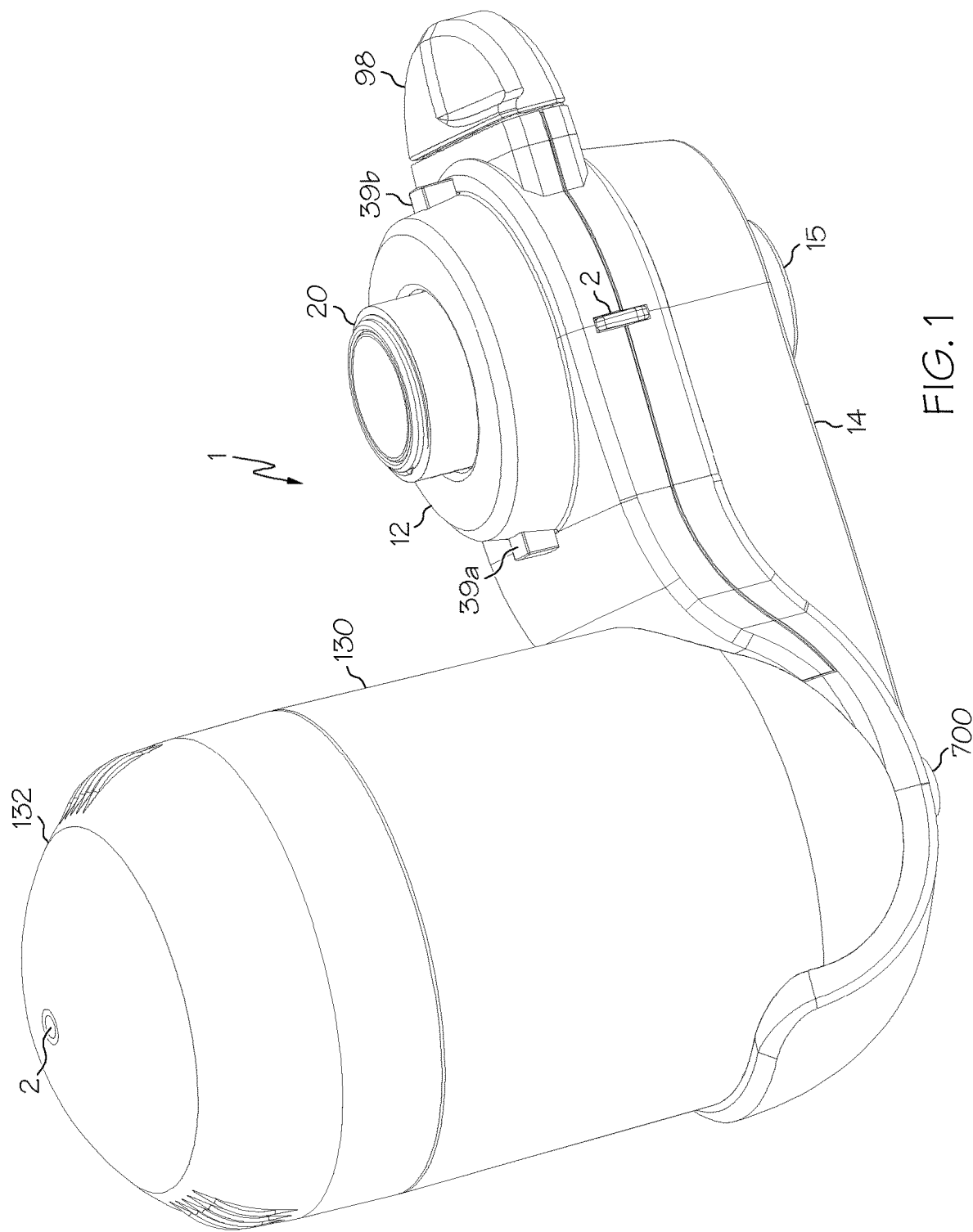
FIG. 1 is a perspective view of an exemplary faucet-mounted water filter system having a vertical orientation according to an embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Referring to FIGS. 1-13, an exemplary embodiment of a faucet-mounted water filter system of the present invention is generally shown as 1. Faucet-mounted filter system 1 ("filter system 1) may comprise a faucet-mounted water filter platform 10 ("filter platform 10"), a filter housing 130 connected to filter platform 10, and a filter cartridge (not shown) disposed within filter housing 130. In this exemplary embodiment, filter housing 130 and the filter cartridge are positioned in a vertical orientation. Filter platform 10 may generally include a body 40, a quick connect device 30, a diverter valve 70, and a flow meter 100. As shown in FIG. 1, filter system 1 may also include an outer housing comprising an upper housing 12 and a lower housing 14, that partially or completely encompass quick connect device 30, diverter valve 70, and flow meter 100.

Upper and lower housings 12 and 14 provide an aesthetic outer shell that is quickly and easily connected to and removed from the filter system, using connection devices and methods as known to one of ordinary skill in the art, including but not limited to bolt and screw connections, snap fit, welds, latches, etc. As such, upper and lower housings 12 and 14 permit the outer appearance (e.g., color, shape, orientation (vertical filter housing or horizontal filter housing), etc.) of filter system 1 to be simply and efficiently changed without having to change the internal functional components such as quick connect device 30, diverter valve 70, and flow meter 100. In addition, the upper and lower housings provide some limited protection to quick connect device 30, diverter valve 70, and flow meter 100 from the elements such as dirt, debris, etc. Upper and lower housings 12 and 14 are not part of the fluid path through filter system 1 and thus provide only an aesthetic appearance and some protection from the elements as described above herein. Lower housing 14 may also comprise an outlet aperture 15.

Figure 14:
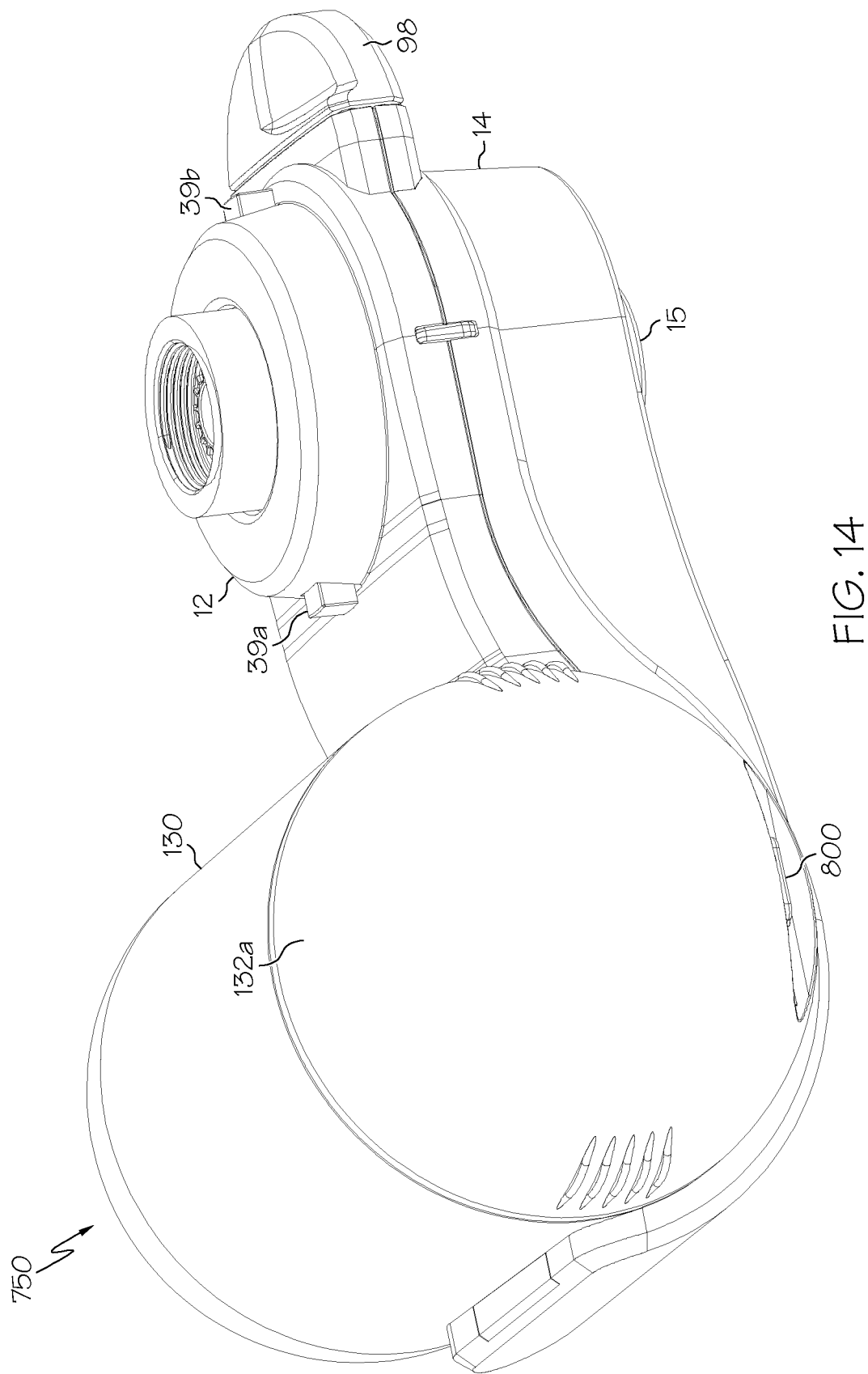
FIG. 14 is a perspective view of an exemplary faucet-mounted water filter system having a horizontal orientation according to an embodiment of the present invention.
Figure 15:
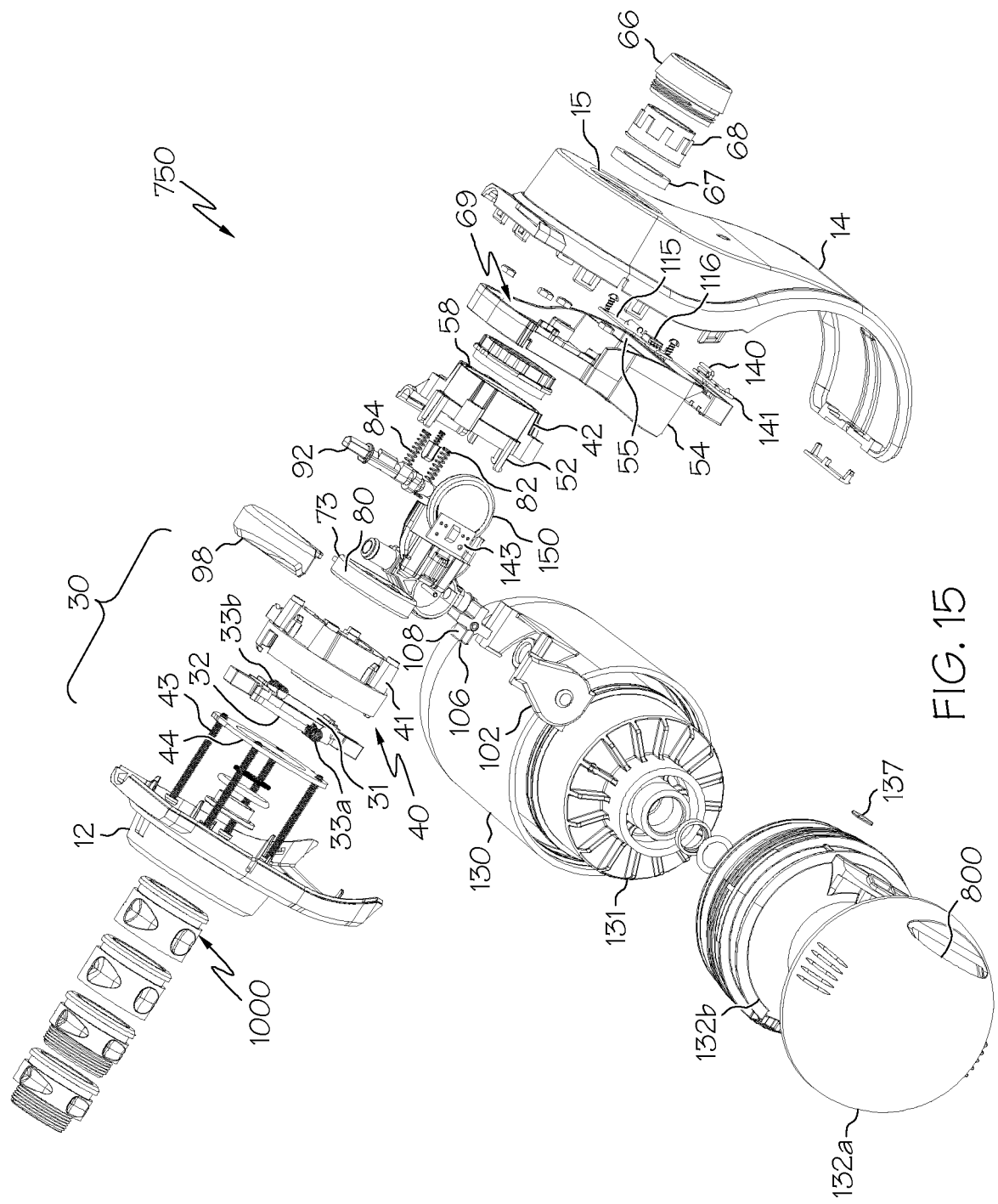
FIG. 15 is an exploded view of the filter system according to FIG. 14.
Figure 16:
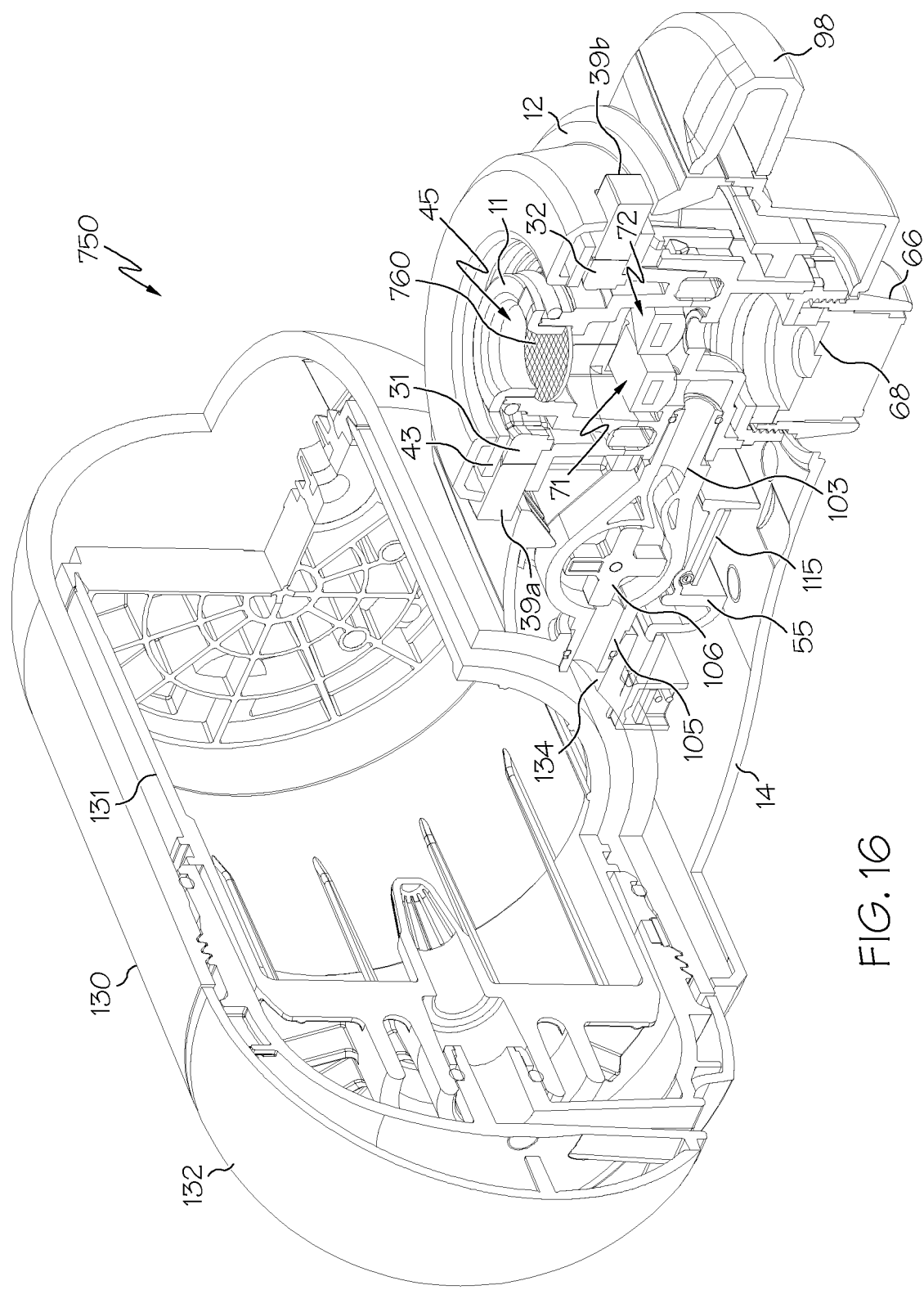
FIG. 16 is a cross sectional view of the filter system according to FIG. 14, wherein the diverter valve is opened for unfiltered flow.

Filter system 1 may be modular in design such that one or more of its components, e.g., filter platform 10, a filter housing 130, the filter cartridge, upper housing 12 and lower housing 14, are removably connected to each other, permitting multiple configurations/design changes and or component replacement without having to do a complete re-design of all of its configuration and/or components with every design change. For example, filter platform 10, as described below herein, is modular such that it enables filter system 1 to have filter housing 130 in either a vertical orientation (FIGS. 1-4) or a horizontal orientation (FIGS. 14-16).

Filter system 1 may also comprise a faucet adaptor 20 as shown in FIGS. 1, 5-7 or alternative exemplary embodiments of faucet adaptor 1000 as shown in FIGS. 2, 15, 25-48. Faucet adaptor 20 may include an annular body 23 having a first end 24 that comprises threading 25, a second end 26 that includes a notch 27, and a fluid channel 28 encompassed by annular body 23. Notch 27 may be annularly disposed about adaptor 20. Faucet adaptor 20 may also include a screen (not shown), aerator (e.g., similar to or the same as aerator 68 shown in FIG. 2 and FIG. 15), or flow channels (e.g., flow channels 1026 shown in FIGS. 25-48) to condition the water stream when the device is removed from the faucet. Faucet adaptor 20 is operable to threadingly engage threads on an end of a water faucet. As shown in FIGS. 5-7 and FIGS. 37 and 43, faucet adaptor 20 is may comprise a first end 24 that includes internal threads 25 that are operable to engage external threads on an end of a water faucet. Alternatively, faucet adaptor 20 may be configured to include a first end 24 that includes external threads that are operable to engage internal threads disposed on a water faucet. (See, e.g., FIGS. 17, 23, 25, and 31). Also, faucet adaptor 20 may optionally include a plurality of angled faces 29 disposed on an inner surface 21 of annular body 23.

Referring to FIGS. 1-12, filter platform 10 may comprise a body 40 partially or completely enclosed within upper and lower housings 12 and 14. Body 40 may comprise an upper body 41, a lower body 42 connected to upper body 41, and a support structure 54 connected to and supporting lower body 42. Body 40 may comprise quick connect device 30 disposed along upper body 41, diverter valve 70 disposed at least partially within lower body 42, and flow meter 100 connected to body 40 (e.g., lower body 42). Body 40, in its design, permits multiple filter housing orientations (e.g., vertical and horizontal orientations) to be connected to it via support structure 54 and flow meter 100. Support structure 54 may provide filter platform 10 the structure to support quick connect device 30, diverter valve 70, upper body 41, lower body 42, filter housing 130, and/or the filter cartridge. Support structure 54 may include a support structure outlet aperture 69 such that when lower body 42 is connected to support structure 54, unfiltered water outlet 58 may extend into and/or through support structure outlet aperture 69. When lower housing 14 is connected onto the filter system, unfiltered water outlet 58 of lower body 42 may extend into and/or through support structure outlet aperture 69 and outlet aperture 15. Support structure 54 may also comprise one or more chambers disposed therein for placing the system electronics within to store and/or protect such electronics. Although body 40 is shown having upper body 41 and lower body 42, it should be understood that body 40, i.e., upper body 41 and lower body 42, may also comprise one integral unit.

Figure 3:
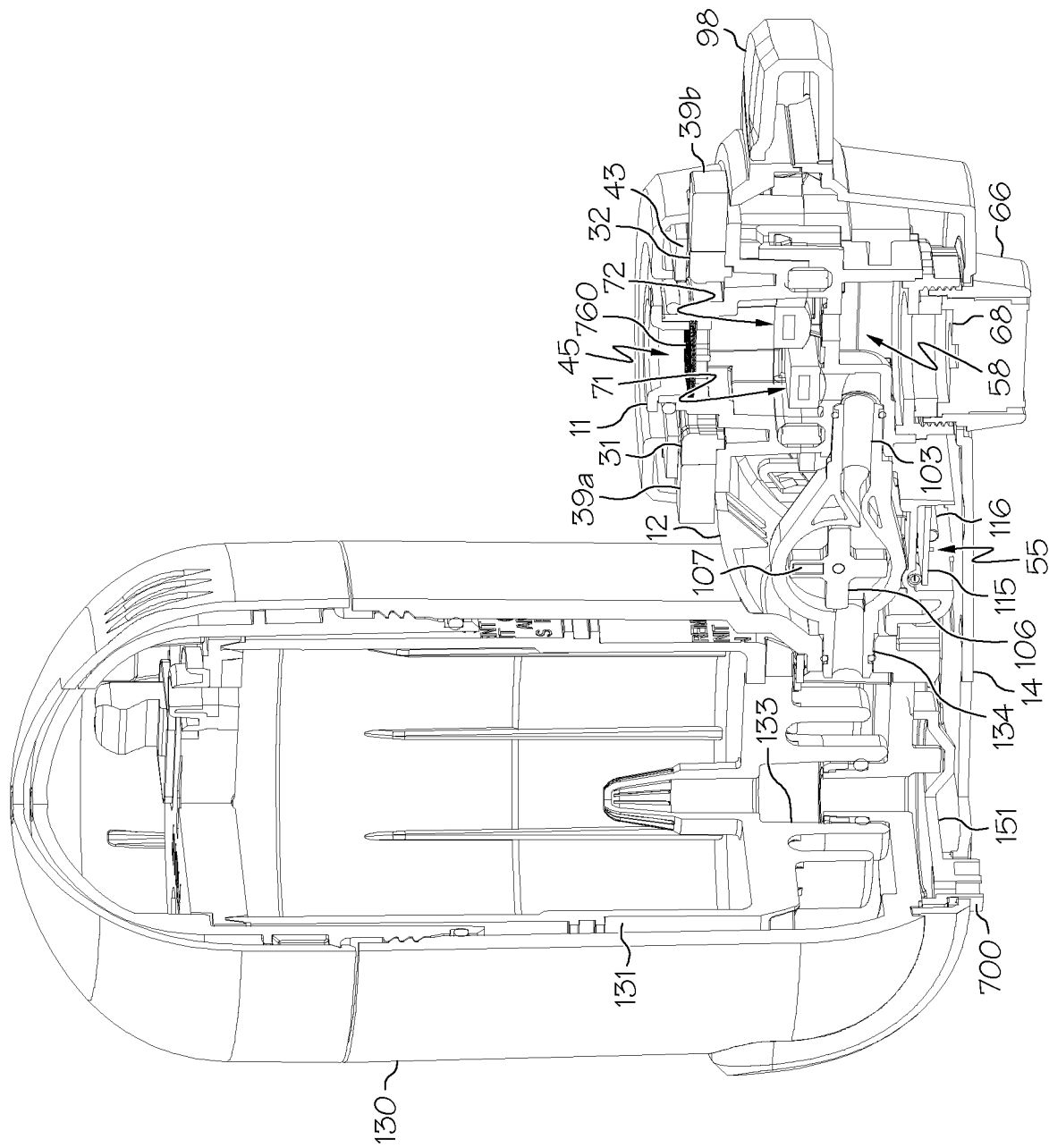
FIG. 3 is a cross sectional view of the filter system according to FIG. 1, wherein the diverter valve is opened for unfiltered flow.

Upper body 41 and/or quick connect device 30 may be operable to connect and mount body 40, filter platform 10, and/or filter system 1 to an end of a water faucet. Upper body 41 may comprise a water inlet 45, a valve chamber upper half 46 in fluid communication with the inlet 45, an annular space 47 disposed within upper body 41 circumscribing inlet 45, a quick connect device 30 positioned within annular space 47, and a seal channel 48 disposed within an end of upper body 41 opposite inlet 45 such that seal channel 48 circumscribes valve chamber upper half 46. Seal channel 48 may be annular. Water inlet 45 may optionally comprise a screen 760 as shown in FIG. 3. Upper body 41 may comprise an o-ring holder 11 that may be inserted into inlet 45 and an o-ring 13 surrounding the circumference of o-ring holder 11 to ensure a proper seal with faucet adaptor 20 when the adaptor is inserted into upper body 41. Also, seal channel 48 is operable to receive a valve chamber seal 73. Inlet 45 may optionally comprise angled faces 59 along its outer surface as shown FIG. 59.

Figure 6:
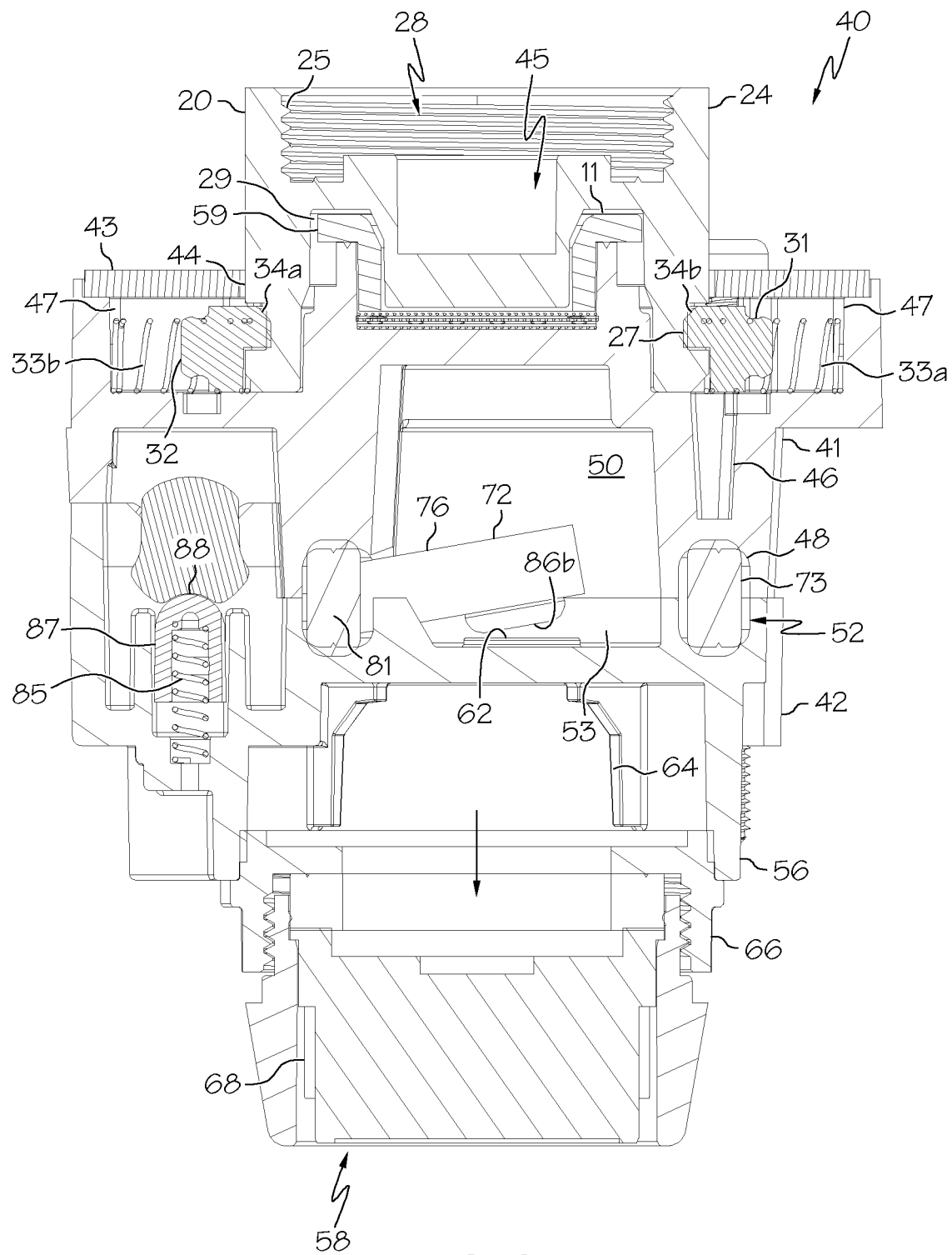
FIG. 6 is a cross sectional view of the filter platform connected to the faucet adaptor of FIG. 5.

In one exemplary embodiment of the filter system that optionally includes angled faces 29 and 59, when faucet adaptor 20 is inserted into upper body 41 (and quick connect device 30) as will be described below herein, angled faces 59 of inlet 45 may engage angled faces 29 of faucet adaptor 20. This engagement of angled faces 59 with angled faces 29 may prevent filter system 1 from rotating about a longitudinal axis L-L on faucet adaptor 20 as shown in FIG. 6. It is understood that although the exemplary embodiments shown in the figures includes the angled faces 29 and 59, these are just optional features and are not required for the present invention. In addition, other non-rotation features may be optionally included with the filter system in place of the angled faces. Other suitable exemplary embodiments of an adaptor are shown and described below herein. (See, e.g., FIGS. 25-48)

Filter platform 10 may also comprise an upper body cover 43 having an aperture 44 therethrough. Upper body cover 43 may be connected to upper body 41 over annular space 47 such that inlet 45 at least partially protrudes into and/or through aperture 44. When upper body cover 43 is placed in its position on upper body 41, aperture 44 is coaxially-aligned with inlet 45. Aperture 44 may comprise a diameter that is at least slightly larger than an outside diameter of inlet 45, thus creating annular opening 49 between upper body cover 43 and the outside diameter of inlet 45. Annular opening 49 is operable to receive second end 26 of faucet adaptor 20 or an end of a water faucet.

As used herein, 'quick connect device' is defined as a device that permits the easy and quick connection and disconnection of a water filter system to and from an end of a water faucet without having to thread and unthread the water filter system to and from the faucet end each time the water filter system is connected and disconnected from the water faucet. Quick connect device 30 may also comprise a first locking device 31, a second locking device 32 opposite first locking device 31, a first spring 33a biasing first locking device 31 into a first position (A), a second spring 33b biasing second locking device 32 into the first position (A), a first actuator 39a, and a second actuator 39b. First and second locking devices 31 and 32 at least partially circumscribe inlet 45 within annular space 47. When biased in first position A, first and second locking devices 31 and 32 are biased inwardly toward inlet 45 such that they partially protrude into annular opening 49. In the exemplary embodiment shown, first and second locking devices 31 and 32 are biased into first position A by respective first and second springs 33a and 33b.

In another exemplary embodiment of the adaptor 20, the adaptor 20 may comprise a plurality of teeth, ridges, raised surfaces, indentations, slits, grooves, or notches (not shown) disposed along an outer surface of the second end 26 adjacent the notch 27. In addition, the first and second locking devices 31 and 32 may comprise a plurality of corresponding teeth, ridges, raised surfaces, indentations, slits, grooves, or notches (not shown) disposed along an inner surface of the first and second locking devices 31 and 32 such that when the first and second locking devices 31 and 32 engage the outer surface of the second end 26, the plurality of teeth, ridges, raised surfaces, indentations, slits, grooves, or notches of the first and second locking devices 31 and 32 lock into engagement with the corresponding plurality of teeth, ridges, raised surfaces, indentations, slits, grooves, or notches of the adaptor 20. The engagement of the plurality of teeth, ridges, raised surfaces, indentations, slits, grooves, or notches prevents the filter system from easily rotating, not rotating at all, around the longitudinal axis L-L on faucet adaptor 20. These surfaces and springs may be configured to only permit rotation of the filter system after a certain specified force is applied to the filter system.

In another alternative exemplary embodiment, the outer surface of the second end 26 and the inner surface of the first and second locking devices 31 and 32 along with the spring force of the first and second springs 33a and 33b may be configured to provide sufficient frictional force to prevent the filter system from easily rotating, or not rotating at all, around the longitudinal axis L-L on faucet adaptor 20. (See FIG. 6). These surfaces and springs may be configured to only permit rotation of the filter system after a certain specified force is applied to the filter system. Thus, such a configuration provides the filter system with an anti-rotation feature, wherein while in general use, the filter system will not rotate about the longitudinal axis L-L, but if accidentally hit it will permit the filter system to rotate (break away) to prevent it from breaking due to an impact force.

Figure 7:
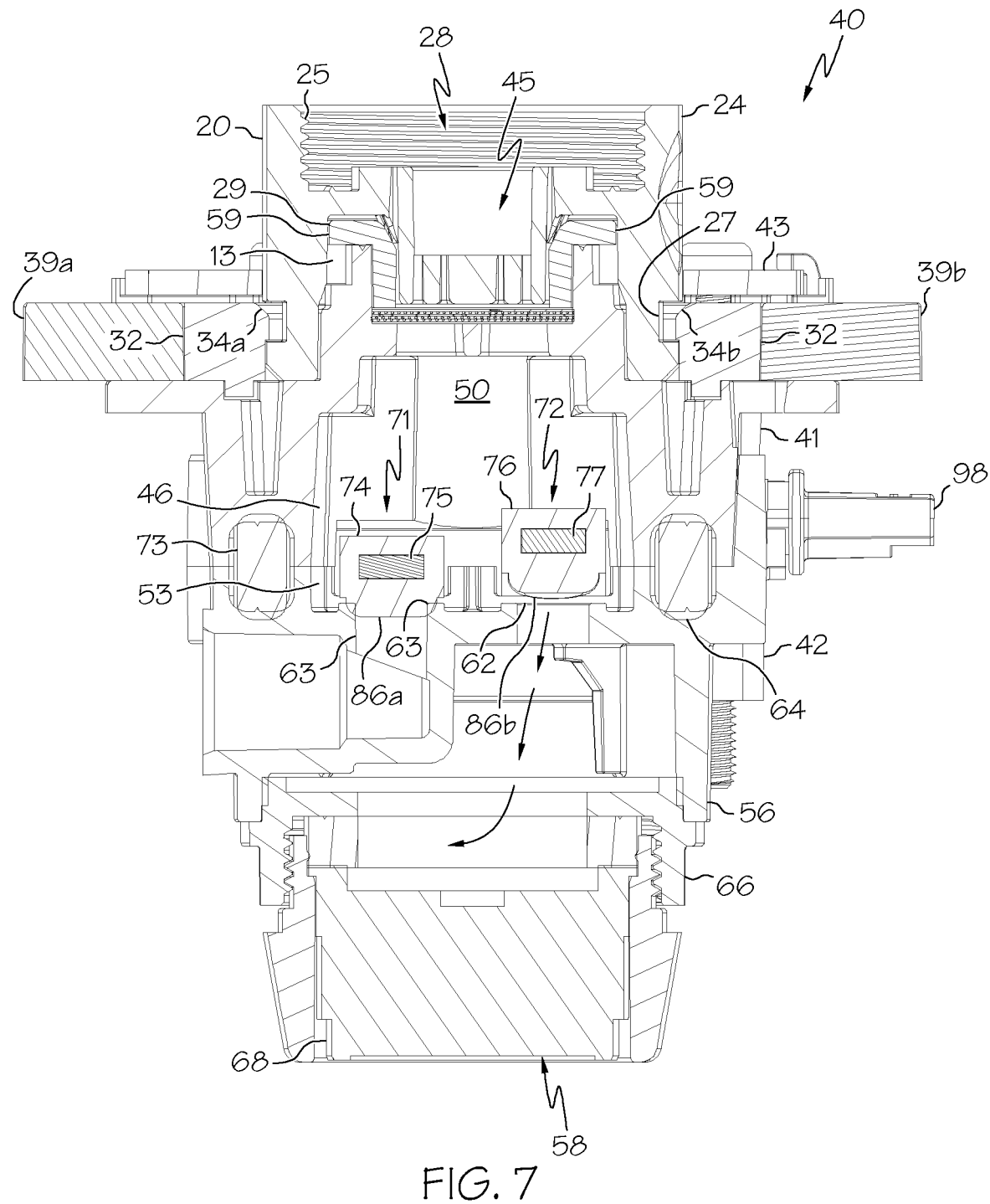
FIG. 7 is a cross sectional view of the filter platform connected to the faucet adaptor of FIG. 5, taken along a line that is perpendicular to the cross section of FIG. 6.
Figure 8:
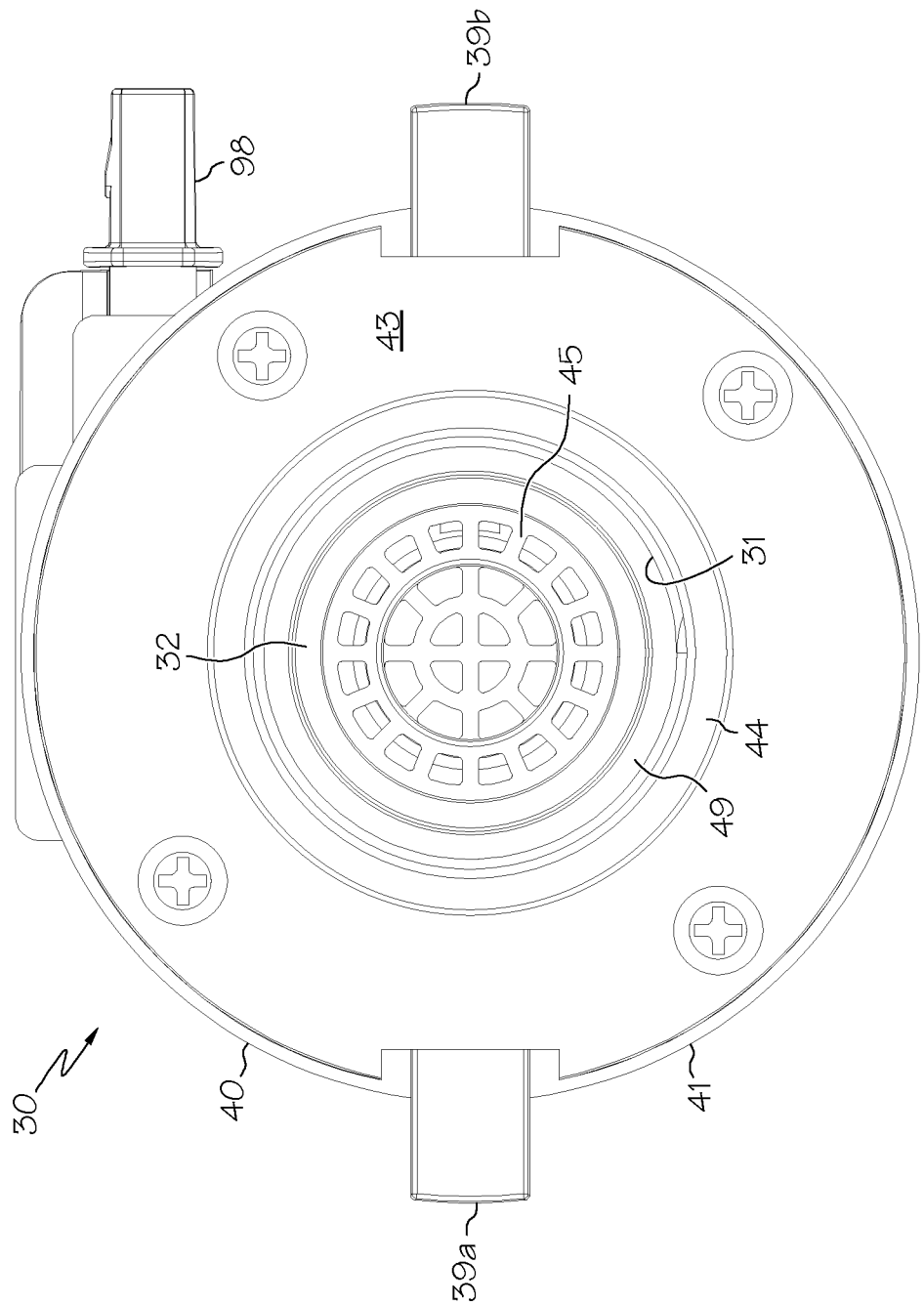
FIG. 8 is a top plan view of an embodiment of an exemplary filter system platform according to an embodiment of the present invention.
Figure 9:
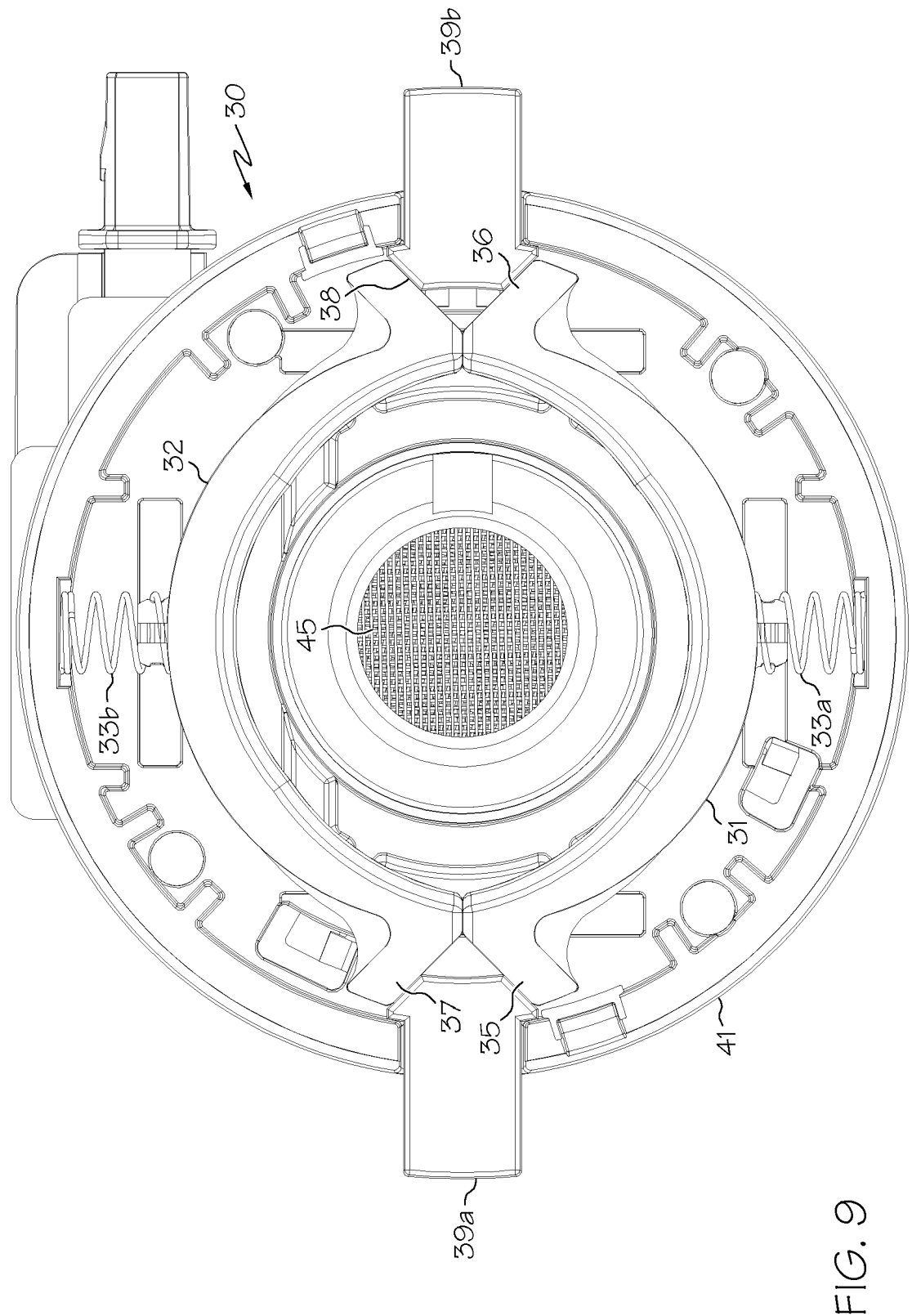
FIG. 9 is a top plan view of the filter system platform of FIG. 8 without the body cover connected to the body of the platform.

Referring to FIG. 9, upper body 41 is shown without upper body cover 43 connected thereon, thus exposing annular space 47 and the orientations of first and second locking devices (31,32), first and second springs (33a,33b), and first and second actuators (39a,39b), respectively. First locking device 31 may include a first cam surface 35 at one end and a second cam surface 36 at an end opposite first cam surface 35. Also, second locking device 32 may include a first cam surface 37 at one end and a second cam surface 38 at an end opposite first cam surface 37. As shown in FIG. 9, first locking device 31 and second locking device 32 are positioned in annular space 47 such that first cam surface 35 of first locking device 31 is adjacent to first cam surface 37 of second locking device 32, and second cam surface 36 of first locking device 31 is adjacent to second cam surface 38 of second locking device 32. As shown in FIG. 7, first actuator 39a may be positioned between the first cam surfaces 35 and 37, and second actuator 39b may be positioned between second cam surfaces 36 and 38.

In operation, when a user pushes inwardly on first and second actuators 39a and 39b, the actuators engage first and second locking devices 31 and 32 moving the first and second locking devices outwardly into a second position within annular space 47. In the second position, first and second locking devices 31 and 32 are positioned such that they do not protrude into annular opening 49, thus permitting first end 24 of faucet adaptor 20 to be inserted into annular opening 49. As first end 24 is inserted further into annular opening 49, first and second locking devices 31 and 32 move adjacent notch 27 of faucet adaptor 20. When the user releases the inward force applied to first and second actuators 39a and 39b, first and second springs 33a and 33b move respective first and second locking devices 31 and 32 inwardly into a first position in notch 27 (the biased position), as shown in FIGS. 5-9. As such, body 40 (and thus filter platform 10 and/or filter system 1) is locked, connected, and/or mounted onto faucet adaptor 20 as shown specifically in FIGS. 6 and 7.

When body 40 and connected filter system 1 are connected to faucet adaptor 20, the filter system produces an audible signal, indicating to a user that the filter system is properly and firmly connected to the water faucet. The audible signal is produced by the first and second locking devices 31 and 32 impacting a surface of notch 27. First and second locking devices 31 and 32 are forced by springs 33a and 33b into contact with the surface of notch 27. As described above herein, faucet adaptor 20 may be connected to an end of a water faucet and thus body 40 may be connected and mounted to the faucet via faucet adaptor 20. It should be understood that quick connect device 30 could be designed to include one spring to bias both first and second locking devices 31 and 32 into the first position as shown in FIGS. 17-18 and 23-24. Alternatively, quick connect device 30 may comprise conventional quick connect devices as known to one of ordinary skill in the art.

First and second locking devices 31 and 32 may also comprise third cam surfaces 34a and 34b, respectively. Third cam surfaces 34a and 34b are operable to engage second end 26 of faucet adaptor 20 as the adaptor is inserted into annular opening 49 and, optionally cause respective first and second locking devices 31 and 32 to move outwardly within annular space 47 into the second position against first and second springs 33a and 33b. In this position, first and second locking devices 31 and 32 permit first end 24 to enter into annular opening 49. As first end 24 is inserted further into annular opening 49, first and second locking devices 31 and 32 move adjacent to notch 27 of faucet adaptor 20 and then caused to move inwardly into notch 27 due to the force of first and second springs 33a and 33b (the first position). When first and second locking devices 31 and 32 are positioned within notch 27, body 40 (and the filter platform 10 and/or filter system 1) is locked, connected, and/or mounted to faucet adaptor 20 as shown in FIGS. 6 and 7.

Referring back to FIGS. 5-7, lower body 42 of body 40 may comprise a lower body first end 51, a valve chamber lower half 53 disposed in lower body first end 51, a lower body second end 56 opposite lower body first end 51, and an unfiltered water outlet 58. A first valve chamber outlet 60 and a second valve chamber outlet 62 may be disposed adjacent each other within valve chamber lower half 53. Lower body 42 may also comprise filtered and unfiltered water channels 63 and 64 disposed therein and in fluid communication with first valve chamber outlet 60 and second valve chamber outlet 62, respectively. Unfiltered water channel 64 places second valve chamber outlet 62 in fluid communication with unfiltered water outlet 58. Filtered water channel 63 operable to connect to or receive a flow meter inlet 103 of flow meter 100, placing first valve chamber outlet 60 in fluid communication with flow meter 100. In the exemplary embodiment shown, flow meter inlet 103 inserts into filtered water channel 63 to place valve chamber 50 in fluid communication with flow meter 100.

Figure 5:
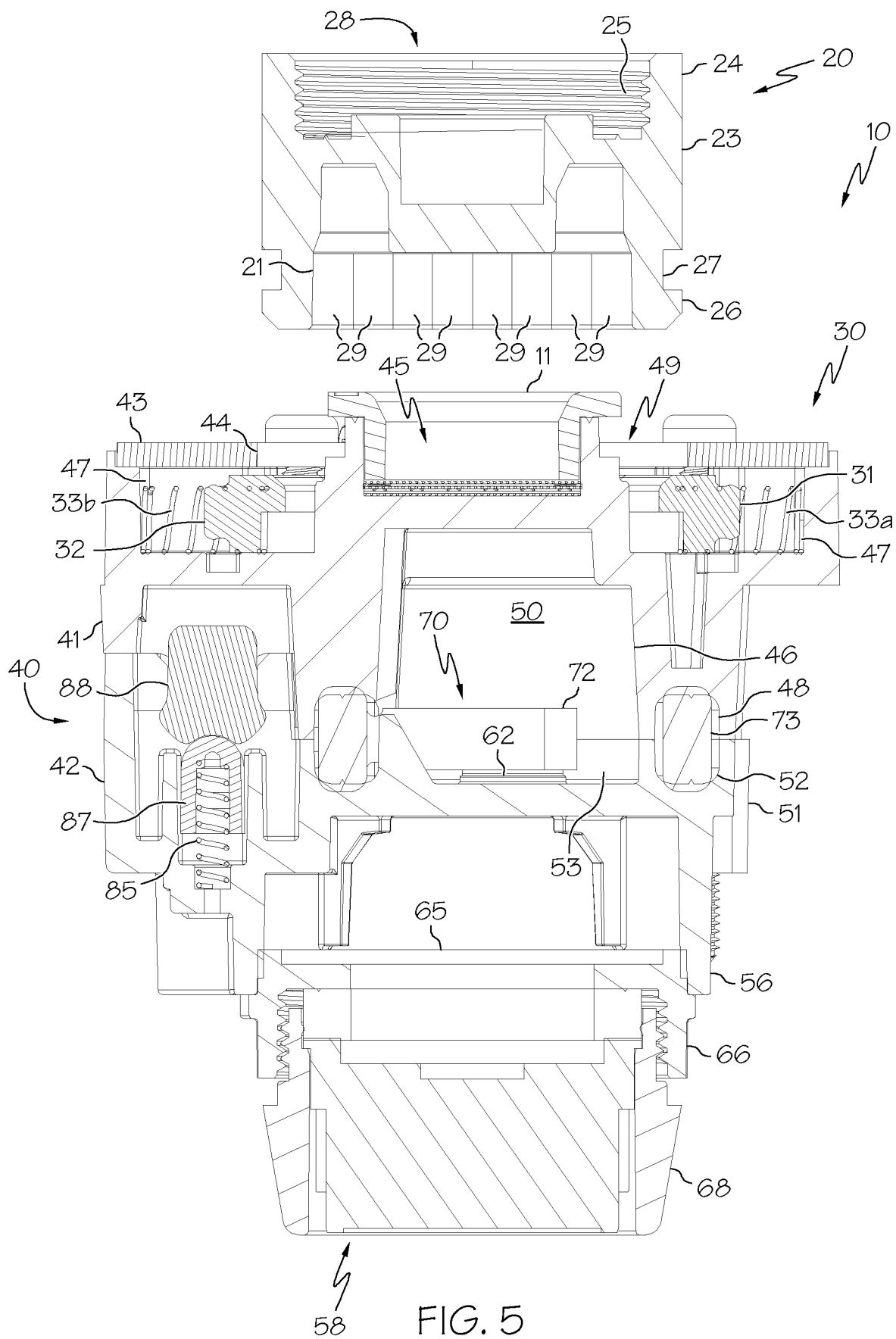
FIG. 5 is a cross sectional view of an exemplary faucet-mounted water filter platform and a faucet adaptor according to an embodiment of the present invention.

A seal channel 52 is also disposed in first end 51 of lower body 42. Seal channel 52 aligns and corresponds with seal channel 48 of upper body 41 such that when upper body 41 and lower body 42 are connected together as shown in FIGS. 5-7, the channels are aligned and operable to hold valve chamber seal 73. Seal channel 52 may be annularly disposed within lower body 42. Valve chamber seal 73 may be an annular seal or o-ring that is positioned within seal channels 48 and 52 to form a seal between valve chamber upper half 46 and valve chamber lower half 53. Valve chamber 50 is formed by the combination of valve chamber upper half 46, valve chamber lower half 53, and valve chamber seal 73. Valve chamber seal 73 may comprise a variety of conventional or yet-to-be developed materials. Exemplary materials that may be used to fabricate valve chamber seal 73 include, but are not limited to, natural rubber, ethylene propylene diene monomer rubber ("EPDM"), nitrile rubber, silicone rubber, elastomeric polymers, or any combinations thereof.

Upper and lower bodies 41 and 42 may be connected to each other using a variety of conventional components and methods, including but not limited to bolt and nut connections, snap-fit, heat seal, welds (e.g., sonic welds, solvent welds), riveting, and clips (e.g., metal or plastic). In addition, as set forth above, the upper and lower bodies may be fabricated as one single and integral unit as known to one of ordinary skill in the art. When combined to form body 40, upper and lower bodies 41 and 42 form a pressure vessel with a fluid flow path from unfiltered water inlet 45 into valve chamber 50 and then splitting into a filtered water flow path (first valve chamber outlet 60 and filtered water channel 63) and an unfiltered water flow path (second valve chamber outlet 62, unfiltered water channel 64, and unfiltered water outlet 58).

As shown in FIGS. 5-7, 10, and 11, diverter valve 70 may comprise a first diverter valve 71 and a second diverter valve 72 that seat on first valve chamber outlet 60 and second valve chamber outlet 62, respectively, to open and close filtered water channel 63 and unfiltered water channel 64, respectively. In the exemplary embodiment, first and second diverter valves 71 and 72 comprise respective first and second inner cores 75 and 77, respectively, and first and second resilient, outer shells 74 and 76, respectively, at least partially encompassing respective first and second inner cores 75 and 77. In the exemplary embodiment, first and second inner cores 75 and 77 may comprise a semi and/or completely rigid material. Exemplary materials that the first and second inner cores may be fabricated from include, but are not limited to, metals such as stainless steel, plated steel, or aluminum, semi-to-rigid plastics, composites such as glass-filled plastics or carbon composites, and any combinations thereof. First and second outer shells 74 and 76 may also comprise respective first and second bevels 86a and 86b along the bottom surface as shown in FIGS. 6 and 7. Exemplary materials that may be used to fabricate first and second outer shells 74 and 76 may comprise resilient materials, including but not limited to natural rubber, EPDM, nitrile rubber, silicone rubber, elastomeric polymers, or any combinations thereof.

In the exemplary embodiment, first and second outer shells 74 and 76 may be fabricated as an integral piece of valve chamber seal 73 as shown in FIGS. 3, 4, 6, 7, and 9-11. In other words, first and second outer shells 74 and 76 and valve chamber seal 73 are injection molded from EPDM as one single (integral) piece as shown in FIGS. 3, 4, 6, 7, and 9-11, wherein first and second outer shells 74 and 76 extend radially inward from valve chamber seal 73. First and second outer shells 74 and 76, each comprise an internal, hollow space having respective first and second entrances 78*a* and 78*b* positioned along an outer circumferential surface 80 of valve chamber seal 73 as specifically shown in FIGS. 10 and 11. Valve chamber seal 73 is positioned within seal channels 48 and 52, when upper body 41 and lower body 42 are connected together, sealing the valve chamber created by valve chamber upper half 46 and valve chamber lower half 53.

Filter platform 10 may also comprise a valve actuator 90 which may include a shaft 92, a detent 88 within shaft 92, a first actuator cam surface 94, a second actuator cam surface 96, and a handle 98 connected to an end of shaft 92. As shown, handle 98 may be rotated to turn/rotate shaft 92. Valve actuator 90 may also include a shaft spring 85 and a spring end cover 87. Shaft spring 85 may be positioned between lower body 42 and shaft 92, and spring end cover 87 may be positioned between an end of shaft spring 85 and detent 88 of shaft 92. First and second actuator cam surfaces 94 and 96 are disposed on opposite sides of detent 88 along shaft 92. Shaft spring 85 and spring end cover 87 are also positioned such that spring end cover 87 is disposed within detent 88 when shaft 92 is in a first position. Shaft 92, first actuator cam surface 94, and second actuator cam surface 96 are all positioned adjacent to and outside of valve chamber 50. Also, first and second actuator cam surfaces 94 and 96 are operable to engage and move first and second diverter valves 71 and 72, respectively, by engaging ends of respective first and second inner cores 75 and 77.

For example, first inner core 75 is positioned such that one end is adjacent to and engageable with first actuator cam surface 94. Second inner core 77 is positioned such that one end is adjacent to and engageable with second actuator cam surface 96. Also, first inner core 75 extends through first entrance 78*a* and into an internal space of first outer shell 74 such that first inner core 75 extends from outside valve chamber 50 (i.e., outside valve chamber seal 73) to inside valve chamber 50 without interrupting valve chamber seal 73. Similarly, second inner core 77 extends through second entrance 78*b* and into an internal space of second outer shell 76 such that second inner core 77 extends from outside valve chamber 50 (i.e., outside valve chamber seal 73) to inside valve chamber 50 without interrupting valve chamber seal 73.

Figure 11A:
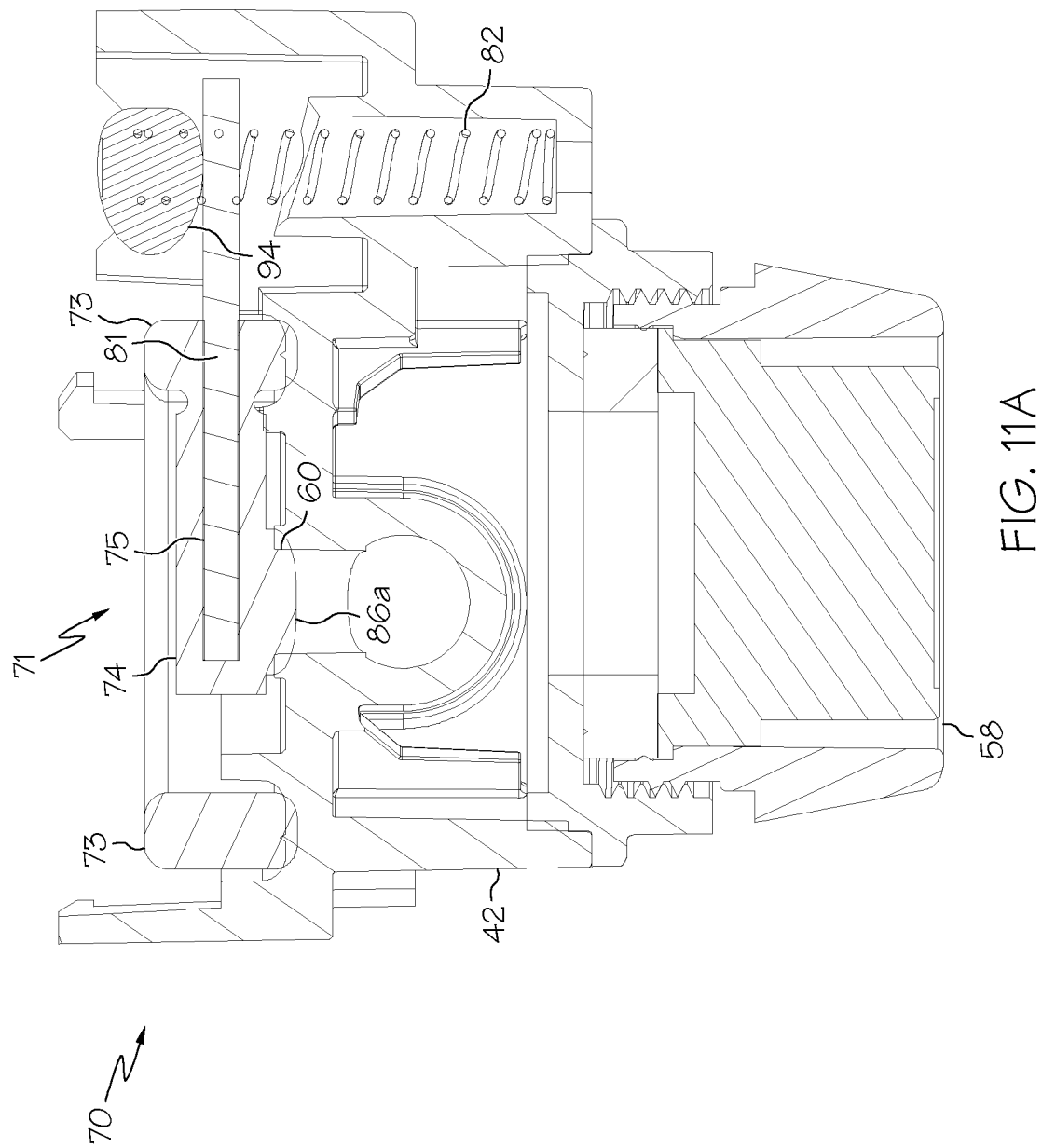
FIG. 11a is a cross sectional view of the lower body taken along A-A' of FIG. 10, wherein the diverter valve is in a closed position.
Figure 11B:
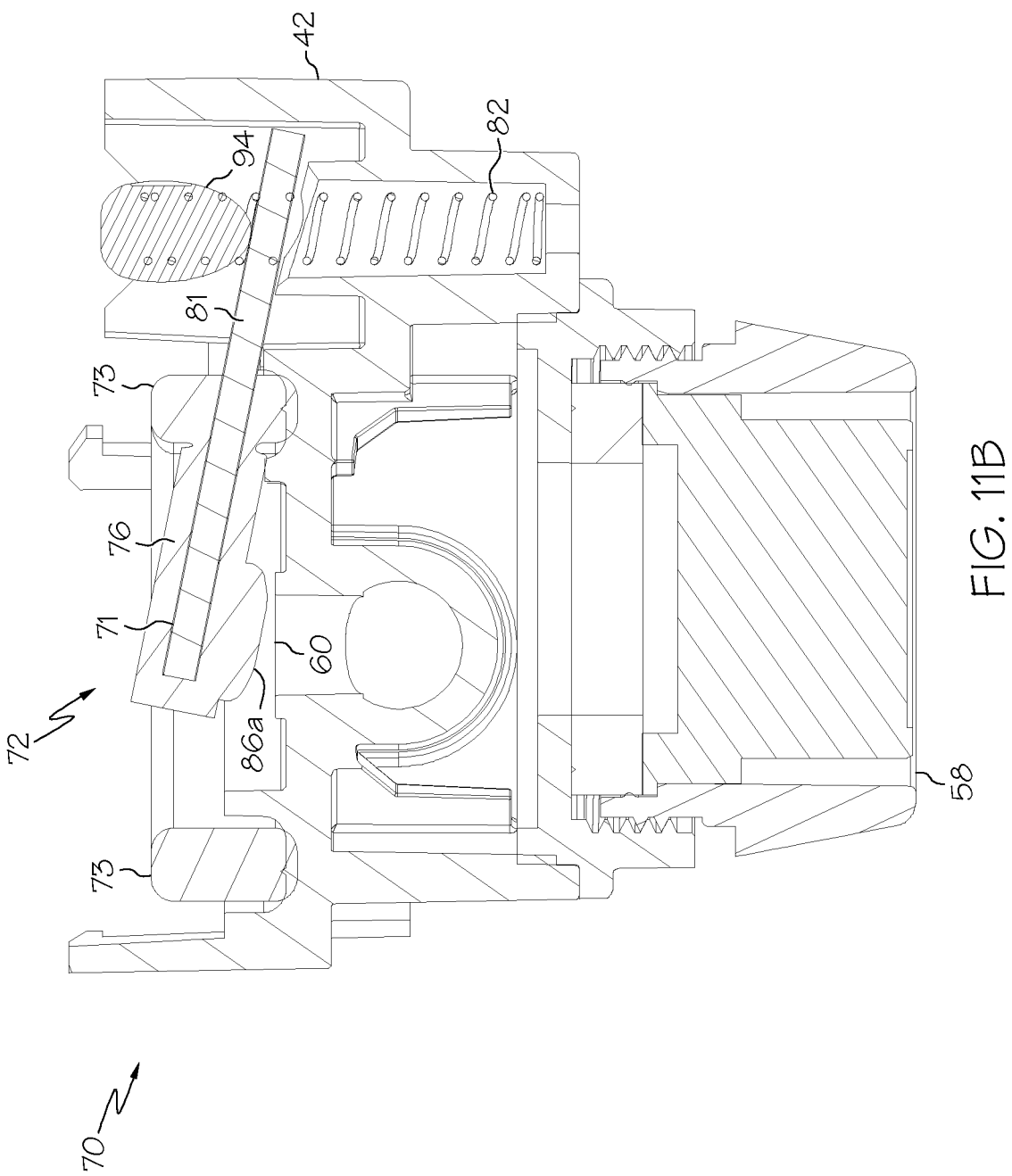
FIG. 11b is a cross sectional view of the lower body taken along B-B' of FIG. 10, wherein the diverter valve is in an open position.

Referring specifically to FIGS. 11*a* and 11*b*, first diverter valve 71 also comprises a first fulcrum point 81 and a first valve spring 82. In the exemplary embodiment, first diverter valve 71 pivots about first fulcrum point 81, which is located at valve chamber seal 73. First valve spring 82 biases first diverter valve 71 such that first inner core 75 pivots on first fulcrum point 81 as shown by arrow A in FIG. 11*a*. The first spring's bias causes the first outer shell's first bevel 86*a* to seat onto and close first valve chamber outlet 60, i.e., first diverter valve 71 is in a normally-closed orientation. (FIG. 11*a*).

Second diverter valve 72 also comprises a second fulcrum point 83 (FIG. 6) and a second valve spring 84. Similar to first diverter valve 71, second diverter valve 72 pivots about second fulcrum point 83, which is located at valve chamber seal 73 as shown in FIG. 6. Second valve spring 84 biases second diverter valve 72 such that second inner core 77 pivots on second fulcrum point 83. The second spring's bias causes the second outer shell's second bevel 86*b* to seat onto and close second valve chamber outlet 62, i.e., second diverter valve 72 is in a normally-closed orientation. In the exemplary embodiment, the first and second fulcrums and respective first and second valve springs are all, optionally, positioned outside of valve chamber 50.

First and second actuator cam surfaces 94 and 96 are oriented on shaft 92 in a ninety degree off-set. When a user rotates shaft 92 ninety degrees in one direction (e.g., clockwise direction), first actuator cam surface 94 engages first inner core 75 causing the first diverter valve 71 to pivot on first fulcrum point 81 against the bias of first valve spring 82. As first actuator cam surface 94 causes first diverter valve 71 to pivot on first fulcrum point 81, the first diverter valve 71 moves away from first valve chamber outlet 60, unseating first resilient, outer shell 74 from the first valve chamber outlet.

First actuator cam surface 94 is designed to reach a stable position, when shaft 92 has been rotated about 90 degrees (e.g., clockwise direction) to provide a user a tactile signal that the valves have been fully opened and/or closed as described above herein. In this position, first diverter valve 71 is in an open position, permitting unfiltered water to flow through first valve chamber outlet 60 into filtered water channel 63. Also, in this position, due to second cam surface 96 not in a position to engage second inner core 77, second diverter valve 72 remains in its normally-closed position over second valve chamber outlet 62. Additionally, when shaft 92 is rotated, spring end cover 87 positioned on an end of moves out of detent 88 creating an audible signal such as a "clicking" sound to indicate to the user that the valves have been fully opened and/or closed as described above herein.

When a user rotates shaft 92 back ninety degrees in the opposite direction (e.g., counter-clockwise direction), shaft 92 causes the reciprocal operations as described above herein to take place. This opposite rotation of shaft 92 will result in first diverter valve 71 to be moved into an open position over first valve chamber outlet 60, and second diverter valve 72 be released back into its normally-closed position over second valve chamber outlet 62. For example, when shaft 92 is rotated ninety degrees in the opposite direction (e.g., counter-clockwise direction), first actuator cam surface 94 disengages first inner core 75 permitting the first valve spring 82 to move the first diverter valve 71 (pivot on first fulcrum point 81) toward first valve chamber outlet 60 back into the normally-closed position, and second cam surface 96 engages second inner core 77 causing the second diverter valve 72 to pivot on second fulcrum point 83 against the bias of second valve spring 84. As second cam surface 96 causes second diverter valve 72 to pivot on second fulcrum point 83, second diverter valve 72 moves away from second valve chamber outlet 62, unseating second resilient, outer shell 76 from the second valve chamber outlet.

Second cam surface 96 is designed to reach a stable position, when shaft 92 has been rotated about 90 degrees in the opposite direction (e.g., counter-clockwise direction) to provide a user a tactile signal that the valves have been fully opened and/or closed as described above herein. In this position, second diverter valve 72 is in an open position, permitting unfiltered water to flow through second valve chamber outlet 62 into unfiltered water channel 64. It is understood that any variety of off-sets may be used. Thus, in this exemplary design, first diverter valve 71 and second diverter valve 72 alternately open and close first and second valve chamber outlets 60 and 62, respectively with the simple rotation of shaft 92. Additionally, when shaft 92 is rotated in this opposite direction, spring end cover 87 moves back into detent 88 creating a audible signal such as a "clicking" sound to indicate to the user that the valves have been fully opened and/or closed as described above herein.

This design of the diverter valves and valve chamber seal is advantageous because it allows the two valves to engage first and second valve chamber outlets 60 and 62 without having to interrupt the valve chamber seal 73. In other words, no moving parts, i.e., the actuator, cams, and/or first and second diverter valves have to penetrate or interrupt valve chamber seal 73 of the valve chamber. As such, the filter platform 10 and/or diverter valve 70 requires no sliding seals in the valve system, i.e., wherein a seal must be made along a moving part such as the valve actuator, other moving parts, or the valve itself.

As shown in FIGS. 2-7, filter platform 10 may optionally include an aerator 68, wherein aerator 68 may comprise an aerator housing 66 and an aerator seal 67. Aerator 68 is inserted into aerator housing 66, and then aerator housing 66 along with aerator 68 is inserted into outlet aperture 15 of lower housing 14. Seal 67 is positioned adjacent to aerator 68, and then aerator 68, aerator housing 66, and seal 67 are inserted into unfiltered water outlet 58. It is understood that other conventional or not yet developed aerators and/or flow conditioners as known to one of ordinary skill in the art may be used in combination with the filter system of the present invention. One exemplary aerator suitable for use with the filter systems herein is aerator model no. 02.8351.0, commercially available from Neoperl of Waterbury, Conn. In an alternative embodiment, filter platform 10 may comprise a flow straightener 65 configured to straighten the unfiltered water stream exiting unfiltered water outlet 58 as optionally shown in FIG. 5.

Figure 12:
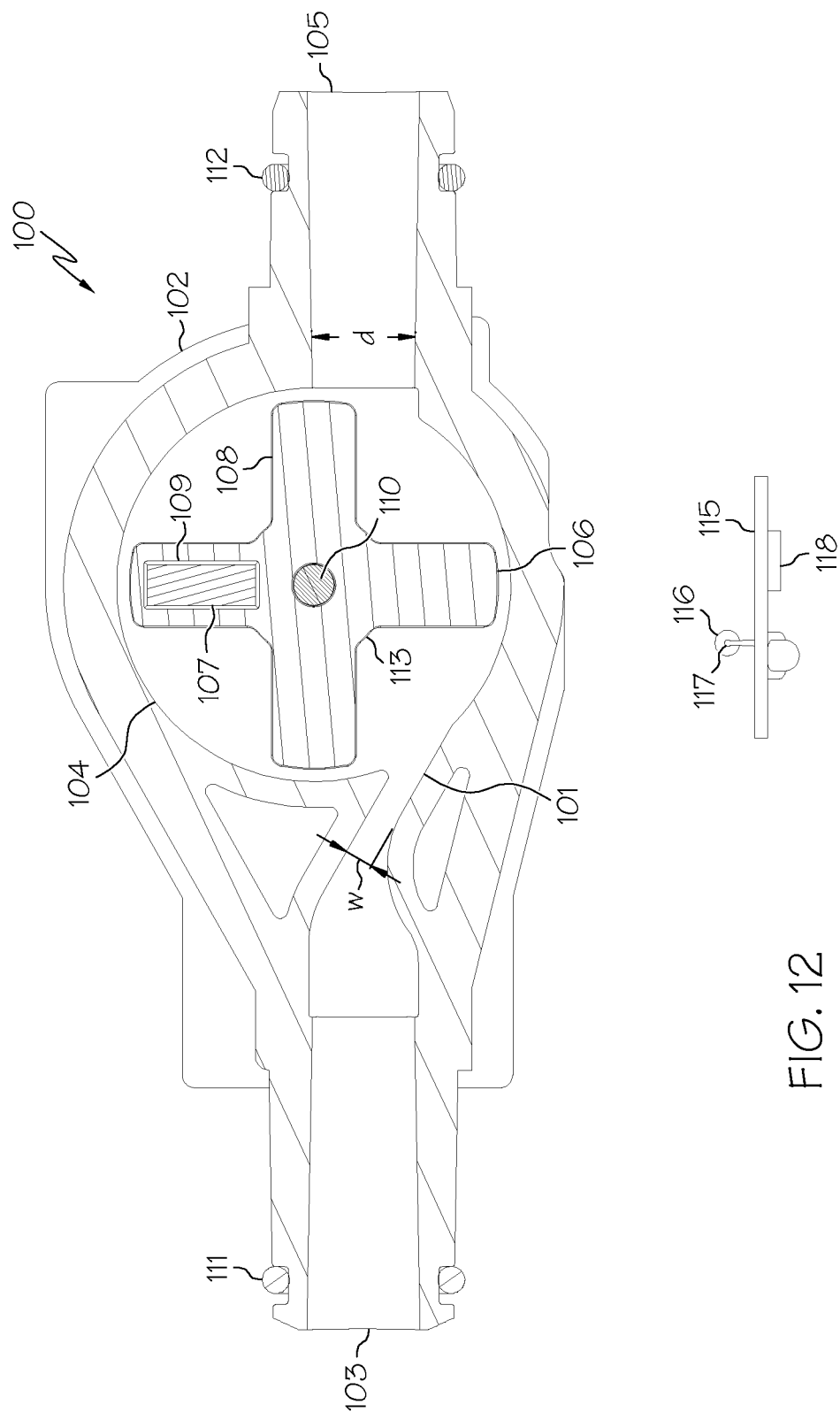
FIG. 12 is a cross sectional view of an exemplary flow meter according to an embodiment of the present invention.

Referring to FIG. 12, filter platform 10 may also comprise a flow meter 100 (e.g., flow totalizer) connected to and in fluid communication with filtered water channel 63. In the exemplary embodiment shown, flow meter 100 may comprise a flow meter housing 102, flow meter inlet 103, a nozzle 101 in fluid communication with flow meter inlet 103, a meter chamber 104 within flow meter housing 102 and in fluid communication with nozzle 101, a flow meter outlet 105 in fluid communication with meter chamber 104, a turbine 106 within meter chamber 104, a signal generator 107 connected to turbine 106, and a signal detector 116.

Figure 10:
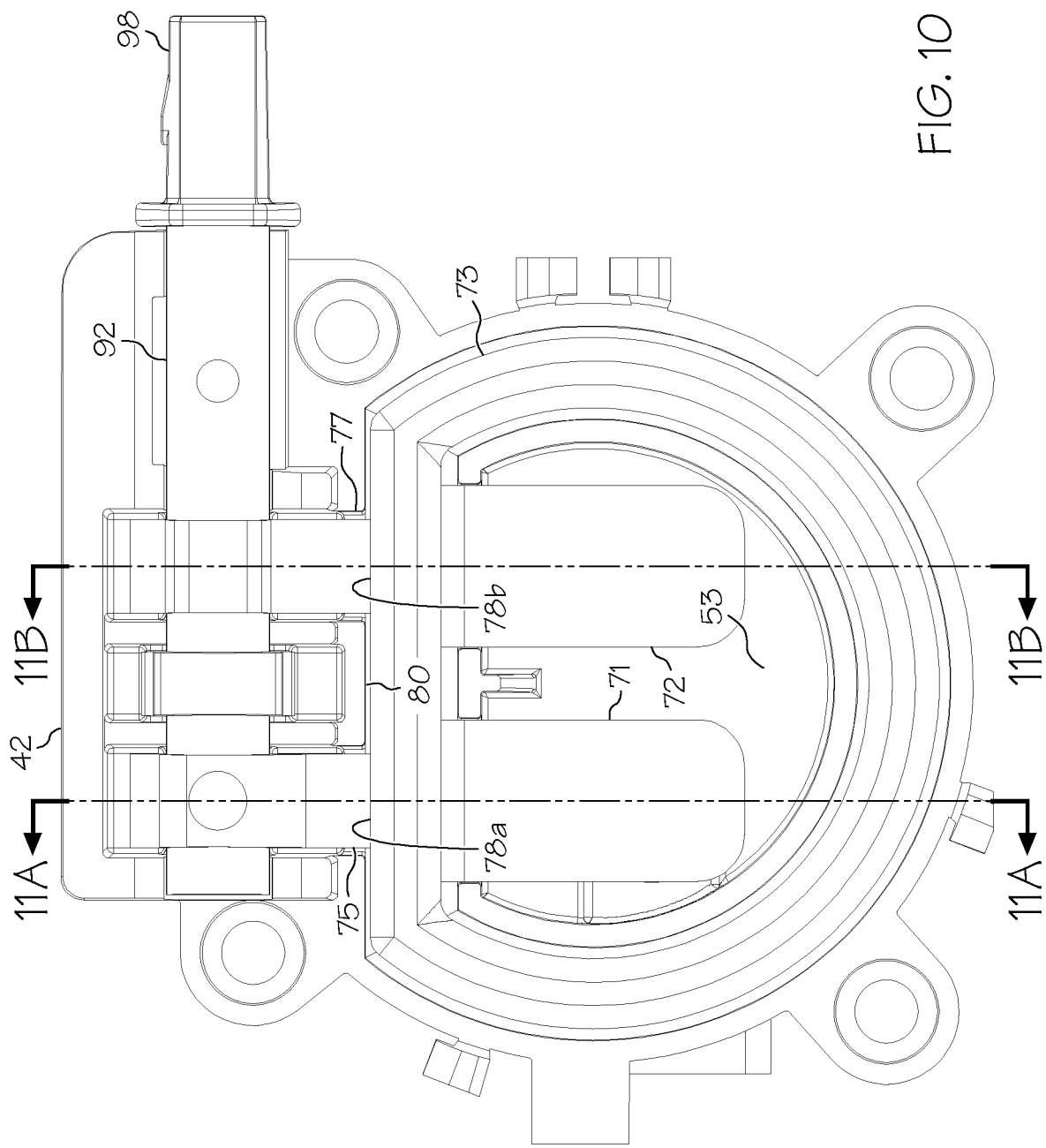
FIG. 10 is a top plan view of an exemplary lower body showing a diverter valve and a valve chamber seal according to an embodiment of the present invention.

Flow meter inlet 103 and flow meter outlet 105 may have a linear configuration as shown in FIG. 10, which is used in the vertical filter housing orientation. Alternatively, the meter housing inlet and/or outlet may have a curved or bent configuration such as a ninety degree bend in order to accommodate different filter system configurations. Flow meter inlet 103 may also comprise a flow meter inlet seal 111. Similarly, flow meter outlet 105 may comprise a flow meter outlet seal 112. Both, flow meter inlet and outlet seals 111 and 112 may comprise an o-ring or any other conventional or yet-to-be determined sealing device as known to one of ordinary skill in the art. Flow meter 100 is connected to body 40 by inserting flow meter inlet 103 into filtered water channel 63, which places flow meter 100 in fluid communication with valve chamber 50.

Nozzle 101 may have a cross section width (w) from about 0.1 mm to about 4.0 mm, from about 0.5 mm to about 2.0 mm, and more particularly from about 0.8 mm to about 1.3 min. Also, flow meter outlet 105 may have a diameter (d) from about 2.0 mm to about 8.0 mm, from about 3.0 mm to about 6.0 mm, and more particularly from about 3.5 mm to about 4.5 mm. Nozzle 101 and flow meter outlet 105 may be designed to include a ratio (w:d) between cross sectional width (w) of nozzle 101 and diameter (d) of flow meter outlet 105 from about 1:20 to about 1:2 and from about 1:6 to about 1:3. This ratio is designed to ensure that the ratio of our theoretical volumetric flow rate and actual flow rate is predictable and repeatable, where "theoretical volumetric flow rate" is defined to mean "turbine spin rate multiplied by swept volume of turbine".

Figure 2:
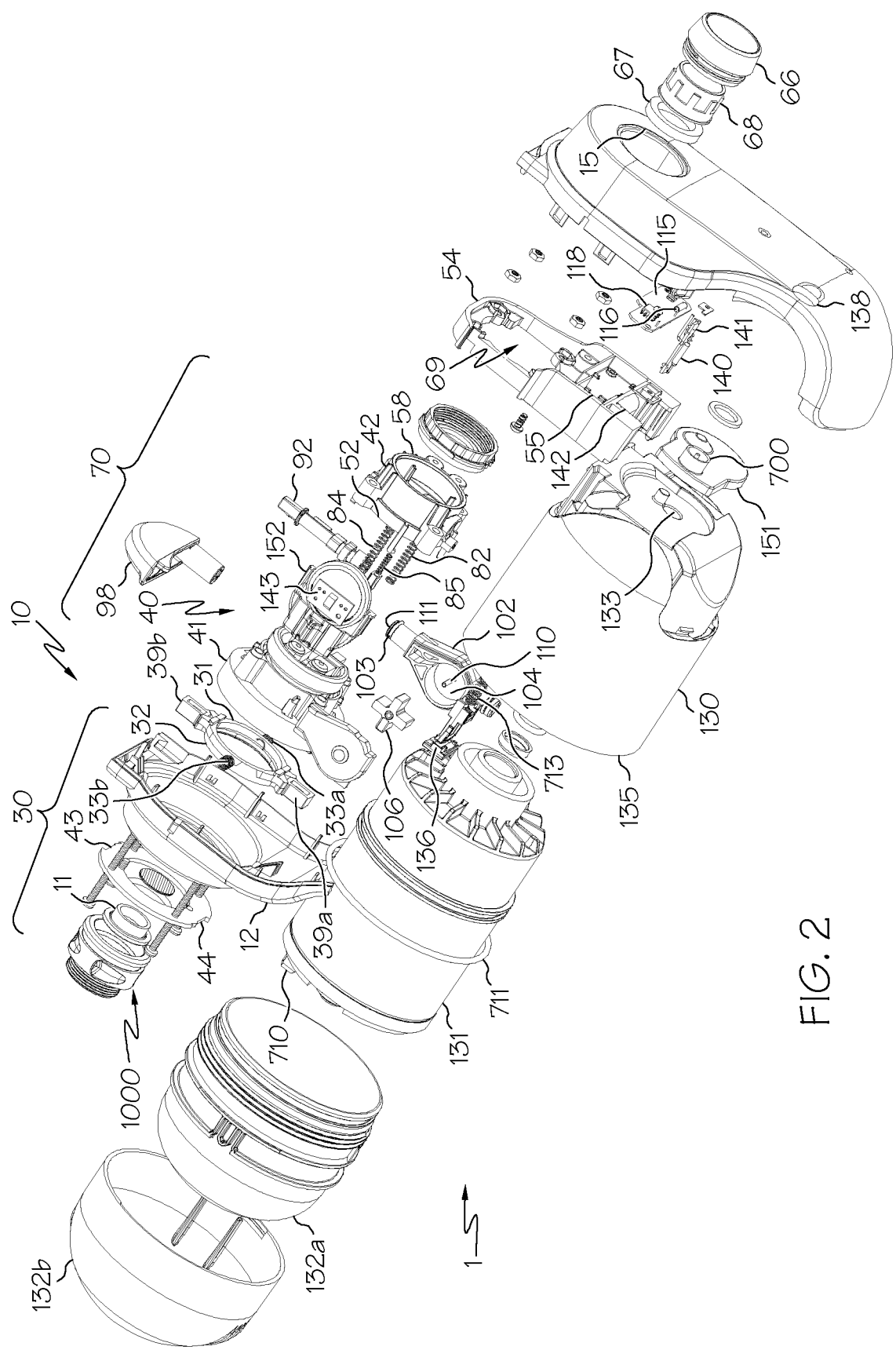
FIG. 2 is an exploded view of the filter system according to FIG. 1.

Turbine 106 may comprise a plurality of turbine blades 108 spaced around the circumference of a hub 113. Turbine 106 may rotate about a rotational axis 114. Hub 113 may also comprise an axle 110 centered thereon and coaxial with rotational axis 114. As shown, the exemplary embodiment comprises four equally spaced blades 108 extending radially from hub 113 and about rotational axis 114. In the exemplary embodiment shown, one of the blades 108 comprises a reservoir 109 disposed therein, wherein signal generator 107 may be positioned within. In addition, turbine 106 may be fabricated from a variety of materials, including but not limited to metals, plastics, composites, and any combination thereof. As shown in FIG. 2, axle 110 is a metal axle insert molded into housing 102. The turbine's hub 113 is inserted onto axle 110. In another exemplary embodiment, hub 113, axle 110, and blades 108 are fabricated from plastic as one integral unit via a plastic molding process, including but not limited to injection molding and/or extrusion molding. Exemplary plastics that may be used for turbine 106 may include, but not be limited to, polycarbonate ("PC"), polyoxymethylene ("POM"), polyphenylene ether-polystyrene ("PPE-PS") blend, polyethylene terephthalate ("PET"), or polypropylene ("PP").

Signal generator 107 may comprise a variety of conventional signal generators as known to one of ordinary skill in the art, including but not limited to magnets, RFID tags, colored stripes (for optical detection), and metal blocks. In one exemplary embodiment, signal generator 107 comprises a magnet that fits within reservoir 109 of one of the blades 108. Signal detector 116 may be positioned outside of meter housing 102 and electrically connected to a main circuit board 115 as shown in FIG. 12. The signal detector may be positioned adjacent to signal generator 107, but outside of meter housing 102. Signal detector 116 may comprise a reed switch as shown in FIG. 12 and known to one of ordinary skill in the art. Reed switch 116 may include a longitudinal axis 117.

As shown in this exemplary embodiment, reed switch 116 is positioned relative to turbine 106 such that longitudinal axis 117 is parallel with and/or aligned with rotational axis 114 of the turbine 106. In the exemplary embodiment shown in FIG. 10, magnet 107 and reed switch 116 may be positioned relative to each other such that when magnet 107 is adjacent to reed switch 116 during the rotation of turbine 106, the magnet's poles (e.g., north pole 119 and south pole (not shown) opposite north pole 119) are also parallel to and aligned with longitudinal axis 117 of reed switch 116. It has been found that this optional alignment of the magnet's poles with the longitudinal axis of reed switch 116 improves the operation and efficiency of the flow meter. It is understood that the flow meter may comprise other relative arrangements of the magnet and reed switch. Other exemplary signal detectors may include, but not be limited to, proximity switches, RFID reader, and optical transmitter-receiver pairs.

The main circuit board 115 may be a printed circuit board assembly as known to one of ordinary skill in the art. The circuit board 115 and reed switch 116 may be positioned within a first chamber 55 disposed within a bottom side of support structure 54 as shown in FIG. 2 and FIG. 12 (illustrating the filter system having a horizontal oriented filter housing 130). In one exemplary embodiment, the first chamber 55, after the main circuit board 115 is positioned therein, is filled with epoxy to provide waterproofing and additional protection to the main circuit board 115 and its components mounted thereon (e.g., a microprocessor, memory, sensors, etc.).

Unfiltered water flows into and through flow meter inlet 103, and nozzle 101 directs the water onto blades 108, causing turbine 106 to rotate on axle 110. The water travels within meter chamber 104 and then exits flow meter outlet 105. As signal generator 107 rotates around the meter chamber 104, signal detector 116 detects each time signal generator 107 passes by (i.e., one rotation of the turbine) and sends a signal to a microprocessor 118 mounted on the circuit board 115. In one exemplary embodiment, signal generator 107 is a magnet, and signal detector 116 is a reed switch. Every time magnet 107 passes by reed switch 116, the magnetic field of the magnet causes the reed switch to operate. When reed switch 116 operates, it sends a signal to the microprocessor.

Microprocessor 118 has been programmed with an algorithm converting the fluid volume equated to each revolution of turbine 106. As such, each operation of the signal detector (i.e., each full rotation of turbine 106), the microprocessor calculates, tracks, and stores the amount (i.e., volume) of water that has passed through flow meter 100 and thus, ultimately through an attached filter cartridge.

Filter system 1 may also comprise one or more indicators 2 such as an LED light electrically connected to the microprocessor. In one exemplary embodiment, indicator 2 may be electrically connected to an indicator circuit board 143 (e.g., a LED printed circuit board assembly), which, in turn, may be electrically connected to microprocessor 118. (See, e.g., FIG. 2). Indicator 2 may be connected to filter platform 10, upper housing 12, lower housing 14, filter housing 130, or support structure 54. In one exemplary embodiment, indicator circuit board 143 may be disposed within upper and lower housings 12 and 14, adjacent filter platform 10 as shown in FIG. 2. Again, the indicator printed circuit board may be covered in epoxy to protect it from water damage if desired.

When the first amount of water begins to flow through the flow meter 100, the signal detector detects the rotation of turbine 106 (i.e., signal detector 107) and signals this flow to the microprocessor. In response to this signal, microprocessor 118 operates indicator 2 (e.g., light up a green LED) to provide a user a first signal. The first signal indicates to the user that filter system 1 is in operation. After water has flowed for three seconds, microprocessor 118 stops operating indicator 2 (e.g., turns off the green LED). This is done to conserve battery power. Each time the filtered water flow is stopped and re-started, indicator 2 operates for another three seconds.

After a certain volume of water has passed through (i.e., been filtered by) the filter cartridge, the filter cartridge no longer operates effectively, i.e., it is removing or absorbing less contaminants, particulates, odors, microorganisms, and other undesirable items, than what is desired or required. The specific volume of water beyond which the filter no longer operates effectively, is considered the filter cartridge's volumetric useful life. When this specific volume of water has passed through the filter, the filter cartridge has met and/or exceeded its useful life.

It is desirable to signal to the user when the filter cartridge has almost met or achieved its useful life. Thus, microprocessor 118 may be programmed to operate indicator 2 to provide a user a second signal (e.g., light up a yellow LED) when a filter cartridge has reached a specific threshold of its volumetric useful life such as about 60% of its volumetric useful life. In other words, microprocessor 118 may be programmed to cause the indicator to display the second signal when 60% of the volumetric useful life has passed through the filter. When the indicator operates the second signal at about 60% of the volumetric useful life, it signals to a user that the filter will need to be changed soon.

Alternately, a filter cartridge's useful life may be calculated based upon a period of time that transpires before the filter no longer operates effectively. This time period may be considered a filter cartridge's time-based useful life. In such an exemplary embodiment, microprocessor 118 may be programmed to operate indicator 2 to provide a user the second signal after a set amount of time has expired such as when about 67% of the filter cartridge's time-based useful life has transpired. In one example, filter system 1 may comprise a timer that tracks the total amount of time that has transpired since the filter cartridge was last replaced, i.e., timer reset. The time may be integral within the microprocessor or a separate component. The timer may be reset, either manually or automatically, every time the filter cartridge is replaced. The timer may also track the cumulative time that has transpired since the first operation of the filter system. When tracking the cumulative time, both the second signal threshold time and time-base useful life may be based upon the tracked cumulative time for each successive filter cartridge and replacement cartridge.

In addition, microprocessor 118 is programmed to also operate indicator 2 to provide a user a third signal (e.g., operate a blinking red LED). The third signal may be configured to signal to the user (e.g., via a blinking LED) that the filter cartridge is approaching its useful life (volumetric and/or time-based useful life), and should be changed immediately. Finally, the microprocessor may be programmed to operate indicator 2 to provide a user a fourth signal to indicate that the filter cartridge has reached its useful, volumetric or time-based, and should be changed immediately. To signal this, the microprocessor may cause the indicator 2 (e.g., blinking red LED) to change to another signal such as a solid red LED. At this end of useful life of the filter cartridge, the microprocessor may also be programmed to operate the diverter valve or other mechanisms to prevent any further fluid flow through filter system 1. Also, it is understood that more than one indicator may be used to provide the signals to the user, as well as more than the three exemplary signals described herein may be used. Microprocessor 118 may comprise any conventional microprocessor unit as known to one of ordinary skill in the art. One exemplary microprocessor may comprise a microprocessor commercially available from Sonix Technology Co. of Chupei City, Taiwan, model/catalog number SN8P2501B.

Microprocessor 118 may use a combination of time and volumetric flow to determine what color the LED (indicator 2) should be when the filter is used. FIG. 49 is an exemplary Table 1 that summarizes the decision matrix. For example, if the filter cartridge has been in the device for 55 days and has filtered 70 gallons (265 liters), the LED will flash yellow. If the filter cartridge has been in the device for greater than 90 days, the LED will light solid red no matter how many gallons have been filtered.

Filter platform 10 may also comprise a battery housing 152 connected to support structure 54 and a battery 150 stored within the battery housing. Battery 150 may be electrically connected to one or more of the components of the filter system, including but not limited to indicator 2, the microprocessor, signal generator 107, the signal detector, and/or diverter valve 70. In the exemplary embodiment shown, battery 150 is electrically connected to microprocessor 118 and indicator 2. One exemplary battery that may be used in filter platform 10 comprises a standard lithium coin cell battery commercially available from Energizer of St. Louis, Mo., model/catalog number CR2430.

Figure 4:
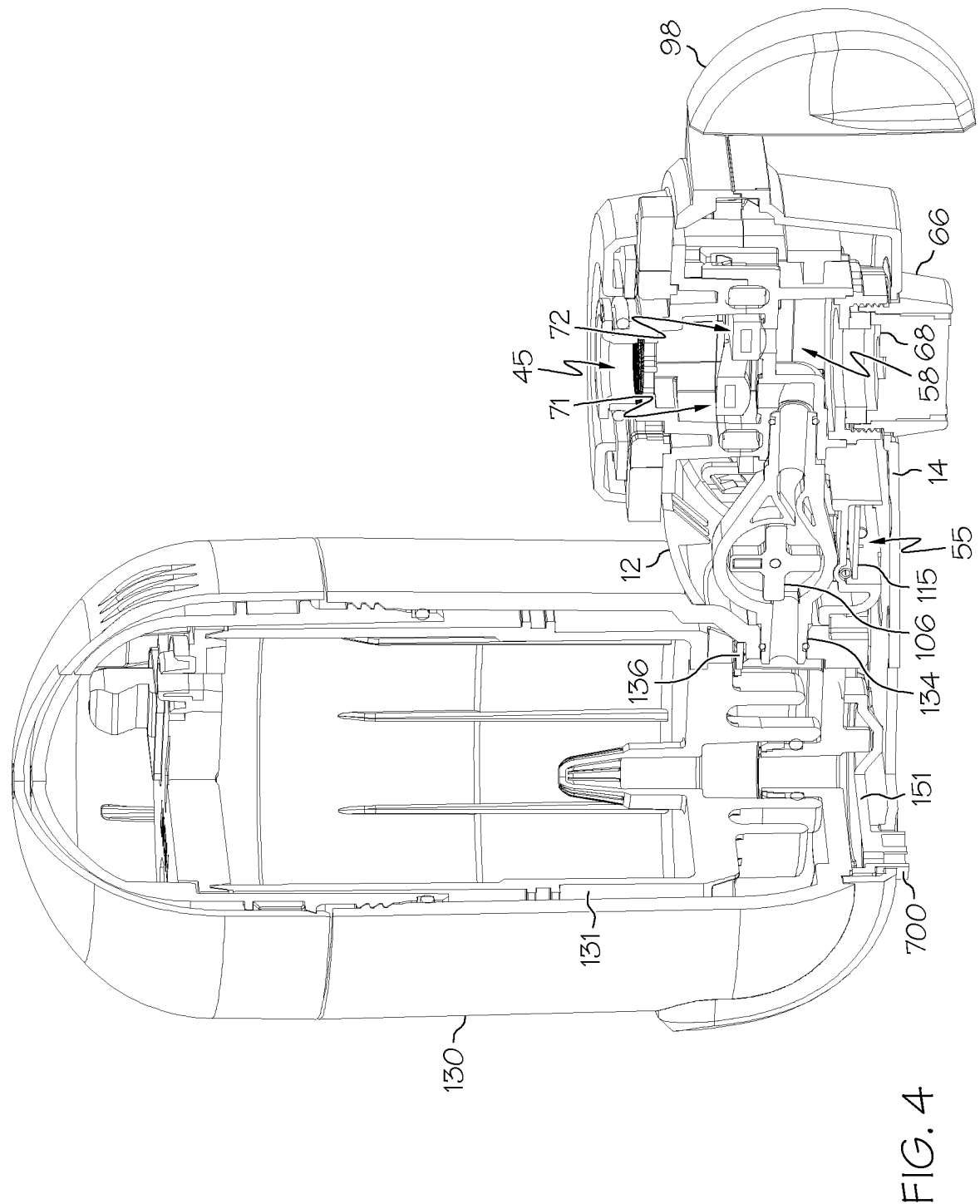
FIG. 4 is a cross sectional view of the filter system according to FIG. 1, wherein the diverter valve is opened for filtered flow.
Figure 13:
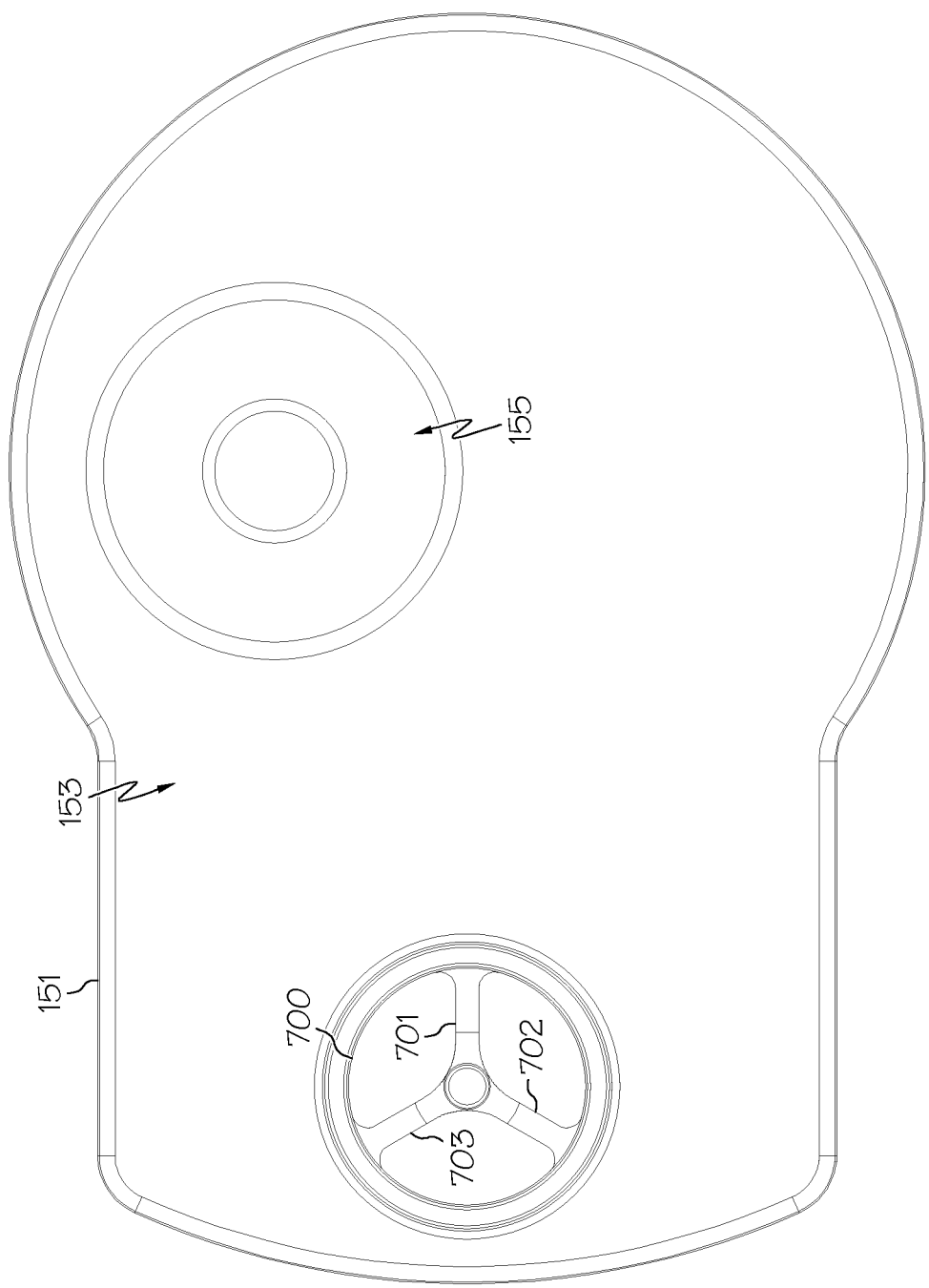
FIG. 13 is a top plan view of an exemplary flow diverter and nozzle device according to an embodiment of the present invention.

In addition, filter system 1 may further comprise filter housing 130 connected to body 40 (e.g., support structure 54), a filter cartridge 131 disposed within a reservoir 135 of filter housing 130, and a pressure vessel cap 132a connected to filter housing 130 to form a pressure vessel to contain filter cartridge 131 as shown in FIG. 2. Optionally, filter system 1 may also comprise an outer housing cap 132b. It is understood that pressure vessel cap 132a and outer housing cap 132b may be combined into a single integral unit. Filter housing 130 may comprise a housing outlet 133 and a flow diverter 151 connected to and in fluid communication with filter housing 130, wherein the filtered water exiting filter cartridge 131 exits into flow diverter 151. As shown in FIG. 13, flow diverter 151 may include a reservoir 153 and an indentation 155 that is adjacent to housing outlet 133 when flow diverter 151 is positioned on and connected to filter housing 130. As shown in FIGS. 2, 3, and 4, flow diverter 151 may redirect the filtered water stream from housing outlet 133 within the inner portion of the filter housing to filter water outlet 138 positioned on an outer edge of lower housing 14.

Flow diverter 151 also may include a nozzle 700 that is in fluid communication with the reservoir, and ultimately, housing outlet 133. Nozzle 700 may comprise flow directors (e.g., flow directors 701, 702, and 703), which optionally may be positioned in a radial orientation. It is understood that nozzle 700 may comprise any number of flow directors in any number of configurations as known to one of ordinary skill in the art. Nozzle 700 may comprise any number of conventional nozzles known to one of ordinary skill in the art. Flow diverter 151, in an alternative embodiment, may not include a nozzle.

Filter housing 130 may be connected to support structure 54 using a variety of connection devices and methods as known to one of ordinary skill in the art, including but not limited to bolt and nut connections, welds (e.g., sonic welds), snap fit connections, adhesives, etc. Alternatively, filter housing 130 may be connected to lower body 42, thus enabling filter platform 10 to not comprise support structure 54. As shown in FIGS. 1-4, filter housing 130 is connected to body 40 in a vertical orientation such that filter housing 130 and the filter cartridge are position adjacent to a water faucet when attached and mounted to the faucet.

A filter housing inlet 134 is in fluid communication with flow meter outlet 105, placing the filter cartridge in fluid communication with flow meter 100 as shown in FIGS. 3 and 4. Flow meter outlet 105 is inserted into filter housing inlet 134 and such connection is sealed by flow meter outlet seal 112. The unfiltered water flows from flow meter outlet 105 into filter housing 130 via filter housing inlet 134 and through the filter cartridge. Once the water passes through the filter cartridge, the water is filtered and exits filter system 1 from a filtered water outlet 138.

Filter housing 130, in the exemplary embodiment shown, filter cap 132 may threadingly engage filter housing 130 to form a pressure vessel. The filter cap 132 may also comprise an outer aesthetic surface. The filter cap 132 may also comprise a cap tab (not shown) that projects from an inside surface of the cap 132. The cap tab is positioned such that as the filter cap 132 is threaded onto the filter housing 130, the cap tab engages a respective cartridge tab 710 that extends from the filter cartridge, and causes the filter cartridge to move into its proper alignment within the filter housing 130. In addition, the cap tab engagement with the cartridge tab may also assist in breaking the seal of an o-ring filter seal 711 on filter cartridge 131 as shown in FIG. 2. It is understood that the filter cap 132 may be connected to filter housing 130 by other means as well such as, for example, snap-fit, latch, quarter thread, key and keyhole, or other conventional connections.

In the exemplary embodiment shown in FIG. 2, filter system 1 may also comprise a reset magnet 136 positioned within filter housing 130 disposed along a bottom wall 144 of the housing, which is spring biased upwardly by reset spring 713, and a reset reed switch 140 positioned adjacent to the reset magnet 136. The reset reed switch may be in electrical communication with and mounted on a reset circuit board 141, which, in turn, is in electrical communication with main circuit board 115. The reset reed switch and the reset circuit board 141 may be positioned within a third chamber 142 disposed within the bottom of support structure 54 as shown in FIG. 2. The third chamber 142 may be filled with epoxy to provide additional protection and waterproofing for reset reed switch 140 and reset circuit board 141.

In this configuration, when a used filter cartridge is removed from filter housing 130, reset magnet 136, due to its upward spring bias, will move into an up position. When a replacement filter cartridge 131 is positioned into filter housing 130 and onto reset magnet 136, the filter cartridge pushes reset magnet 136 downward into is down position. This movement of reset magnet 136 from its up position to its down position causes the reed switch to operate, which, in turn, signals microprocessor 118 and/or the timer to reset the volumetric flow and/or elapsed time to zero (0)). Thus, every time cap 136 is removed to replace the used filter cartridge with a new one, the volumetric flow and/or time is reset back to zero (0).

Filter cartridge 131 may comprise a variety of commercially available filter cartridges, including but not limited to commercially available filters such as, for example, PUR Plus Filter and PUR Ultimate Filter, which are commercially available from The Procter & Gamble Company, Cincinnati, Ohio. Such filter cartridges may comprise carbon block having either axial or radial flow as known to one of ordinary skill in the art. The filter cartridge may also comprise an outer wrap such as a sediment wrap made from a variety of materials, including but not limited to woven and non-woven substrates made of polyolefin fibers, glass fibers, polypropylene, and cellulose, as known to one of ordinary skill in the art. Exemplary filter materials and cartridges that may be used with the present invention may include, but are not limited to, those shown and described in the following co-pending and commonly assigned U.S. application Ser. Nos. 09/832,581; 09/935,962; 09/935,810; 10/464,209; 10/464,210; 10/643,669; 10/665,948; 10/705,572; 10/705,174; 10/771,778; 10/840,578; or any combination thereof, which are all herein incorporated by reference.

Exemplary filter materials and cartridges that may be used with the present invention may include those shown and described in the following U.S. Pat. Nos. 4,753,728; 5,019,311; 5,147,722; 5,189,092; 5,249,948; 5,331,037; 5,527,451; 5,536,394; 5,709,794; 5,840,348; 5,882,507; 5,882,517; 6,103,114; 6,057,262; 6,368,504; 6,630,016; 7,150,829; 7,153,438; or any combination thereof, which are all herein incorporated by reference.

Referring FIGS. 14-16, another exemplary embodiment of a filter system 750 of the present invention is shown, wherein filter housing 130 and filter cartridge 131 are oriented in a horizontal orientation such that the filter housing is positioned adjacent to and along side a water faucet when filter system 750 is mounted onto the faucet. It is understood that filter system 750 may be configured such that filter housing 130 is horizontally oriented under a neck of the faucet. As shown, filter system 750 may further comprise upper housing 12 connected to lower housing 14 to enclose filter platform 10. Also, filter system 750 may comprise filter cap 132 threadingly engaged to filter housing 130 and a filtered water outlet 800 disposed within filter cap 132.

Horizontal filter system 750 may comprise all or any combination of the components described above herein with regard to vertical oriented filter system 1 as shown in FIGS. 1-13, and are herein incorporated by reference. In one exemplary embodiment of the horizontal oriented filter system 750, the filter system may not comprise a nozzle in fluid communication with the filtered water outlet 58. In addition, filter system 750 may comprise a filtered water outlet 800, and does not include a flow diverter and nozzle as found in the one exemplary embodiment of vertical oriented filter system 1.

In these embodiments, filter cap 132 may also comprise a reset magnet 137 disposed thereon or therein. As cap 132 is connected back on (e.g., threaded onto) filter housing 130, reset magnet 137 causes reset reed switch 140 which may be in electrical communication with and mounted on reset circuit board 141 to reset the tracked volumetric flow and/or elapsed time within the microprocessor and/or timer to zero (0) as described above herein. Thus, every time cap 136 is removed to replace the used filter cartridge with a new one, the volumetric flow and/or time is reset back to zero (0). The reset reed switch 140 and reset circuit board 140 may be positioned anywhere along the filter system.

Figure 17:
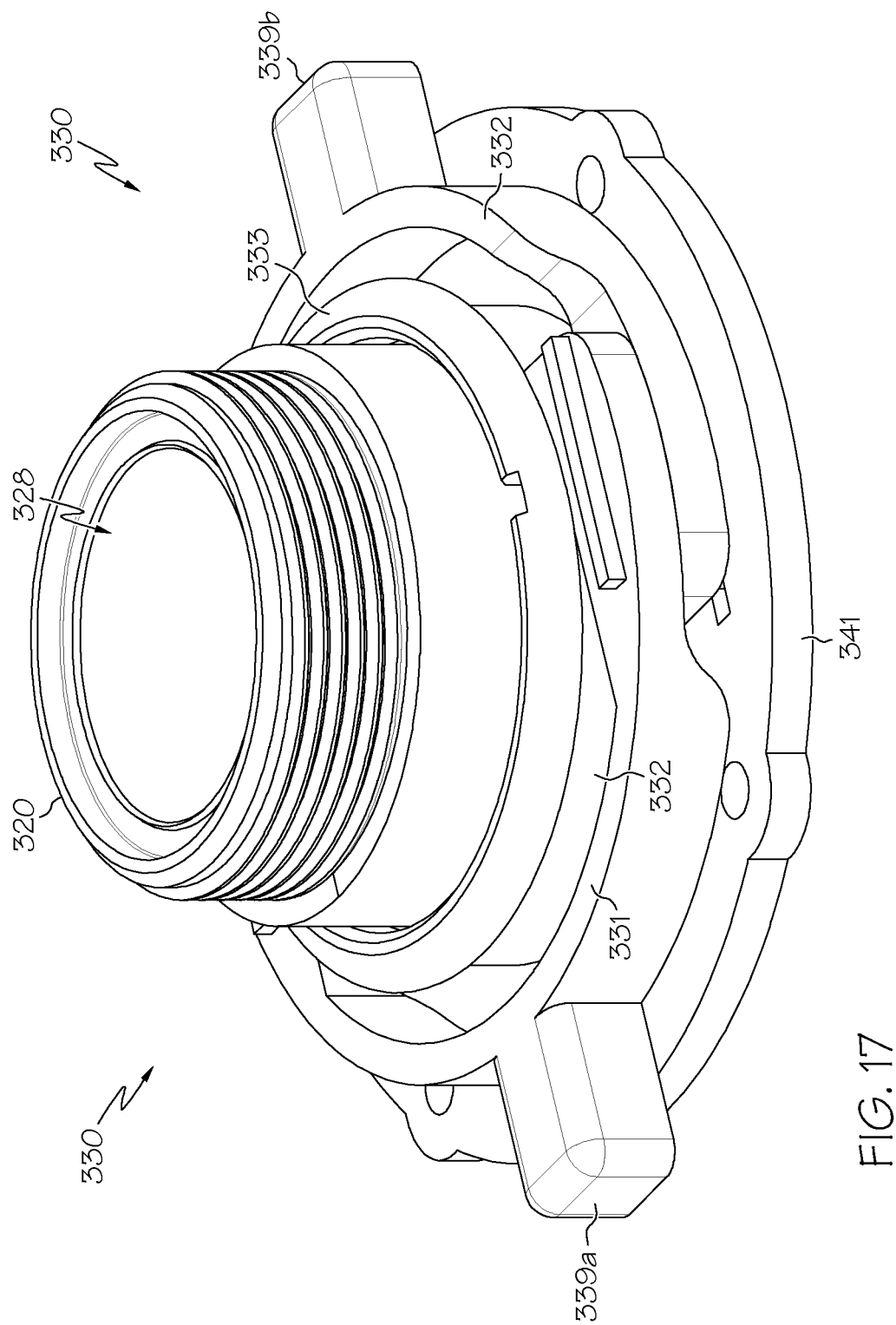
FIG. 17 is a perspective view of an exemplary quick connect mechanism having an elastic band spring according to an embodiment of the present invention.
Figure 18:
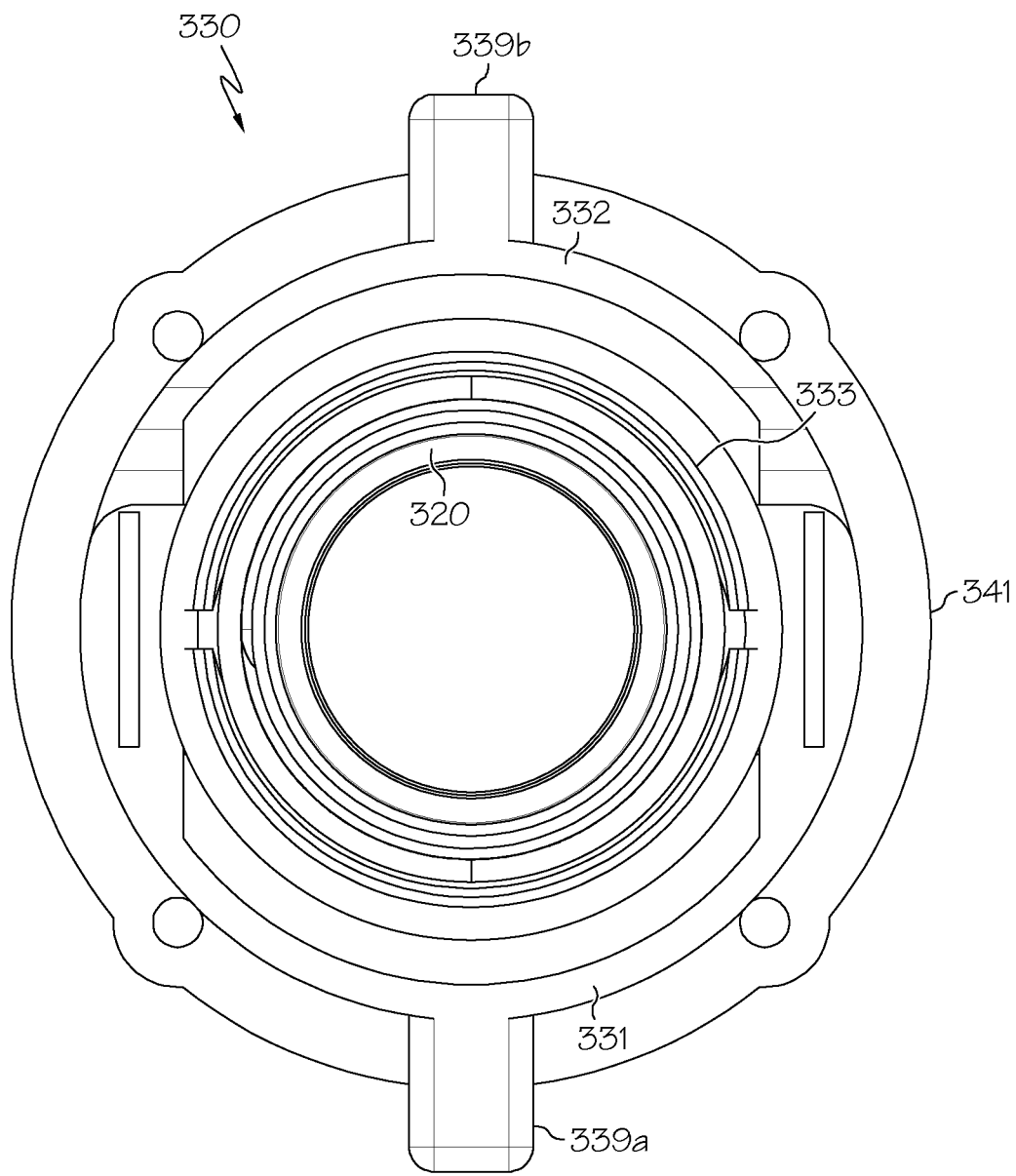
FIG. 18 is a top plan view of the quick connect mechanism of FIG. 17.

Referring to FIGS. 17-18, additional exemplary embodiments of the quick connect device of the present invention that may be combined with filter platform 10. Specifically, FIGS. 17 and 18 shown alternative quick connect device 330 having a first locking device 331 having an integral first actuator 339a and a first lip 335, a second locking device 332 having an integral second actuator 339b and a second lip 336, and a spring 333 that encompasses and engages respective first and second lips 335 and 336. Spring 333 biases first and second locking devices 331 and 332 into the first position (A) as described above herein and shown in FIGS. 1-13. In the exemplary embodiment, spring 333 may comprise an elastic band or ring fabricated from an elastic material such as natural rubber, EPDM, nitrile rubber, silicone rubber, elastomeric polymers, or any combinations thereof.

As shown in FIGS. 17 and 18, an adaptor 320 may be inserted into quick connect device 330 such that spring 333 will cause first and second locking devices 331 and 332 to lock into a notch (not shown but similar to notch 27 shown in FIG. 3) or onto a flange (not shown) of an end of adaptor 320. Similar to quick connect device 30 shown in FIGS. 5-9, quick connect device 330 may be contained within an upper body 341 of filter platform 10. Upper body 341 may comprise some or all of the components and features of upper body 41 shown and described above herein.

Figure 19:
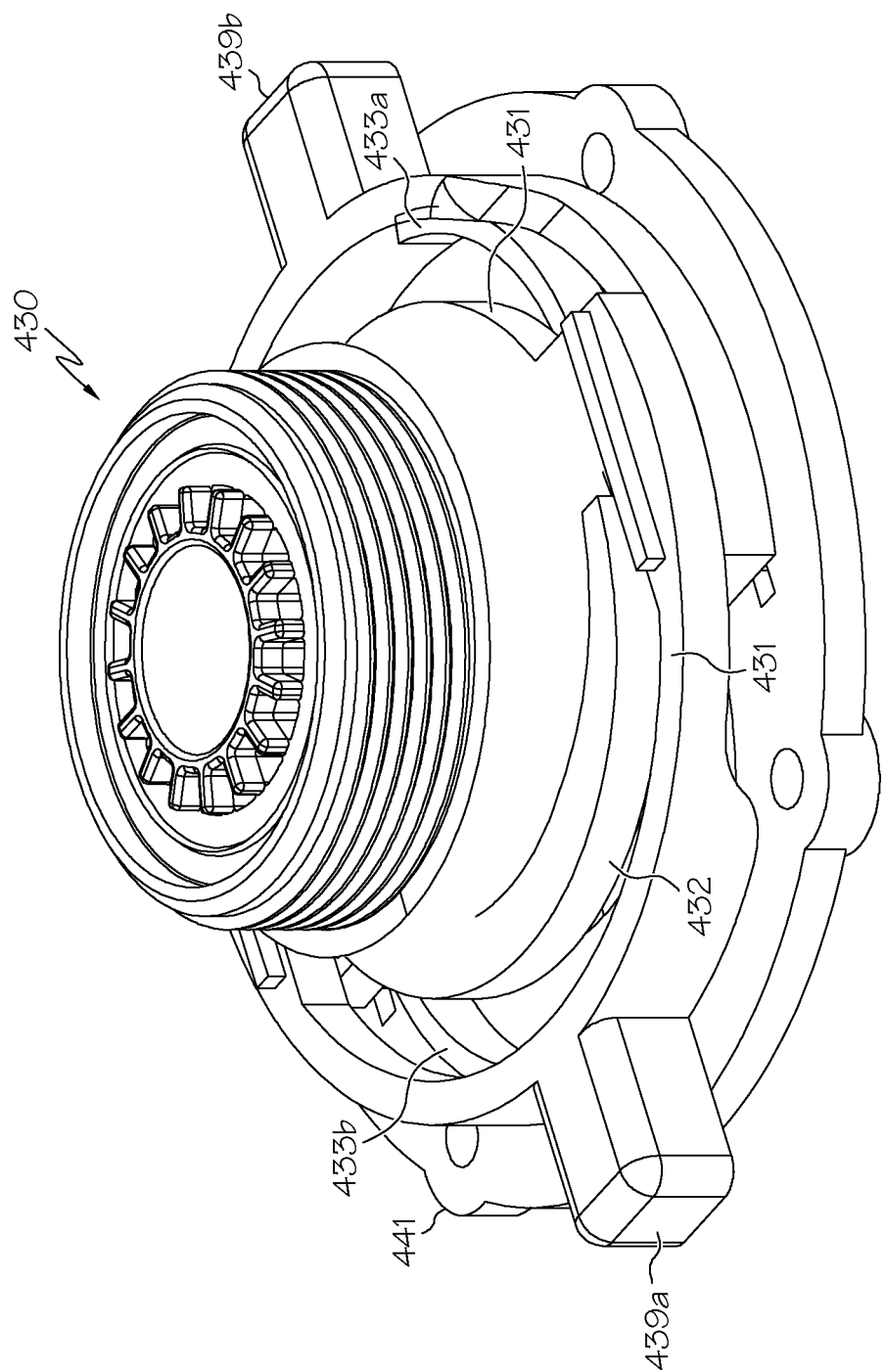
FIG. 19 is a perspective view of an exemplary quick connect mechanism having springs integral with the first and second locking devices according to an embodiment of the present invention.
Figure 20:
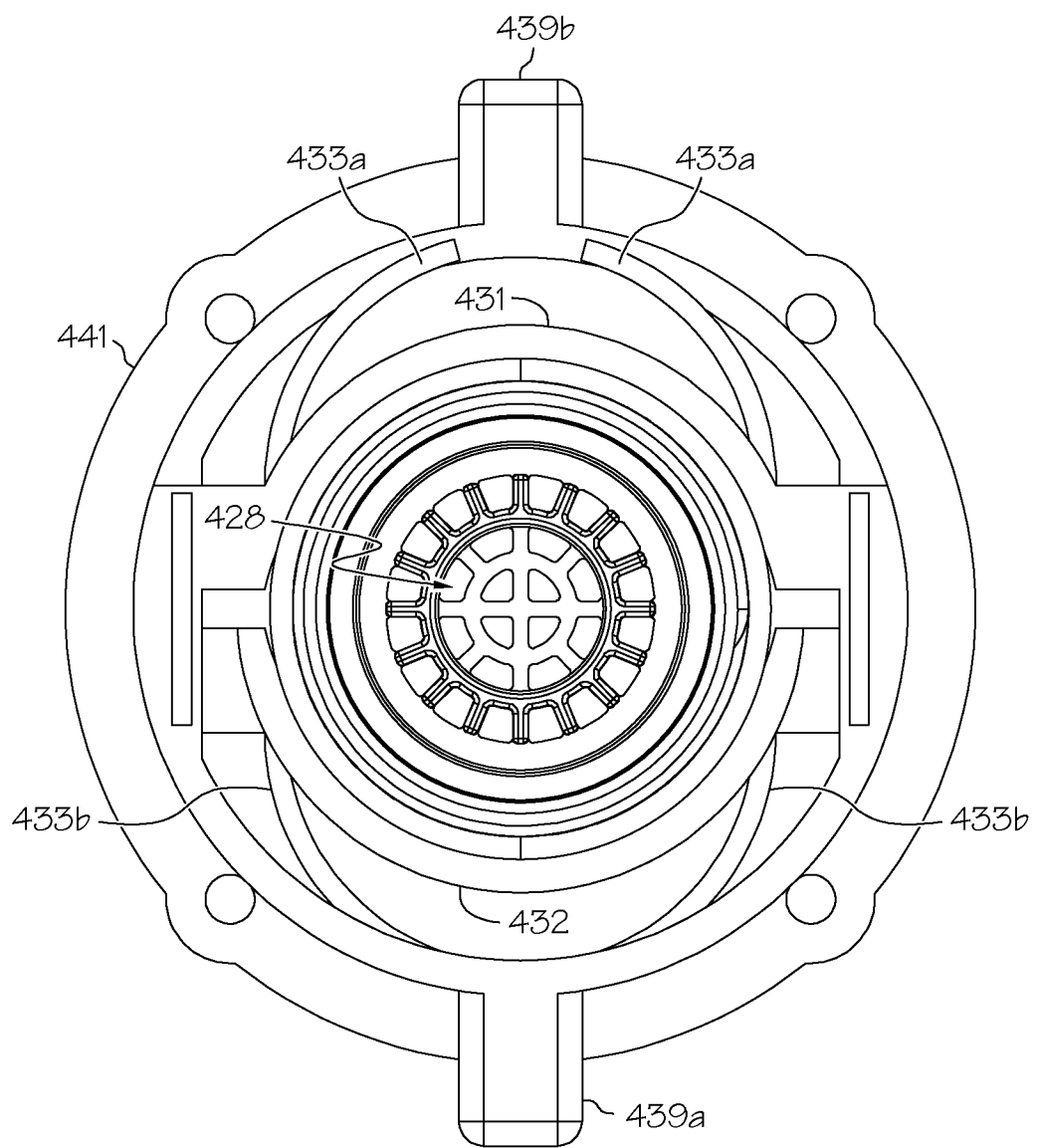
FIG. 20 is a top plan view of the quick connect mechanism of FIG. 19.

Referring to FIGS. 19-20, another alternative quick connect device is shown as 430. Quick connect device 430 may include a first locking device 431 and a second locking device 432. First locking device 431 may comprise an integral first actuator 439a and two integral spring fingers 433a extending outwardly from the first locking device. Second locking device 432 may comprise an integral second actuator 439b and two integral spring fingers 433b extending outwardly from the second locking device. Spring fingers 433a and 433b may be fabricated from a variety of materials, such as elastic materials, which may include, but not be limited to, polypropylene, polyethylene, nylon, co-polyester, or any combinations thereof. Spring fingers 433a and 433b are operable to bias respective first and second locking devices 431 and 432 into the first position (A) as described above herein and shown in FIGS. 5-9.

As shown in FIGS. 19 and 20 an adaptor 420 may be inserted into quick connect device 430 such that spring fingers 433a and 433b will cause first and second locking devices 431 and 432 to lock into a notch (not shown but similar to notch 27 shown in FIG. 3) or onto a flange (not shown) of an end of adaptor 420. Similar to quick connect device 30 shown in FIGS. 5-9, quick connect device 430 may be contained within an upper body 441 of filter platform 10. Upper body 441 may comprise some or all of the components and features of upper body 41 shown and described above herein. In the exemplary embodiment, spring fingers 433a and 433b engage an inner surface of upper body 441.

Figure 21:
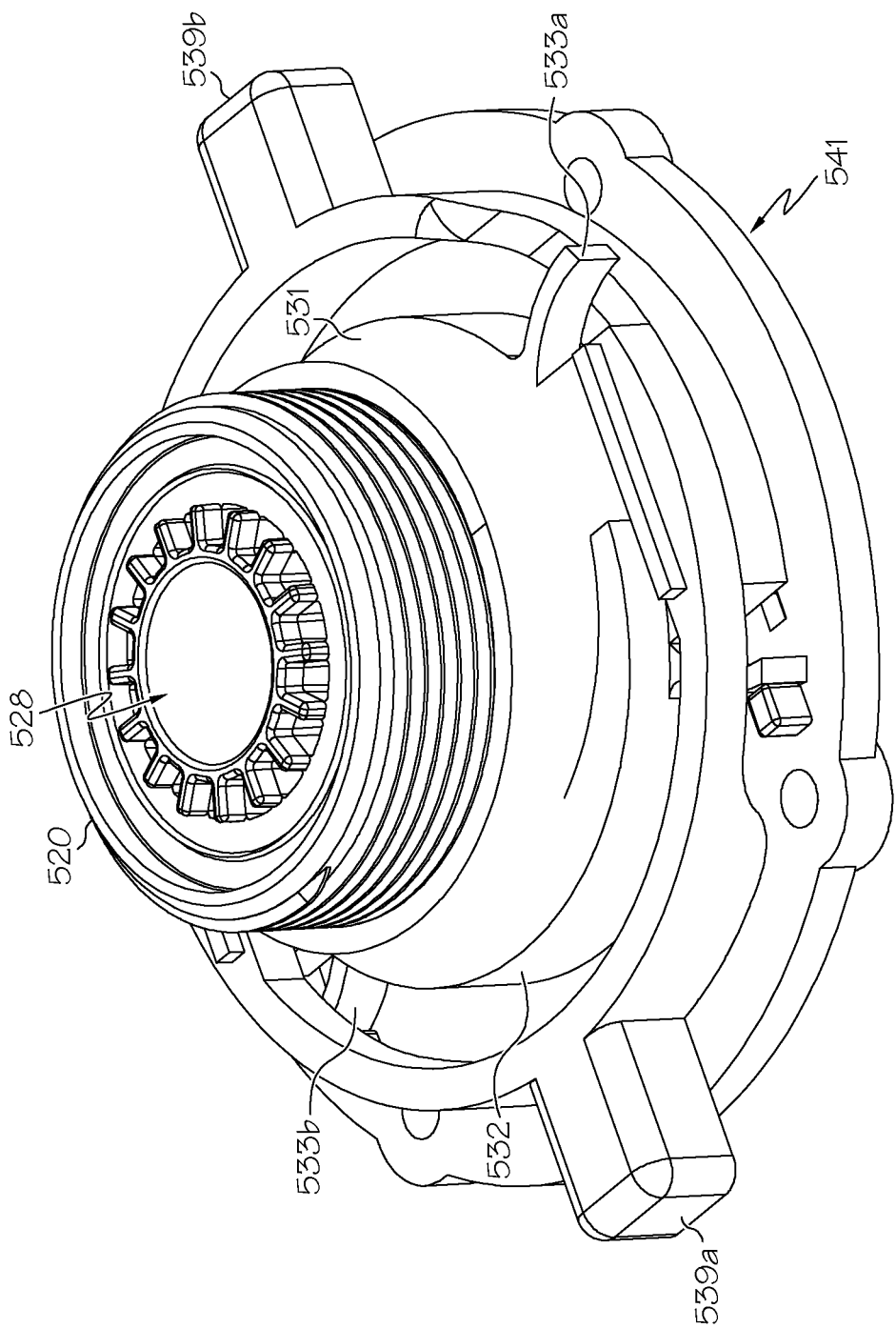
FIG. 21 is a perspective view of an exemplary quick connect mechanism having springs integral with the first and second locking devices according to an embodiment of the present invention.
Figure 22:
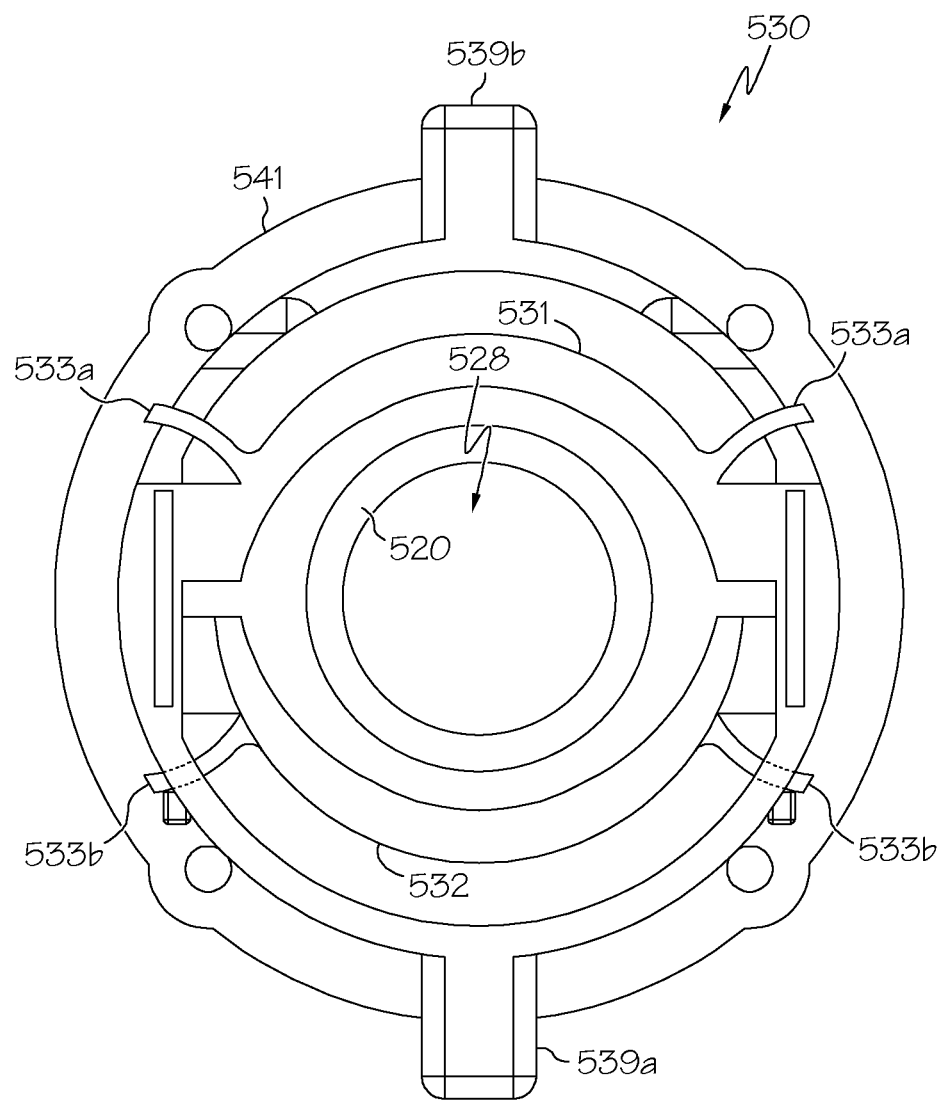
FIG. 22 is a top plan view of the quick connect mechanism of FIG. 21.

Referring to FIGS. 21-22, another alternative quick connect device is shown as 530. Quick connect device 530 is substantially the same as quick connect device 430 shown in FIGS. 19 and 20 and described above herein. As such, quick connect device operates and functions essentially the same. Quick connect device 530 may include a first locking device 531 and a second locking device 532. First locking device 531 may comprise an integral first actuator 539a and two integral spring fingers 533a extending outwardly from the first locking device. Second locking device 532 may comprise an integral second actuator 539b and two integral spring fingers 533b extending outwardly from the second locking device. As shown in FIGS. 21-22, spring fingers 533a and 533b are oriented and positioned along respective first and second locking devices 531 and 532 differently than spring fingers 433a and 433b. Spring fingers 533a and 533b may also be fabricated from a variety of materials, such as elastic materials, which may include, but not be limited to, polypropylene, polyethylene, nylon, co-polyester, or any combinations thereof. Spring fingers 533a and 533b are operable to bias respective first and second locking devices 531 and 532 into the first position (A) as described above herein and shown in FIGS. 5-9.

Figure 23:
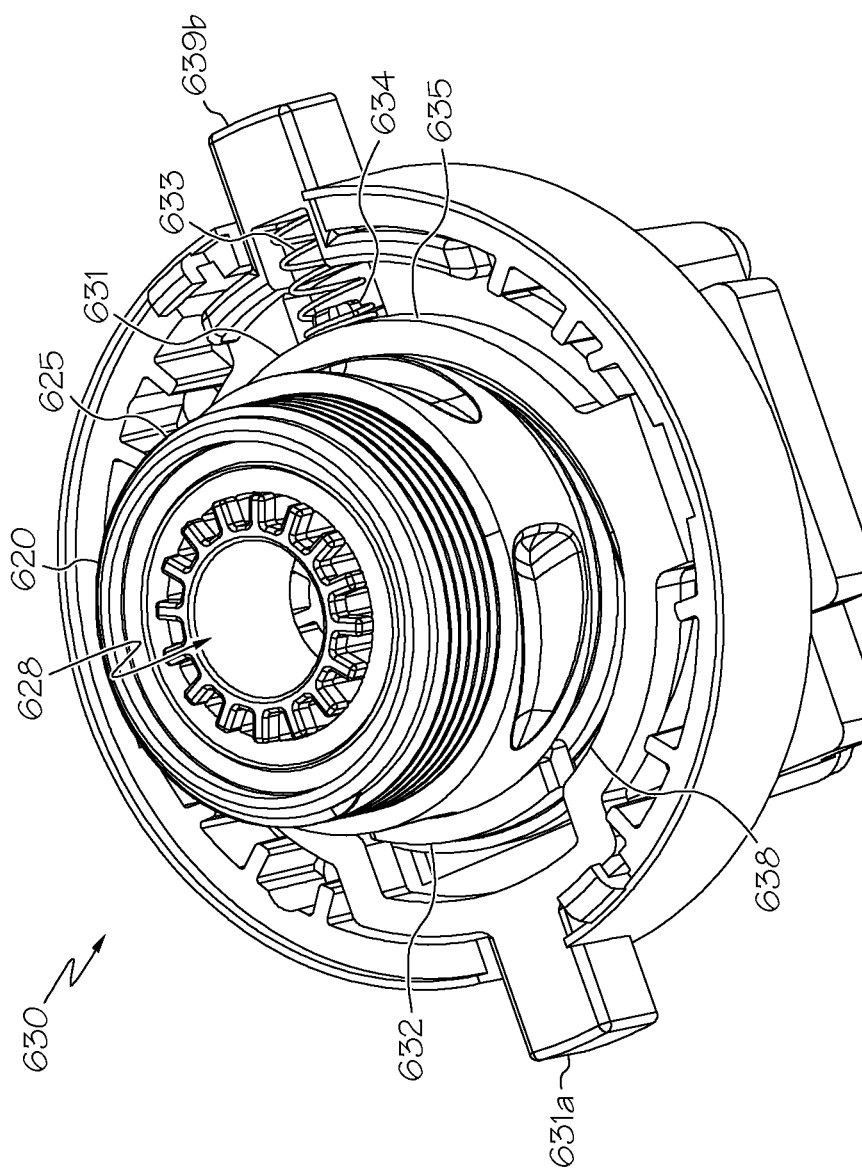
FIG. 23 is a perspective view of an exemplary quick connect mechanism having a single spring according to an embodiment of the present invention.
Figure 24:
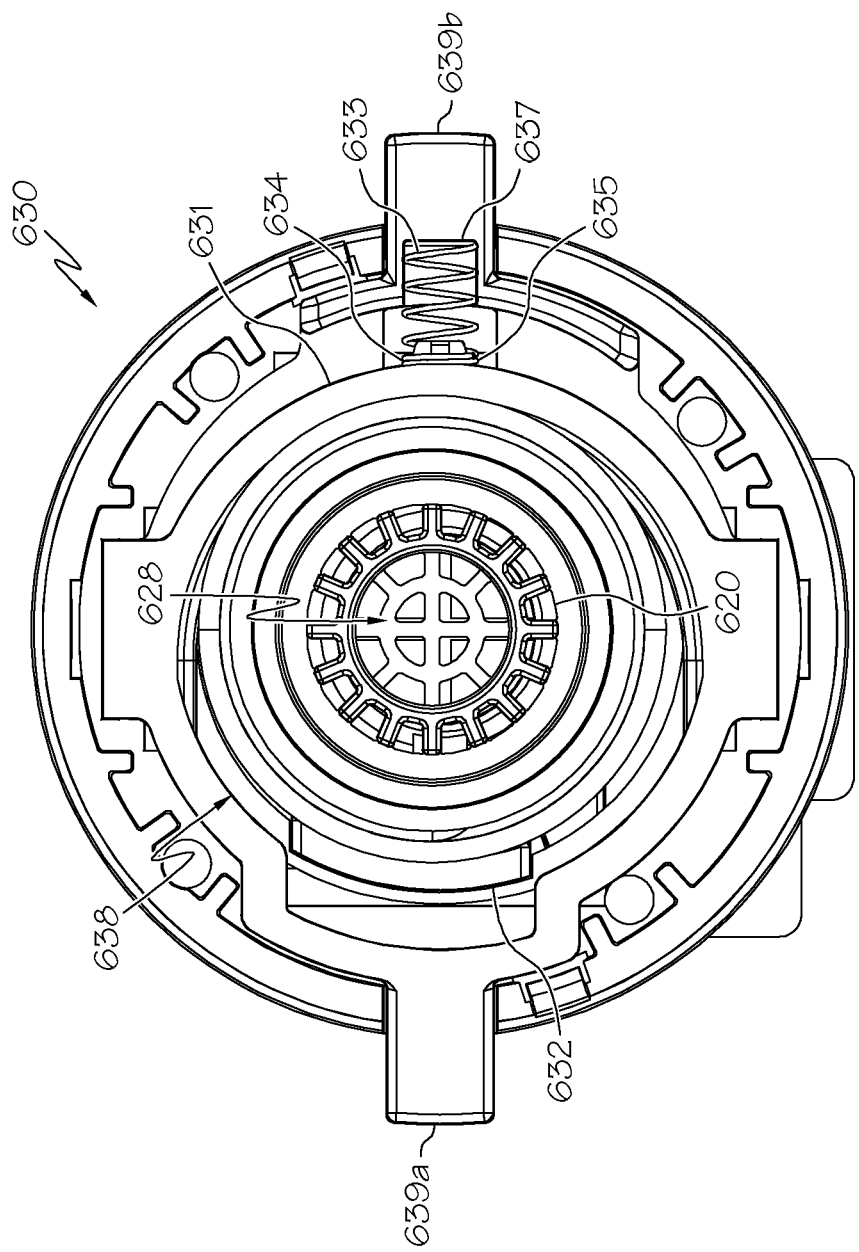
FIG. 24 is a top plan view of the quick connect mechanism of FIG. 23.

Referring to FIGS. 23-24, yet another alternative quick connect device is shown as 630 connected to an adaptor 620. Quick connect device 630 and adaptor 620 are substantially the same as quick connect device 30 and adaptor 20 shown in FIGS. 2-7 and described above herein. As such, quick connect device 630 operates and functions essentially the same. An adaptor 620 is shown inserted into an opening 638 on quick connect device 630 and locked into a connected engagement with quick connect device 630 as described above herein with reference to the other exemplary embodiments. Adaptor 620 includes a fluid channel 628, threading 625, and a notch (not shown) disposed at an end opposite the threading.

Quick connect device 630 may include a first locking device 631, a spring 633, a first actuator 639*a*, a second locking device 632 opposite first locking device 631, and a second actuator 639*b*. First actuator 639*a* is fabricated to be integral to first locking device 631. Second actuator 639*b* is fabricated to be integral to second locking device 632. As shown in FIGS. 23-24, spring 633 is positioned between an outside surface 635 of first locking device 631 and an inside surface 637 of second actuator 639*b*. Outside surface 635 may include a protrusion 634 that extends from the surface and that spring 633 slides over. Spring 633 is operable to bias respective first and second locking devices 631 and 632 into the first position (A) as described above herein and shown in FIGS. 5-9.

When first and second locking devices 631 and 632 are in the first position (A), the first and second locking devices slide into the notch of adaptor 620 and hold the water filter system on the adaptor, which is connected to an end of a water faucet. When a user presses inwardly on first and second actuators 639*a* and 639*b*, respectively, the first and second locking devices slide out of the notch and away from adaptor 620 into a second position (B). First and second locking devices 631 and 632 when sliding into second position (B), they move relative to each other and compress spring 633 between outer surface 635 and inside surface 637. Once the user releases the force against the first and second actuators, the first and second locking devices are forced (biased) back into first position (A).

FIGS. 25-30 show another exemplary embodiment of the adaptor of the present invention generally as 1000. Adaptor 1000 may comprise an annular body 1012 having a threaded end 1013, a flanged end 1016, external side wall 1018, interior surface 1011, and a longitudinal axis L-L' as shown and described in co-pending and commonly owned U.S. Patent Application Ser. No. 61/045,858, titled "An Adaptor For Connecting A Faucet Mounted Water Faucet Filter To A Water Faucet", which is herein incorporated by reference in its entirety.

Adaptor body 1012 may be fabricated using any conventional methods such as compression or injection molding and/or machining from a variety of conventional materials, including but not limited to metals, plastics such as polymers (e.g., acrylonitrile butadiene styrene (ABS), polycarbonate, polyethylene), composite materials, or any combination thereof as known to one of ordinary skill in the art.

Threaded end 1013 may comprise external threading 1014 disposed within body 1012. Threaded end 1013 may be threadingly engaged to a threaded end (internal threaded) of a water faucet, e.g., a water faucet positioned at a kitchen sink. As set forth below herein in alternative exemplary embodiments, threaded end 1013 may comprise internal threading disposed within body 1012 in order to threadingly engage an external threaded end of a water faucet as known to one of ordinary skill in the art. Threads 1014 may also comprise any conventional threading and be fabricated from a variety of materials such as metal, plastics (e.g., polymers), composite materials, or any combination thereof as known to one of ordinary skill in the art. Also, threads 1014 may be part of an insert that is installed within and connected to aperture 1000 or formed as an integral part of the aperture itself. Threading 1014 of adaptor 1000 is configured such that adaptor 1000 may be threadingly connected or attached to an end of a conventional faucet in order to mounted and connect a faucet-mounted water filter system to flange end 1016 of the adaptor, placing the water filter system in fluid communication with the water faucet.

Although not required, adaptor 1000 may also include a gasket or seal (not shown) that is configured to make the adaptor connection to the faucet waterproof or leak proof and/or a aerator (not shown) to provide aeration to the water flowing from the adaptor as known to one of ordinary skill in the art. It is understood that this and other examples shown and described herein are used for illustration purposes, and not limitation. It is also understood that adaptor 1000 may be used to connect other devices such as other water devices such as a sprayer to water supplies such as a hose, pump, etc. as known to one of ordinary skill in the art.

Flanged end 1016 may comprise a flange 1015. In this exemplary embodiment, flange 1015 is defined by a channel 1017 disposed within body 1012 adjacent to flange 1015. However, it is understood that flange 1015 may be fabricated such that flange 1015 extends radially from external surface 1018 such that body 1012 does not include channel 1017. Flange 1015 and/or channel 1017 are configured to receive, engage, and connect to a quick connect/disconnect device on a faucet-mounted water filter system. In one exemplary embodiment, flange end 1016 is inserted into an inlet of the quick connect/disconnect device such that one or more spring-biased locking mechanisms slide past flange 1015, and then spring and/or lock into place in channel 1017, securing and connecting the faucet-mounted water filter system onto adaptor 1000. If the now connected adaptor is connected to a water faucet, then the faucet-mounted water filter system is connected by adaptor 1000 to the water faucet end. The quick connect/disconnect device also includes one or more actuators for moving (disengaging) the locking mechanism(s) out of channel 1017, thus permitting the faucet-mounted water filter system to be quickly and efficiently removed from the end of the faucet.

Figure 25:
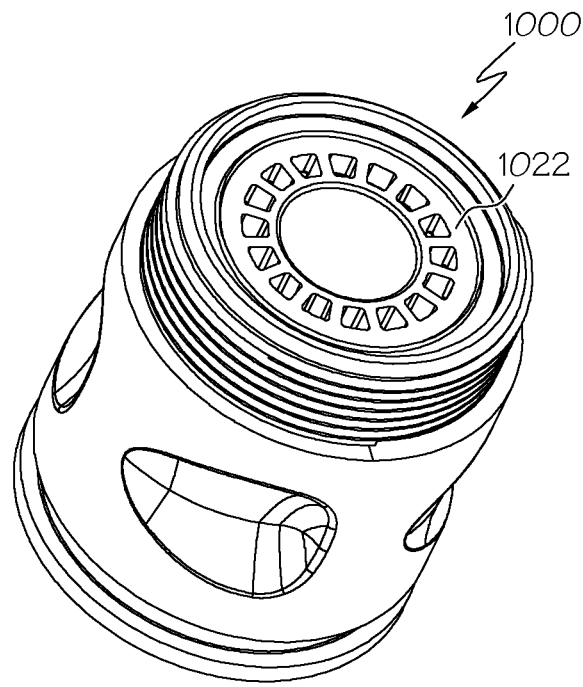
FIG. 25 is a perspective view of an exemplary adaptor according to an embodiment of the present invention.
Figure 26:
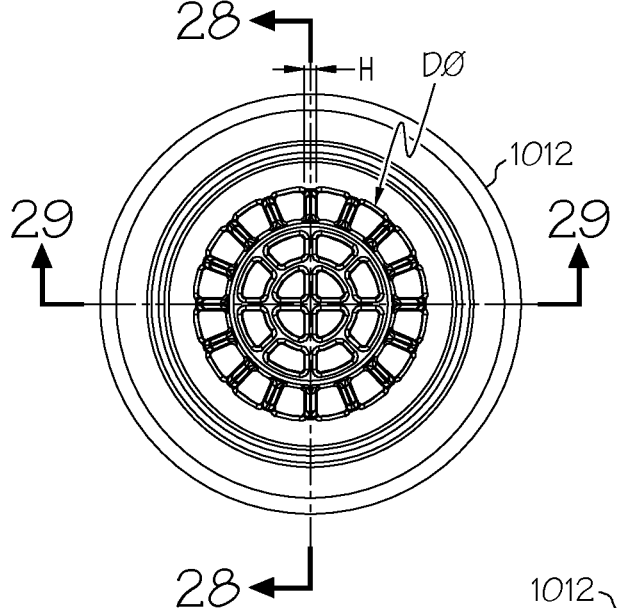
FIG. 26 is a bottom planar view of the exemplary adaptor according to FIG. 25.
Figure 27:
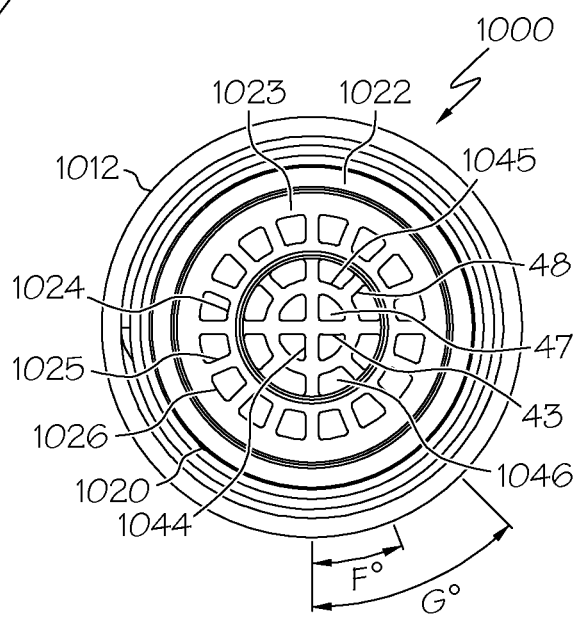
FIG. 27 is a top planar view of the exemplary adaptor according to FIG. 25.
Figure 28:
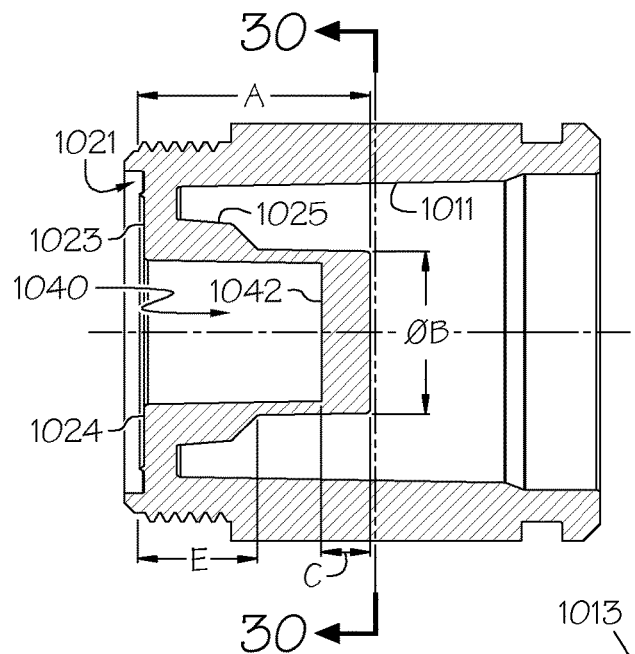
FIG. 28 is a cross sectional view of the exemplary adaptor taken along 28-28 of FIG. 26.
Figure 29:
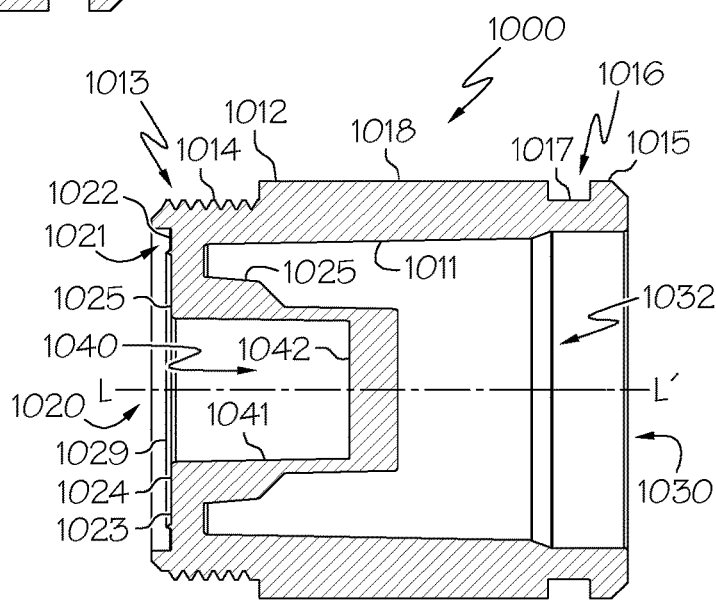
FIG. 29 is a cross section view of the exemplary taken along 29-29 of FIG. 26.

Adaptor 1000 may also comprise a water inlet 1020 positioned at threaded end 1013 and a water outlet 1030 positioned at flanged end 1016. When adaptor 1000 is connected to an end of a water faucet, water inlet 1020 receives water from the faucet end and directs it into the adaptor toward water outlet 1030. As shown in FIGS. 25, 28, and 29, inlet 1020 may comprise a first inlet chamber 1021 and a second inlet chamber 1040 concentric to and coaxially-aligned with annular body 1012. In this particular exemplary embodiment, first inlet chamber 1021 has a partial bottom wall 1022 that extends transverse to the water flow path within adaptor 1000. Also, second inlet chamber 1040 comprises an entrance 1029 that is disposed within bottom wall 1022 such that entrance 1039 is substantially flush with a surface of bottom wall 1022, creating second inlet chamber 1040 to be sequential to first inlet chamber 1021 along the water flow path. In other words, when water enters inlet 1020, it will flow through first inlet chamber 1021 before flowing into second inlet chamber 1040. In certain exemplary embodiments, this configuration may cause first and second inlet chambers 1021 and 1040 to function substantially like a funnel (i.e., creating a funneling action).

Outlet 1003 may comprise an outlet chamber 1032 disposed within annular body 1012 of adaptor 1000. Bottom wall 1022 may comprise outer flow channels 1026 that connect in fluid communication first inlet chamber 1021 with outlet chamber 1032, and thus ultimately inlet 1020 with outlet 1030. Specifically, in the exemplary embodiment shown in FIGS. 25-30, bottom wall 1021 may be comprised of an outer annular rib 1023 that is transverse to the water flow path and extends radially inwardly from interior surface 1011, an inner annular rib 1024 that is also transverse to the water flow path and is concentric and coaxially-aligned with outer annular rib 1023, and one or more outer radial ribs 1025 extending radially between outer annular rib 1023 and inner annular rib 1024.

Inlet 1020, in the exemplary embodiment, comprises sixteen (16) outer radial ribs 1027 equally spaced about and coaxially-aligned with longitudinal axis L-L'. As shown in FIGS. 28 and 29, outer radial ribs 1027 also extend longitudinally a length (E) within adaptor 1000. As such, outer annular rib 1023, inner annular rib 1024, and outer radial ribs 1025 form outer flow channels 1026. Thus, since there are sixteen (16) outer radial ribs, adaptor 1000, in this embodiment, comprises sixteen (16) outer flow channels 1026 that are also equally spaced about and coaxially-aligned with longitudinal L-L'. It has been found that the length (E) of the outer radial ribs 1025, and thus the length of outer flow channels 1026, in some embodiments, has an impact on the water flow straightening capabilities of the adaptor 1000. In one exemplary embodiment, length (E) of outer radial ribs 1025 may comprise from about 1.0 mm to about 40 mm, from about 2.5 mm to about 35 mm, and/or from about 5 mm to about 30 mm. In another exemplary embodiment, length (E) may be equivalent to or substantially the same length at the length of adaptor 1000 such that outer flow channels run substantially the entire length of adaptor 1000.

As shown, outer flow channels 1026 may comprise a substantially quadrilateral shape, wherein two of its sides may be formed by outer annular rib 1023, inner annular rib 1024, and two adjacent outer radial ribs 1025 positioned on either side of outer flow channel 1026. It is understood that outer flow channels 1026 may comprise any shape, length, and/or configuration and that the shapes, lengths, and/or configurations described and shown herein are for illustrations purposes only, and not limitation.

In addition, second inlet chamber 1040 comprises an annular interior side wall 1041 and a bottom wall 1042 connected to interior side wall 1041. Bottom wall 1042 may comprise a depth (C) as shown in FIG. 28. Adaptor 1000 may comprise one or more inner flow channels such as, for example, one or more first inner flow channels 1046 and one or more second inner flow channels 1047 that connect in fluid communication second inlet chamber 1040 with outlet chamber 1032. As such, first and second inner flow channels 1046 and 1047 connect in fluid communication inlet 1020 with outlet 1030. In the exemplary embodiment shown, bottom wall 1042 may be comprised of a first long rib 1043, a second long rib 1044 that is perpendicular to the first long rib, an annular rib 1045 concentric to outer flow channels 1026 and coaxially-aligned with longitudinal axis L-L', and four (4) short radial ribs 1048 each equally spaced ninety (90) degrees apart from one another and forty-five (45) degrees offset from first long rib 1043 and second long rib 1044 about longitudinal axis L-L'. Short radial ribs 1048 extend radially from interior surface 1041 to annular rib 1045. First and second long ribs 1043 and 1044 each span the entire diameter of second inlet chamber 1640 and intersect at longitudinal axis L-L'.

In addition, annular rib 1045 intersects first long rib 1043 at two points, each point positioned about one-fourth (¼) of its length from the interior side wall 1041. Also, annular rib 1045 intersects second long rib 1044 at two points, each point positioned about one-fourth (¼) of its length from the interior side wall 1041. In this exemplary embodiment, first and second long ribs 1043 and 1044, annular rib 1045, and short radial ribs 1048 form eight (8) substantially quadrilateral-shaped first inner flow channels 1046 equally spaced about and coaxially-aligned with longitudinal axis L-L', and four (4) substantially triangular-shaped, second inner flow channels 1047 equally spaced about and coaxially-aligned with longitudinal axis L-L' as well. Second inner flow channels 1047 are interior to the eight (8) first inner flow channels 1046 and thus are concentric to and coaxially-aligned with the eight (8) first inner flow channels 1046 about longitudinal axis L-L'. With regard to the second inner flow channels 1047, first long rib 1043 forms substantially a first side of the triangle, second long rib 1044 forms substantially a second side, and annular rib 1045 forms substantially a third side of the triangle. Additionally, first and second inner flow channels 1046 and 1047 may connect in fluid communication second inlet chamber 1040 to outlet chamber 1032.

It has been found, in certain embodiments, that the depth (C) of bottom wall 1042 (which is the same as the depth of first long rib 1043, second long rib 1044, annular rib 1045, and/or short radial ribs 1048), which essentially defines the length of first and second inner channels 1046 and 1047, respectively, has an impact on the water flow straightening capabilities of the adaptor 1000. In one exemplary embodiment, depth (C) of bottom wall 1042 may comprise from about 0.25 mm to about 40 mm, from about 0.5 mm to about 35 mm, from about 0.75 mm to about 30 mm, and/or from about 1.0 mm to about 20 mm. In another exemplary embodiment, depth (C) may be equivalent to or substantially the same length as the length of adaptor 1000 such that first and second inner flow channels 1046 and 1047 run substantially the entire length of adaptor 1000.

It is understood that first and second inner flow channels 1046 and 1047 may comprise the same or substantially the same number, shape, size, and/or configuration as one another and may comprise a variety of different number, shapes, sizes, and/or configurations. As shown, the entrances to the inner flow channels 1046 and 1047 are substantially flush with bottom wall 1042 as shown in FIGS. 28 and 29. However, it is also understood that the entrances and/or the flow channels can be extended longitudinally toward inlet 1020 such that the channels are no longer flush with bottom wall 1042.

When adaptor 1000 is threadingly connected to an end of a water faucet and the water is turned on, water will exit the water faucet into first inlet chamber 1021 via inlet 1020, the water flow may split into two flow paths: one, a portion may flow into and through outer flow channels 1026 to outlet chamber 1032; and two, a portion may flow into second inlet chamber 1040, through first and second inner flow channels 1046 and 1047 into outlet chamber 1032. After which, the water may flow through outlet chamber 1032 and exit adaptor 1000 via outlet 1030. This dual flow path may happen sequentially and/or simultaneously. One or more of outer inlet chamber 1021, second inlet chamber 1040, outlet chamber 1032, outer flow channels 1026, and/or first and second inner flow channels 1046 and 1047 straighten or assist in straightening the stream of water that exits from outlet 1030 of the adaptor. This flow straightening function of the adaptors internal design prevents users from getting sprayed with water when the faucet-mounted filter system is not connected to the adaptor, i.e., connected to the faucet, but the adaptor is still connected to the faucet.

Figure 31:
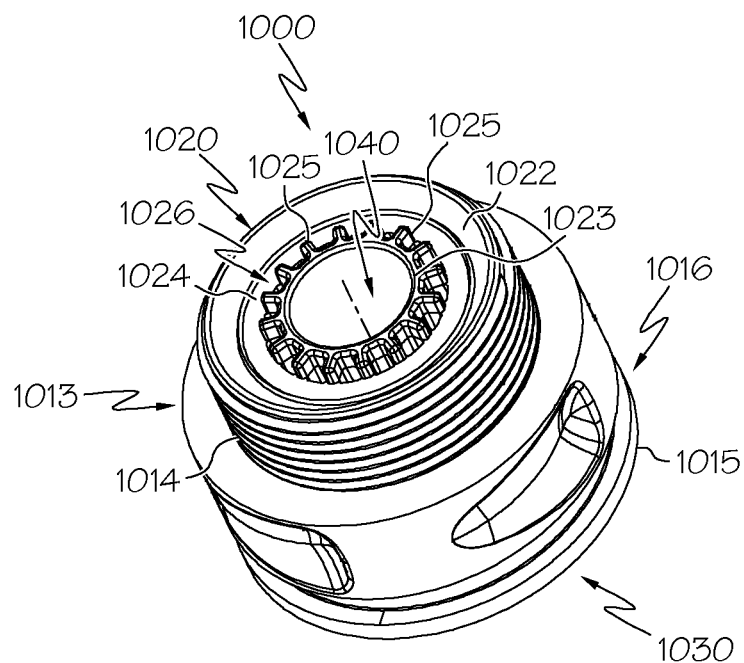
FIG. 31 is a perspective view of an exemplary adaptor according to an embodiment of the present invention.
Figure 32:
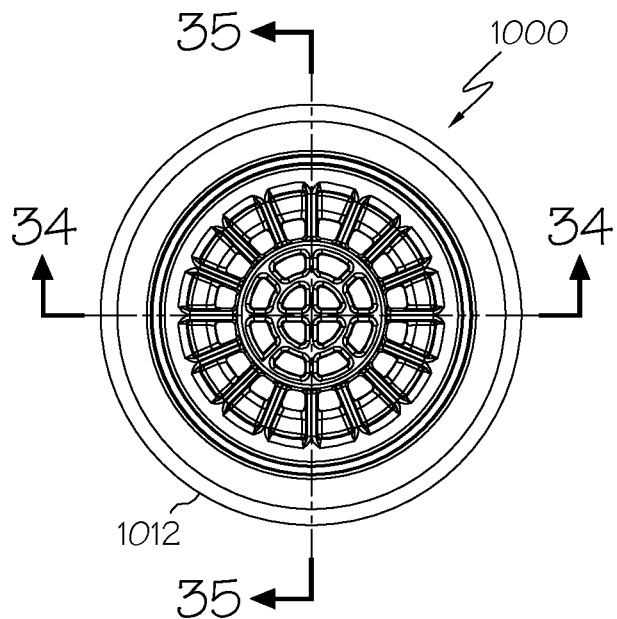
FIG. 32 is a top planar view of the exemplary adaptor according to FIG. 31.
Figure 33:
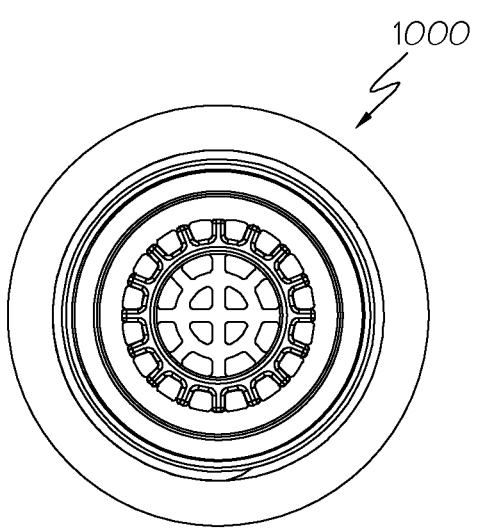
FIG. 33 is a bottom planar view of the exemplary adaptor according to FIG. 31.
Figure 34:
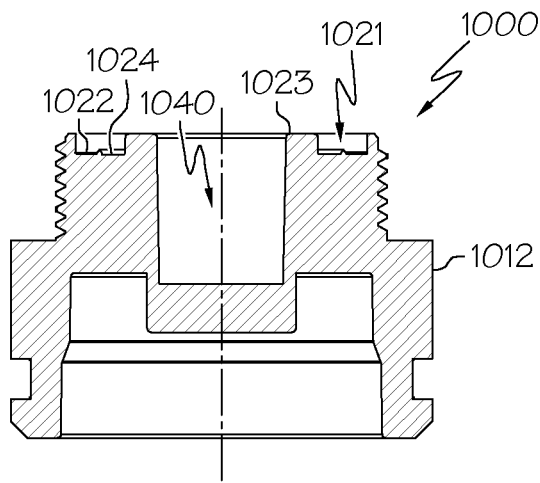
FIG. 34 is a cross sectional view of the exemplary adaptor taken along 34-34 of FIG. 32.
Figure 35:
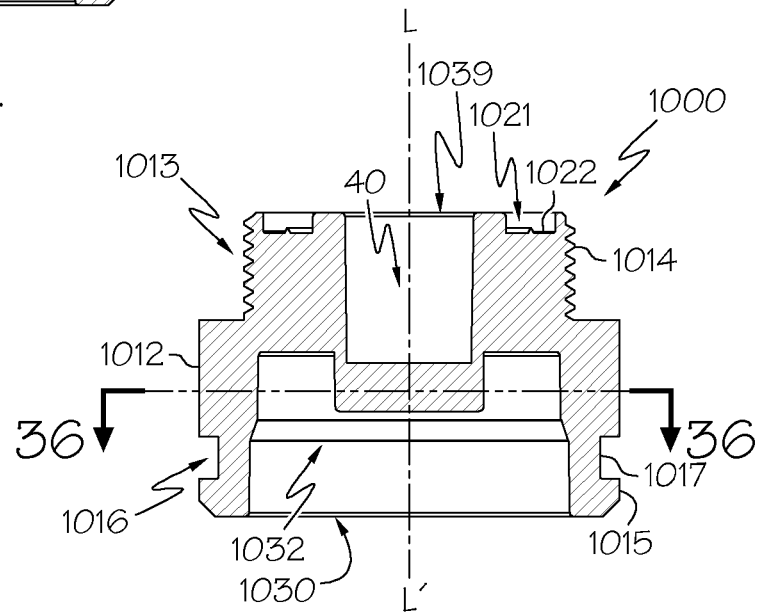
FIG. 35 is a cross section view of the exemplary adaptor taken along 35-35 of FIG. 32.
Figure 36:
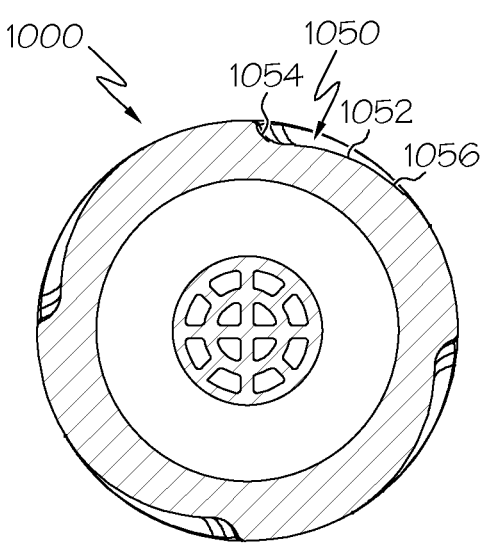
FIG. 36 is a cross section view of the exemplary adaptor taken along 36-36 of FIG. 35.
Figure 37:
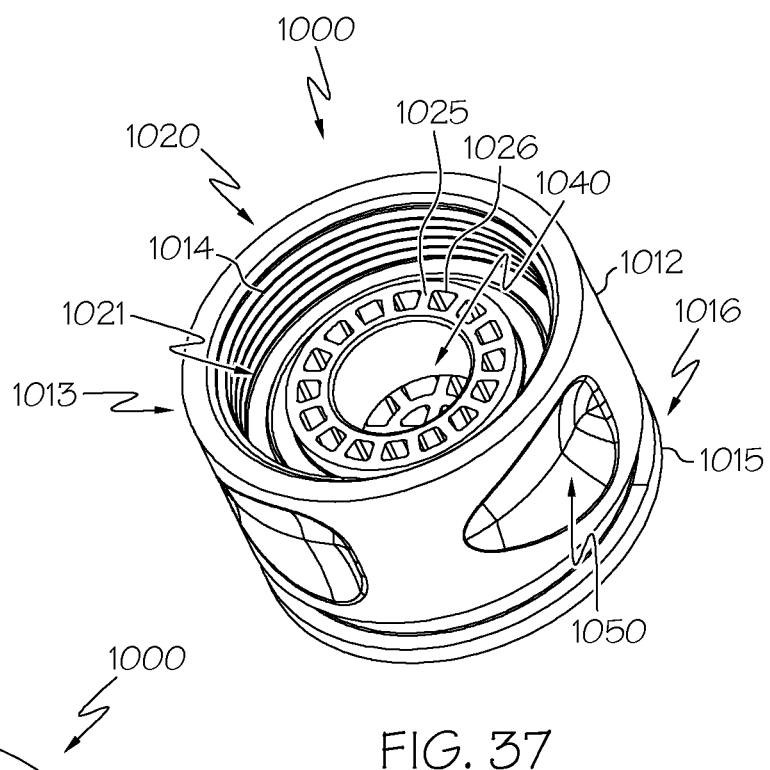
FIG. 37 is a perspective view of an exemplary adaptor according to an embodiment of the present invention.
Figure 38:
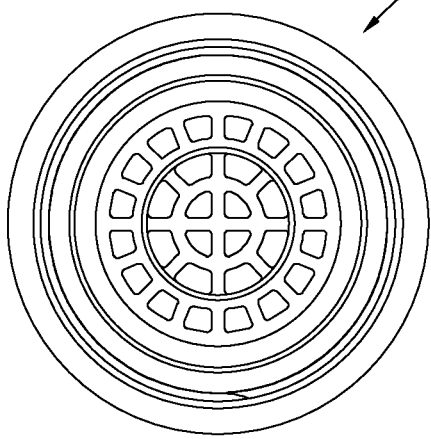
FIG. 38 is a top planar view of the exemplary adaptor according to FIG. 37.
Figure 39:
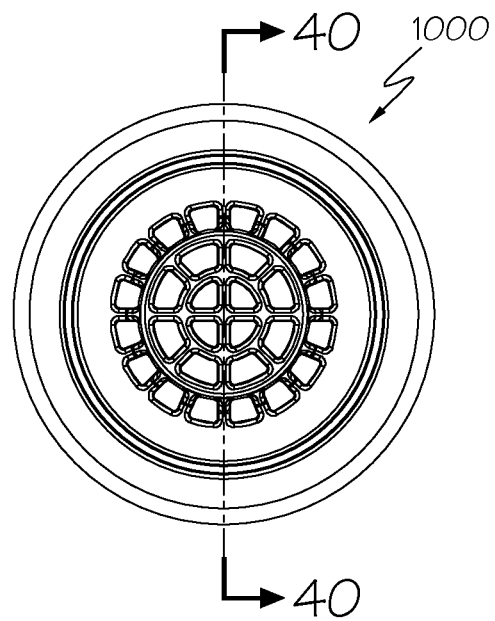
FIG. 39 is a bottom planar view of the exemplary adaptor according to FIG. 37.
Figure 40:
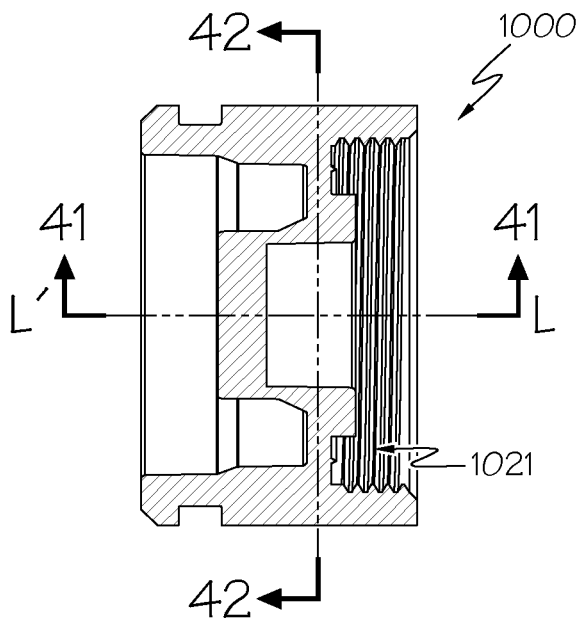
FIG. 40 is a cross sectional view of the exemplary adaptor taken along 40-40 of FIG. 39.
Figure 41:
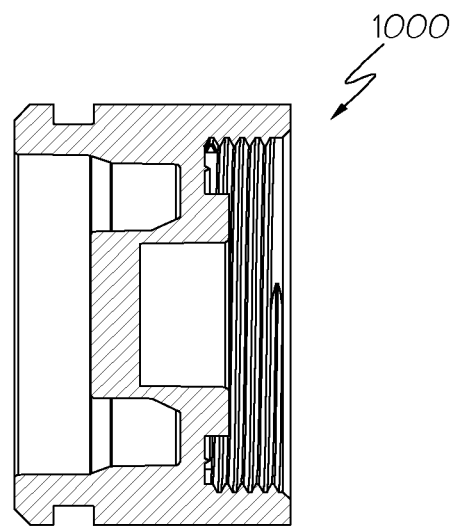
FIG. 41 is a cross section view of the exemplary adaptor taken along 41-41 of FIG. 40.
Figure 42:
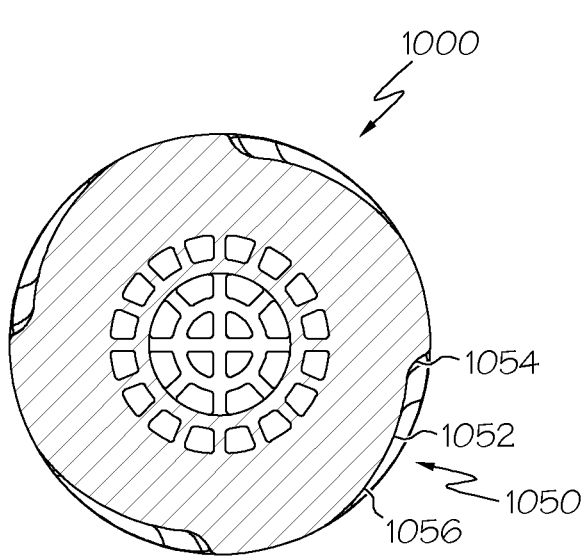
FIG. 42 is a cross section view of the exemplary adaptor taken along 42-42 of FIG. 40.
Figure 43:
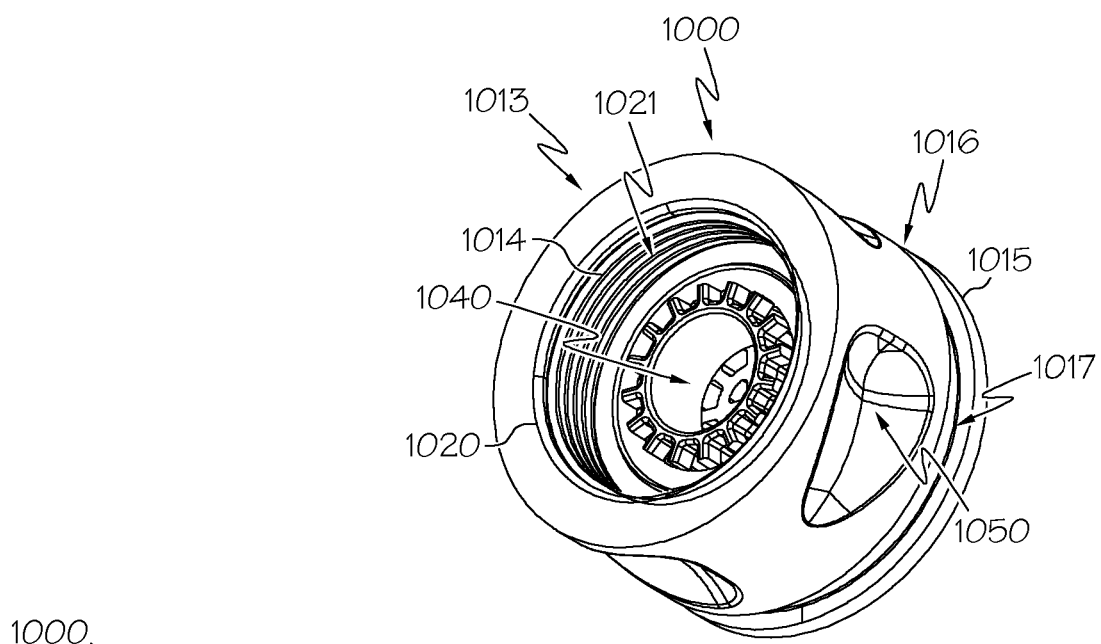
FIG. 43 is a perspective view of an exemplary adaptor according to an embodiment of the present invention.
Figure 44:
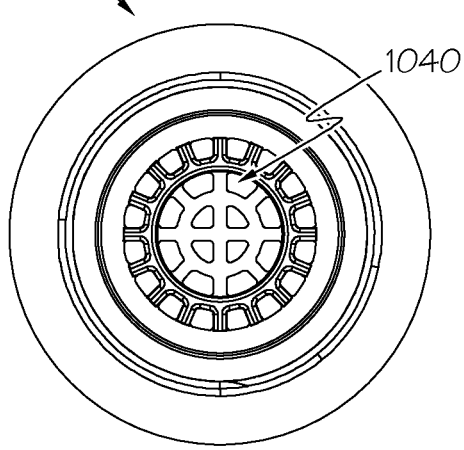
FIG. 44 is a top planar view of the exemplary adaptor according to FIG. 43.
Figure 45:
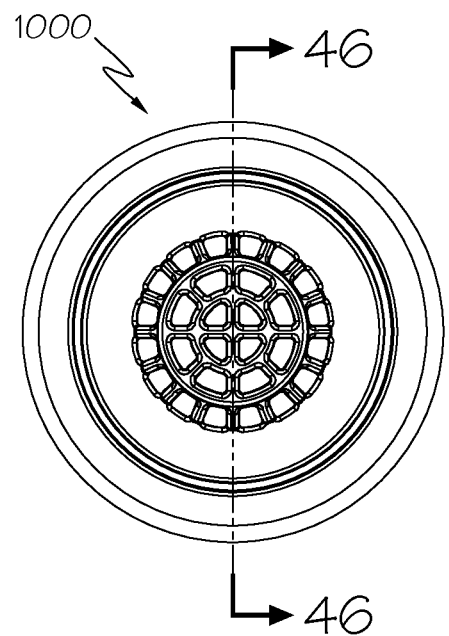
FIG. 45 is a bottom planar view of the exemplary adaptor according to FIG. 43.
Figure 46:
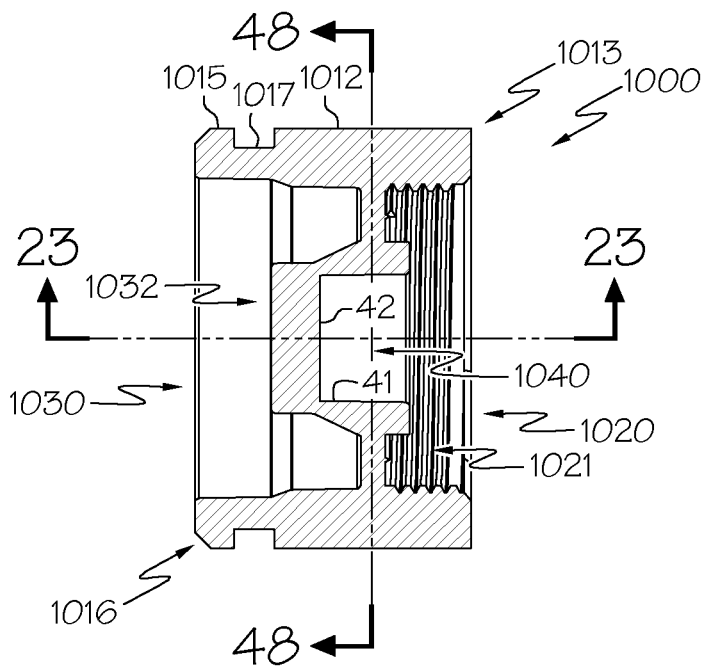
FIG. 46 is a cross sectional view of the exemplary adaptor taken along 46-46 of FIG. 45.
Figure 47:
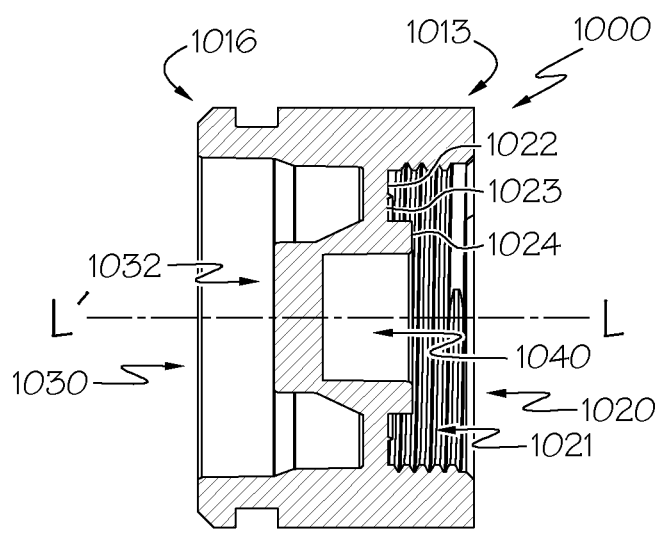
FIG. 47 is a cross section view of the exemplary adaptor taken along 47-47 of FIG. 46.
Figure 48:
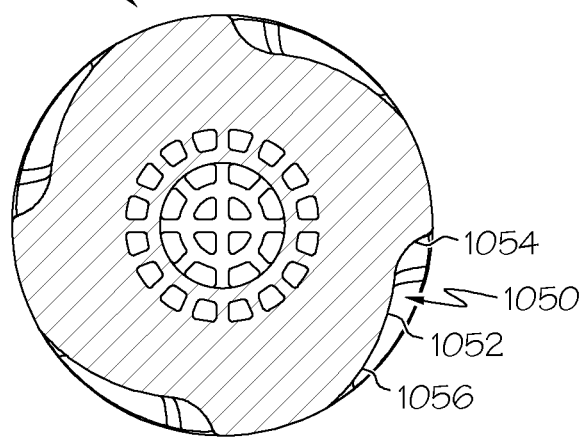
FIG. 48 is a cross section view of the exemplary taken along 48-48 of FIG. 46.

It understood that adaptor 1000 may comprise other variations of outer flow channels 1026 such as wherein certain sides of the flow channels extend axially from bottom wall 1022 toward inlet 1020 (e.g., see FIG. 31). As another example, adaptor 1000 may comprise any number of outer flow channels 1026 disposed in bottom wall 1022, such as, for example, four (4) flow channels 1026 evenly spaced about longitudinal axis L-L' or eight (8) flow channels 1026 evenly spaced about longitudinal axis L-L'.

In one or more exemplary embodiments, adaptor 1000 may comprise the range of dimensions as set forth below and shown in FIG. 29. Dimensions A, B, C, D, E, F, G, and H are dimensions of specific portions of adaptor 1000 as shown in FIG. 29. Dimension (A) is a length of second inlet chamber 1040. Dimension (A) may comprise from about 2.5 mm to about 40 mm, from about 5.0 mm to about 30 mm, and/or from about 10 mm to about 26 mm. In another exemplary embodiment, dimension (A) may be the same or substantially the same as the entire length of adaptor 1000. Thus, second inlet chamber 1040 may run substantially the entire length of adaptor 1000. Dimension (B) is the diameter of the second inlet chamber 1040. Dimension (B) may comprise from about 2.5 mm to about 30 mm, from about 5.0 mm to about 25 mm, from about 10 mm to about 18 mm, and/or from about 12 mm to about 16 mm. Dimension (C) is a depth of bottom wall 1042 as set forth above herein. Dimension (D) is the diameter of first inlet chamber 1021. Dimension (D) may comprise from about 2.5 mm to about 30 mm, from about 5.0 mm to about 25 mm, from about 10 min to about 20 mm, and/or from about 12 mm to about 18 mm. Dimension (E) is a length of outer radial rib 1025 as set forth above herein. Dimension (F) is an angle the first outer radial rib 1025 is offset from an outer radial rib 1025 positioned in a vertical orientation. Dimension (F) may comprise from about 0 degrees to about 90 degrees, from about 0 degrees to about 60 degrees, or from about 0 degrees to about 30 degrees. Dimension (G) is an angle the first short radial rib 1048 is offset from second long radial rib 1044. Dimension (G) may comprise from about 0 degrees to about 90 degrees or from about 0 degrees to about 60 degrees. Dimension (H) is a width of outer radial rib 1025. Dimension (H) may comprise from about 0.25 mm to about 5 mm, from about 0.5 mm to about 3 mm, from about 0.5 mm to about 2 mm, and/or from about 0.7 mm to about 1.8 mm. It should be understood that these ranges are shown for illustration purposes only, and not limitation. As such, it is conceived that other exemplary embodiments of the present invention may comprise dimensions outside of these disclosed ranges.

Figure 30:
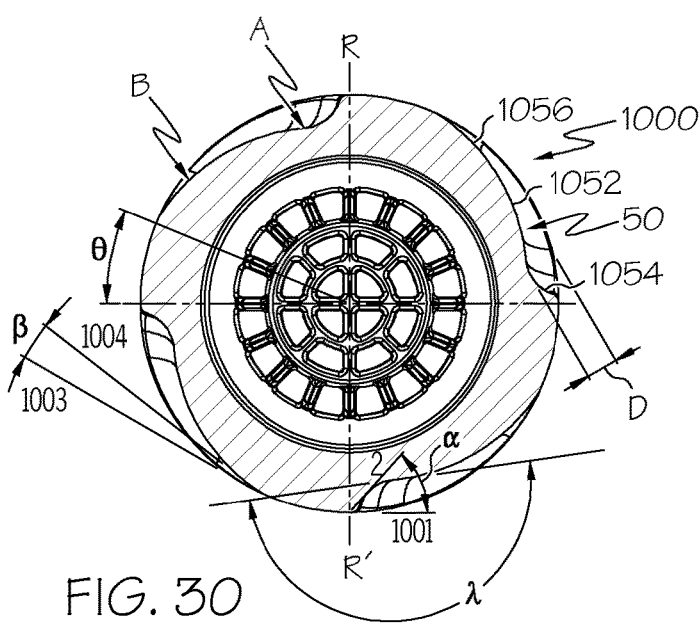
FIG. 30 is a cross section view of the exemplary adaptor taken along 30-30 of FIG. 28.

In the exemplary embodiment shown in FIGS. 25-30, body 1012 of adaptor 1000 may also comprise one or more gripping areas 1050 disposed within body 1012 about longitudinal axis L-L'. As shown in FIG. 30, gripping areas 1050 comprise a surface 1052, a pressure bearing face 1054, and a non-pressure bearing face 1056. Surface 1052 may be fabricated from the same material as the body or a separate material such a low durometer plastic. A low durometer plastic may be desirable for at least a portion of surface 1052 in order to provide a soft touch or feel to a user when making contact or gripping adaptor 1000. An exemplary plastic that may be used to partially cover or fabricate surface 1015 may comprise a low durometer elastomer.

Referring to FIG. 30, pressure bearing face 1054 may comprise an angle of leverage α and non-pressure bearing face 1056 may comprise an angle of leverage β. Angle of leverage α is measured from a hypothetical line 1001 that is tangent to circumferential surface 1011 and a hypothetical line 1002 that is tangent to the slope of the initial curvature (conic, spherical or linear) defining face 1054. Angle of leverage β is measured from a hypothetical line 1003 that is tangent to circumferential surface 1011 and a hypothetical line 1004 that is tangent to the slope of the initial curvature (conic, spherical or linear) defining face 1056. In the present invention, angle of leverage α may range from about 10 degrees to about 90 degrees, and angle of leverage β may range from about 0 degrees to about 90 degrees. The angle of leverage (α and β) defines the angle of the face (e.g., pressure bearing face 1054 or non-pressure bearing face 1056) available to make contact with a user's hand or fingers when attempting to grip and turn the adaptor. For example, the greater the angle of leverage (the closer the angle is to 90 degrees), the greater the slope of the face and thus the more face that is available for the user's hand or fingers to apply pressure against. As used herein, a "non-pressure bearing face" is defined as a face that has an angle of leverage (e.g., angle β) that is less than the angle of leverage (e.g., angle α) of an adjacent pressure bearing face of the same adaptor.

In the exemplary embodiment set forth in FIG. 30, non-pressure bearing face 1056 has an angle of leverage β that is less than the angle of leverage α of pressure bearing face 1054, thus forming face 1056 into the non-pressure bearing face. In the exemplary embodiment, angle of leverage α may range from about 30 degrees to about 90 degrees (e.g., about 60 degrees) and angle of leverage β may range from about 1000 degrees to about 60 degrees (e.g., about 30 degrees). It is understood that the angle of leverage may comprise an angle greater than 90 degrees in other alternative embodiments. As shown in FIG. 30, pressure bearing faces 1054 and non-pressure bearing faces 1056 cause adaptor 1000 and gripping areas 1050 to have an asymmetrical shape relative to any plane (e.g., R-R') that contains the longitudinal axis L-L' of adaptor 1000.

It has been discovered that since adaptor 1000 includes gripping areas 1050 that comprise a pressure bearing face 1054 and a non-pressure bearing face 1056 (i.e., angle β is less than angle α), adaptor 1000 provides a user both visual and tactile signals as to which rotational direction is the correct direction such as which rotational direction is required to threadingly connect adaptor 1000 onto a water faucet end. It is understood that adaptor 1000 may be alternatively configured to provide visual and tactile signals as to which rotational direction is required to loosen adaptor 1000. An adaptor of the present invention that provides visual and tactile signals as to which single rotational direction is correct is defined herein as unidirectional This is very beneficial to a user when trying to install a faucet mounted water filter system onto a water faucet because the visual and tactile signals simplify and expedite the installation of the adaptor by eliminating uncertainty about the correct rotation of the adaptor that is required. In addition, body 1012 may be fabricated such that it has a top surface 1019 that is configured to be level or linear (i.e., no curvature) such that a user may use the top surface to align the adaptor in an orientation that permits easy threading of the adaptor onto the faucet during the installation of the water filter system.

As shown in FIG. 30, the curvature of gripping areas 1050, essentially are located between pressure bearing face 1054 and non-pressure bearing face 1056, may be further defined by a depth (D) of gripping areas 1050, a radius (B) of non-pressure bearing face, and a conic arc. The conic arc may comprise a RHO value (A) and an angle λ of the conic arc's trailing edge. In the exemplary embodiment, depth (D) may range from about 0.115 inches to about 0.220 inches, radius (B) may range from about 0.3 inches to about 1.5 inches, RHO value (A) may range from about 0.5 to about 0.75, and angle λ may range an angle from about 130 degrees to about 190 degrees. In one exemplary embodiment, depth (D) is about 0.1 inches, radius (B) is about 1.0 inches, RHO value (A) is about 0.5, radius (B) is about 1.0 inches, and angle λ is about 175 degrees. As shown, this exemplary embodiment comprises gripping areas having a smooth, curvilinear shape. However, it is understood that gripping areas 1050, including pressure bearing and non-pressure bearing faces 1054 and 1056, may comprise other curvilinear, linear, non-linear, or any other shape as known to one of ordinary skill in the art.

The plurality of pressure bearing faces 1054 may be positioned or spaced-apart from each other at a variety of intervals along circumference 1011. For example, each pressure bearing face of the plurality of pressure bearing faces may be spaced from each other at an angle θ of from about 1 degree to about 180 degrees, alternatively from about 30 degrees to about 90 degrees. In the exemplary embodiment shown in FIGS. 25-30, angle θ is about 90 degrees between each pressure bearing face 1054. It is understood that gripping areas 1050 may have a variety of shapes and curvatures, including angular shapes that may provide an asymmetrical shape. Optionally, it is understood that gripping areas 1050 may also have symmetrical shapes such as indents, grooves, nubs, protrusions, etc., that would still provide a means for a user to grip while turning the adaptor, but would no longer be unidirectional and thus would no longer provide a visual and tactile signal to the user as to the proper rotational direction.

FIGS. 31-36 show another exemplary embodiment of adaptor 1000, wherein body 1012 has a shorter length than that shown in FIGS. 25-30. In addition, outer radial ribs 1025 are shown extending longitudinally from bottom wall 1022. More specifically, outer radial ribs 1025 are not flush with outer annular rib 1023. As shown, the portion of outer flow channels 1026 extended longitudinally above bottom wall 1022 are open, i.e., not closed by outer annular rib 1024, thus permitting ribs 1025 to trap the water flow within first inlet chamber 1021 and direct it into and through the outer flow channels 1026. Referring to FIGS. 37-42, another exemplary embodiment of adaptor 10 is shown. Adaptor 1000 comprises internal threads 1014 disposed at threaded end 1013 and outer flow channels 1026 are and outer radial ribs 1025 and outer annular rib 1024 are flush with each other but do extend longitudinally a distance from bottom wall 1022. FIGS. 43-48 show another exemplary embodiment of adaptor 1000, wherein threaded end 1013 comprises internal threading 1014. Additionally, similar to the embodiment shown in FIGS. 31-36, adaptor 1000 comprises outer radial ribs 1025 that extend longitudinally from bottom wall 1022. More specifically, outer radial ribs 1025 are not flush with outer annular rib 1023. As shown, the portion of outer flow channels 1026 extended longitudinally above bottom wall 1022 are open, i.e., not closed by outer annular rib 1024, thus permitting ribs 1025 to trap the water flow within first inlet chamber 1021 and direct it into and through the outer flow channels 1026.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A faucet-mounted filter system, comprising:
  a body having a first end and a second end;
  an opening within the first end of the body;
  a water inlet coaxially disposed within the opening;
  a channel disposed within the first end of the body and circumscribing the opening;
  a quick connect device including:
    a first locking device positioned within the channel and partially around the circumference of the opening, the first locking device movable between a first position and a second position;
    a second locking device positioned substantially opposite the first locking device within the channel and partially around the circumference of the opening, the second locking device movable between a first position and a second position;
    a spring biasing the first and second locking devices into the first positions wherein the first and second locking devices protrude into the opening when disposed in the first positions;
    first and second actuators each operable to cause the first and second locking devices to move against the force of the spring to the second positions, each of the first and second actuators comprising a first cam surface and a second cam surface for engaging corresponding cam surfaces on each of the first and second locking devices;
  an unfiltered water outlet in fluid communication with the water inlet;
  a filter housing connected to the body;
  a filter medium disposed within the filter housing and in fluid communication with the water inlet;
  a filtered water outlet in fluid communication with the filter medium;
  a support structure connected to the second end of the body and supporting the filter housing, the support structure including a support structure outlet aperture for the unfiltered water outlet; and
  an outer housing at least partially enclosing the body including the channel and the support structure, the first and second actuators extended through openings in the outer housing.

2. The filter system of claim 1, wherein the quick connect device is adapted to mount the filter system to a water faucet such that the water inlet is placed in fluid communication with the water faucet, the quick connect device positioned adjacent the water inlet along the body.

3. The filter system of claim 2, wherein the quick connect device receives a male portion of an adaptor, comprising:
  an adaptor body;
  a threaded end of the adaptor body for threadingly engaging an end of a water faucet;
  a flanged end of the adaptor body, opposite the threaded end for receiving the quick connect device;
  an adapter water inlet disposed within the adaptor body at the threaded end, the adapter water inlet comprising a first inlet chamber and a second inlet chamber in fluid communication with the first inlet chamber;
  an adapter water outlet disposed within the adaptor body at the flanged end;
  a plurality of outer flow channels coaxially-aligned with a longitudinal axis of body, the plurality of outer flow channels connecting in fluid communication the first inlet chamber with the adapter water outlet; and a plurality of inner flow channels that are coaxially-aligned with the longitudinal axis, the plurality of inner flow channels connecting in fluid communication the second inlet chamber with the adapter water outlet, wherein the plurality of inner flow channels are substantially concentric with the plurality of outer flow channels.

4. The filter system of claim 1, wherein the filter housing is configured to be installed in a horizontal orientation.

\* \* \* \* \*